United States Patent [19]
Elliott et al.

[11] Patent Number: 5,809,121
[45] Date of Patent: Sep. 15, 1998

[54] SYSTEM AND METHOD FOR GENERATING A NETWORK CALL IDENTIFIER

[75] Inventors: Isaac K. Elliott, Colorado Springs, Colo.; Randall Ethier, Herndon, Va.; Louis G. Gottlieb, Colorado Springs, Colo.; Ed Pickeral, Plano, Tex.

[73] Assignee: MCI Communications Corporation

[21] Appl. No.: 581,739

[22] Filed: Dec. 29, 1995

[51] Int. Cl.[6] .................................................. H04M 15/00
[52] U.S. Cl. ........................ 379/127; 379/116; 379/134; 379/207; 379/229
[58] Field of Search ...................... 379/112, 114, 379/115, 127, 128, 142, 188, 189, 201, 207, 220, 221, 111, 222, 229, 230

[56] References Cited

U.S. PATENT DOCUMENTS

| | | | |
|---|---|---|---|
| 4,464,543 | 8/1984 | Kline et al. ............................. | 179/8 R |
| 5,185,785 | 2/1993 | Funk et al. ............................. | 379/111 |
| 5,226,075 | 7/1993 | Funk et al. ............................. | 379/243 |
| 5,442,690 | 8/1995 | Nazif et al. ............................. | 379/127 |

FOREIGN PATENT DOCUMENTS

95/22230   8/1995   WIPO .

*Primary Examiner*—Curtis A. Kuntz
*Assistant Examiner*—Binh K. Tieu

[57] ABSTRACT

A system and method for the switches of a telecommunications network to create and transport a network call identifier (NCID) which uniquely identifies a telephone call as it traverses through a telecommunications network. Upon receipt of a telephone call in a switch, the switch first determines whether it has received an NCID with the telephone call. If the switch received an NCID, the switch determines whether it is a valid NCID and should be transported with the telephone call. If the received NCID should not be transported, the switch discards the received NCID and creates a new NCID for the telephone call. Alternatively, upon the receipt of a telephone call, if the switch determines that a NCID was not received, the switch determines if an NCID should be created. The switch creates an NCID if it determines that an NCID should be created for the telephone call. If the NCID is created or kept, the switch stores the NCID in an appropriate call record that contains information about the telephone call. After the switch creates an NCID, records a valid received NCID, or determines not to create an NCID, and completes the telephone call's call record, the switch transports the telephone call to the telephone call's destination. The NCID provides a mechanism for matching the call records associated with a specific telephone call and tracing the telephone call through the telecommunications network.

6 Claims, 17 Drawing Sheets

| BITS | 00 | 01 | 02 | 03 | 04 | 05 | 06 | 07 | 08 | 09 | 10 | 11 | 12 | 13 | 14 | 15 |
|---|---|---|---|---|---|---|---|---|---|---|---|---|---|---|---|---|
| WORD 00 | CRID | | | | CDID | | | | | | | | | | | |
| 01 | TP1 BITS 0-15 | | | | | | | | | | | | | | | |
| 02 | TP1 BITS 16-31 | | | | | | | | | | | | | | | |
| 03 | TP3 BITS 0-12 | | | | | | | | | | | | | TP6 0-2 | | |
| 04 | TP6 BITS 3-12 | | | | | | | | | | TP7 BITS 0-5 | | | | | |
| 05 | TP7 BITS 6-21 | | | | | | | | | | | | | | | |
| 06 | OPL, ORIGINATING PORT 0-15 | | | | | | | | | | | | | | | |
| 07 | OP | | TPL, TERMINATING PORT 0-14 | | | | | | | | | | | | | |
| 08 | TP | | OTG, ORIGINATING TRUNK GROUP | | | | | | | | | | | | | TT |
| 09 | TERMINATING TRUNK GROUP (1-12) | | | | | | | | | | | | TP3Q | | | |
| 10 | TP6Q | | ACTION CODE | | | | | | OTC | | | | TTC | | | |
| 11 | ID1 | | | | ID2 | | | | ANI INDEX | | | | | | | |
| 12 | CLI 1 | | | | CLI 2 | | | | CLI 3 | | | | CLI 4 | | | |
| 13 | CLI 5 | | | | CLI 6 | | | | CLI 7 | | | | CLI 8 | | | |
| 14 | CLI 9 | | | | CLI 10 | | | | A1 | | | | A2 | | | |
| 15 | A3 | | | | A4 | | | | A5 | | | | A6 | | | |
| 16 | A7 | | | | A8 | | | | A9 | | | | A10 | | | |
| 17 | A11 | | | | A12 | | | | A13 | | | | A14 | | | |
| 18 | A15 | | | | A16 | | | | A17 | | | | A18 | | | |
| 19 | A19 | | | | A20 | | | | A21 | | | | A22 | | | |
| 20 | D1 | | | | D2 | | | | D3 | | | | D4 | | | |
| 21 | D5 | | | | D6 | | | | D7 | | | | D8 | | | |
| 22 | D9 | | | | D10 | | | | D11 | | | | D12 | | | |
| 23 | D13 | | | | D14 | | | | D15 | | | | D16 | | | |
| 24 | D17 | | | | PTD1 | | | | PTD2 | | | | PTD3 | | | |
| 25 | PTD4 | | | | PTD5 | | | | PTD6 | | | | PTD7 | | | |
| 26 | PTD8 | | | | PTD9 | | | | PTD10 | | | | | | | |
| 27 | FC | | | | TNC | | | | NAT | | | | TP7Q | | | |
| 28 | EC, ENTRY CODE | | | | | | | | PD | | | NDID | | | DIVID | |
| 29 | DO | | CC | | IN | | SC | CD | DE | DT | | | SA | | NOCLI | |
| 30 | CN1 | | | | CN2 | | | | CN3 | | | | CN4 | | | |
| 31 | ACIF | | | | SS7 RELEASE CODE | | | | | | | | NCIDSEQ | | NL | RS |

FIG.3

| BITS WORD | MSB 00 | 01 | 02 | 03 | 04 | 05 | 06 | 07 | 08 | 09 | 10 | 11 | 12 | 13 | 14 | LSB 15 |
|---|---|---|---|---|---|---|---|---|---|---|---|---|---|---|---|---|
| 00 | CRID ||||| CDID |||||||||||
| 01 | TP1 BITS 0-15 ||||||||||||||||
| 02 | TP1 BITS 16-31 ||||||||||||||||
| 03 | TP3 BITS 0-12 ||||||||||||| TP6 0-2 |||
| 04 | TP6 BITS 3-12 |||||||||| TP7 BITS 0-5 ||||||
| 05 | TP7 BITS 6-21 ||||||||||||||||
| 06 | OPL, ORIGINATING PORT 0-15 ||||||||||||||||
| 07 | OP | TPL, TERMINATING PORT 0-14 |||||||||||||||
| 08 | TP || OTG, ORIGINATING TRUNK GROUP ||||||||||||| TT |
| 09 | TERMINATING TRUNK GROUP (1-12) |||||||||||| TP3Q ||||
| 10 | TP6Q ||| ACTION CODE ||||| OTC |||| TTC ||||
| 11 | ID1 |||| ID2 |||| ANI INDEX ||||||||
| 12 | CLI 1 |||| CLI 2 |||| CLI 3 |||| CLI 4 ||||
| 13 | CLI 5 |||| CLI 6 |||| CLI 7 |||| CLI 8 ||||
| 14 | CLI 9 |||| CLI 10 |||| CLI 11 |||| CLI 12 ||||
| 15 | CLI 13 |||| CLI 14 |||| CLI 15 |||| A1 ||||
| 16 | A2 |||| A3 |||| A4 |||| A5 ||||
| 17 | A6 |||| A7 |||| A8 |||| A9 ||||
| 18 | A10 |||| A11 |||| A12 |||| A13 ||||
| 19 | A14 |||| A15 |||| A16 |||| A17 ||||
| 20 | A18 |||| A19 |||| A20 |||| A21 ||||
| 21 | A22 |||| A23 |||| A24 |||| A25 ||||
| 22 | A26 |||| A27 |||| A28 |||| A29 ||||
| 23 | A30 |||| A31 |||| A32 |||| A33 ||||
| 24 | A34 |||| A35 |||| A36 |||| A37 ||||
| 25 | A38 |||| A39 |||| A40 |||| A41 ||||
| 26 | A42 |||| A43 |||| A44 |||| A45 ||||
| 27 | FC |||| TNC |||| NAT |||| TP7Q ||||
| 28 | EC, ENTRY CODE |||||| PD ||| NDID ||| DMD |||
| 29 | DO | MN | CC | IN || SC | CD | DE | DT ||| SA | NOCLI |||
| 30 | CN1 |||| CN2 |||| CN3 |||| CN4 ||||
| 31 | ACIF ||| SS7 RELEASE CODE ||||||| NCIDSEQ ||| NL | RS |

BITS 00 01 02 03 04 05 06 07 08 09 10 11 12 13 14 15

FIG.4(A)

| BITS | MSB 00 | 01 | 02 | 03 | 04 | 05 | 06 | 07 | 08 | 09 | 10 | 11 | 12 | 13 | 14 | LSB 15 |
|---|---|---|---|---|---|---|---|---|---|---|---|---|---|---|---|---|
| 32 | | | | | | | | | | | | | | | | |
| 33 | | | | | | | | | | | | | | | | |
| 34 | D1 | | | | D2 | | | | D3 | | | | D4 | | | |
| 35 | D5 | | | | D6 | | | | D7 | | | | D8 | | | |
| 36 | D9 | | | | D10 | | | | D11 | | | | D12 | | | |
| 37 | D13 | | | | D14 | | | | D15 | | | | D16 | | | |
| 38 | D17 | | | | D18 | | | | D19 | | | | D20 | | | |
| 39 | D21 | | | | D22 | | | | D23 | | | | D24 | | | |
| 40 | D25 | | | | PTD1 | | | | PTD2 | | | | PTD3 | | | |
| 41 | PTD4 | | | | PTD5 | | | | PTD6 | | | | PTD7 | | | |
| 42 | PTD8 | | | | PTD9 | | | | PTD10 | | | | PTD11 | | | |
| 43 | PTD12 | | | | PTD13 | | | | PTD14 | | | | PTD15 | | | |
| 44 | EIR CALL TYPE | | | | | | | | OVFVAL | | | | | | | CB |
| 45 | OVFCL | | | | DTA 1 | | | | DTA 2 | | | | DTA 3 | | | |
| 46 | DTA 4 | | | | DTA 5 | | | | DTA 6 | | | | DTA 7 | | | |
| 47 | DTA 8 | | | | DTA 9 | | | | DTA 10 | | | | DTA 11 | | | |
| 48 | DTA 12 | | | | DTA 13 | | | | DTA 14 | | | | DTA 15 | | | |
| 49 | OVFC | | | | | | | | DTAC | | | | | | | NCID |
| 50 | NETWORK CALL IDENTIFIER (NCID) | | | | | | | | | | | | | | | |
| 51 | NETWORK CALL IDENTIFIER (NCID) | | | | | | | | | | | | | | | |
| 52 | NETWORK CALL IDENTIFIER (NCID) | | | | | | | | | | | | | | | |
| 53 | NETWORK CALL IDENTIFIER (NCID) | | | | | | | | | | | | | | | |
| 54 | NETWORK CALL IDENTIFIER (NCID) | | | | | | | | | | | | | | | |
| 55 | | | | | | | | | | | | | | | | |
| 56 | | | | | | | | | | | | | | | | |
| 57 | | | | | | | | | | | | | | | | |
| 58 | | | | | | | | | | | | | | | | |
| 59 | | | | | | | | | | | | | UUS TYPE | | | UUIE |
| 60 | UUIE COUNT CONT. | | | | | | | | | | | | | | | OVFCS |
| 61 | ORIGINATING NX64 BITMAP (1–16) | | | | | | | | | | | | | | | |
| 62 | ORIG NX64 BITMAP (17–24) | | | | | | | | TERM NX64 BITMAP (1–8) | | | | | | | |
| 63 | TERMINATING NX64 BITMAP (9–24) | | | | | | | | | | | | | | | |
| BITS | 00 | 01 | 02 | 03 | 04 | 05 | 06 | 07 | 08 | 09 | 10 | 11 | 12 | 13 | 14 | 15 |

FIG.4(B)

| BITS | 00 | 01 | 02 | 03 | 04 | 05 | 06 | 07 | 08 | 09 | 10 | 11 | 12 | 13 | 14 | 15 |
|---|---|---|---|---|---|---|---|---|---|---|---|---|---|---|---|---|
| WORD 00 | CRID ||||| CDID |||||||||||
| 01 | TP1 BITS 0-15 ||||||||||||||||
| 02 | TP1 BITS 16-31 ||||||||||||||||
| 03 | TP4 BITS 0-12 ||||||||||||| TP6 0-2 |||
| 04 | TP6 BITS 3-12 |||||||||| TP7 BITS 0-5 ||||||
| 05 | TP7 BITS 6-21 ||||||||||||||||
| 06 | OPL, ORIGINATING PORT 0-15 ||||||||||||||||
| 07 | OP || TPL, TERMINATING PORT 0-14 ||||||||||||||
| 08 | TP || OTG, ORINATING TRUNK GROUP ||||||||||||| TT |
| 09 | TERMINATING TRUNK GROUP (1-12) |||||||||||| TP3Q ||||
| 10 | TP6Q || ACTION CODE |||||| OTC |||| TTC ||||
| 11 | ID1 |||| ID2 |||| ONACC |||| TNACC ||||
| 12 | CLI 1 |||| CLI 2 |||| CLI 3 |||| CLI 4 ||||
| 13 | CLI 5 |||| CLI 6 |||| CLI 7 |||| CLI 8 ||||
| 14 | CLI 9 |||| CLI 10 |||| A1 |||| A2 ||||
| 15 | A3 |||| A4 |||| A5 |||| A6 ||||
| 16 | A7 |||| A8 |||| A9 |||| A10 ||||
| 17 | A11 |||| A12 |||| A13 |||| A14 ||||
| 18 | A15 |||| A16 |||| A17 |||| A18 ||||
| 19 | A19 |||| A20 |||| A21 |||| A22 ||||
| 20 | D1 |||| D2 |||| D3 |||| D4 ||||
| 21 | D5 |||| D6 |||| D7 |||| D8 ||||
| 22 | D9 |||| D10 |||| D11 |||| D12 ||||
| 23 | D13 |||| D14 |||| D15 |||| D16 ||||
| 24 | D17 |||| OPIN ||||||||||||
| 25 | OPIN |||| TP5 BITS 0-12 ||||||||||||
| 26 | RN1 |||| RN2 |||| RN3 |||| RN4 ||||
| 27 | FC |||| TNC |||| NAT |||| TP7Q ||||
| 28 | EC, ENTRY CODE |||||||| PD |||| NDID || DIVID ||
| 29 | DO || CC | IN || SC | CD | DE | DT | PP | XC | SA | NOCLI ||||
| 30 | CN1 |||| CN2 |||| CN3 |||| CN4 ||||
| 31 | ACIF |||| SS7 RELEASE CODE |||||||| NCIDSEQ || NL | RS |
| BITS | 00 | 01 | 02 | 03 | 04 | 05 | 06 | 07 | 08 | 09 | 10 | 11 | 12 | 13 | 14 | 15 |

FIG.5

| BITS | 00 | 01 | 02 | 03 | 04 | 05 | 06 | 07 | 08 | 09 | 10 | 11 | 12 | 13 | 14 | 15 |
|---|---|---|---|---|---|---|---|---|---|---|---|---|---|---|---|---|
| | MSB | | | | | | | | | | | | | | | LSB |
| WORD 00 | CRID | | | | | | | CDID | | | | | | | | |
| 01 | TP1 BITS 0-15 | | | | | | | | | | | | | | | |
| 02 | TP1 BITS 16-31 | | | | | | | | | | | | | | | |
| 03 | TP4 BITS 0-12 | | | | | | | | | | | | | TP6 0-2 | | |
| 04 | TP6 BITS 3-12 | | | | | | | | | | | TP7 BITS 0-5 | | | | |
| 05 | TP7 BITS 6-21 | | | | | | | | | | | | | | | |
| 06 | OPL, ORIGINATING PORT 0-15 | | | | | | | | | | | | | | | |
| 07 | OP | | TPL, TERMINATING PORT 0-14 | | | | | | | | | | | | | |
| 08 | TP | | OTG, ORIGINATING TRUNK GROUP | | | | | | | | | | | | | TT |
| 09 | TERMINATING TRUNK GROUP (1-12) | | | | | | | | | | | | TP3Q | | | |
| 10 | TP6Q | | ACTION CODE | | | | | | OTC | | | | TTC | | | |
| 11 | ID1 | | | | ID2 | | | | ONACC | | | | TNACC | | | |
| 12 | CLI 1 | | | | CLI 2 | | | | CLI 3 | | | | CLI 4 | | | |
| 13 | CLI 5 | | | | CLI 6 | | | | CLI 7 | | | | CLI 8 | | | |
| 14 | CLI 9 | | | | CLI 10 | | | | CLI 11 | | | | CLI 12 | | | |
| 15 | CLI 13 | | | | CLI 14 | | | | CLI 15 | | | | A1 | | | |
| 16 | A2 | | | | A3 | | | | A4 | | | | A5 | | | |
| 17 | A6 | | | | A7 | | | | A8 | | | | A9 | | | |
| 18 | A10 | | | | A11 | | | | A12 | | | | A13 | | | |
| 19 | A14 | | | | A15 | | | | A16 | | | | A17 | | | |
| 20 | A18 | | | | A19 | | | | A20 | | | | A21 | | | |
| 21 | A22 | | | | A23 | | | | A24 | | | | A25 | | | |
| 22 | A26 | | | | A27 | | | | A28 | | | | A29 | | | |
| 23 | A30 | | | | A31 | | | | A32 | | | | A33 | | | |
| 24 | A34 | | | | A35 | | | | A36 | | | | A37 | | | |
| 25 | A38 | | | | A39 | | | | A40 | | | | A41 | | | |
| 26 | A42 | | | | A43 | | | | A44 | | | | A45 | | | |
| 27 | FC | | | | TNC | | | | NAT | | | | TP7Q | | | |
| 28 | EC, ENTRY CODE | | | | | | | PD | | | | NDID | | | DIVID | |
| 29 | DO | MN | CC | IN | | SC | CD | DE | DT | PP | XC | SA | NOCLI | | | |
| 30 | CN1 | | | | CN2 | | | | CN3 | | | | CN4 | | | |
| 31 | ACIF | | | | SS7 RELEASE CODE | | | | | | | | NCIDSEQ | | NL | RS |

FIG.6(A)

| BITS | MSB 00 | 01 | 02 | 03 | 04 | 05 | 06 | 07 | 08 | 09 | 10 | 11 | 12 | 13 | 14 | LSB 15 |
|---|---|---|---|---|---|---|---|---|---|---|---|---|---|---|---|---|
| 32 | T&C GUEST 1 ||||||||  T&C GUEST 2 ||||||||
| 33 | T&C GUEST 3 |||||||| T&C GUEST 4 ||||||||
| 34 | D1 |||| D2 |||| D3 |||| D4 ||||
| 35 | D5 |||| D6 |||| D7 |||| D8 ||||
| 36 | D9 |||| D10 |||| D11 |||| D12 ||||
| 37 | D13 |||| D14 |||| D15 |||| D16 ||||
| 38 | D17 |||| D18 |||| D19 |||| D20 ||||
| 39 | D21 |||| D22 |||| D23 |||| D24 ||||
| 40 | D25 |||| PTD1 |||| PTD2 |||| PTD3 ||||
| 41 | PTD4 |||| PTD5 |||| PTD6 |||| PTD7 ||||
| 42 | PTD8 |||| PTD9 |||| PTD10 |||| PTD11 ||||
| 43 | PTD12 |||| PTD13 |||| PTD14 |||| PTD15 ||||
| 44 | EIR CALL TYPE |||||||| OVFVAL |||||| CB ||
| 45 | OVFCL |||| DTA 1 |||| DTA 2 |||| DTA 3 ||||
| 46 | DTA 4 |||| DTA 5 |||| DTA 6 |||| DTA 7 ||||
| 47 | DTA 8 |||| DTA 9 |||| DTA 10 |||| DTA 11 ||||
| 48 | DTA 12 |||| DTA 13 |||| DTA 14 |||| DTA 15 ||||
| 49 | OVFC |||||||| DTAC |||||| NCID ||
| 50 | NETWORK CALL IDENTIFIER (NCID) ||||||||||||||||
| 51 | NETWORK CALL IDENTIFIER (NCID) ||||||||||||||||
| 52 | NETWORK CALL IDENTIFIER (NCID) ||||||||||||||||
| 53 | NETWORK CALL IDENTIFIER (NCID) ||||||||||||||||
| 54 | NETWORK CALL IDENTIFIER (NCID) ||||||||||||||||
| 55 | T&C ROOM 1 |||||||| T&C ROOM 2 ||||||||
| 56 | T&C ROOM 3 |||||||| T&C ROOM 4 ||||||||
| 57 | T&C ROOM 5 |||||||| T&C ROOM 6 ||||||||
| 58 | EAC1 |||| EAC2 |||| EAC3 |||| EAC4 ||||
| 59 | EAC5 |||| EAC6 |||| EAC7 |||| EAC8 ||||
| 60 | EAC9 |||| EAC10 |||| EAC11 |||| EAC12 ||||
| 61 | OPIN |||||||||||| OVFCS ||||
| 62 | TPS - OPERATOR RELEASE |||||||||||| | | | |
| 63 | RN1 |||| RN2 |||| RN3 |||| RN4 ||||

BITS 00 01 02 03 04 05 06 07 08 09 10 11 12 13 14 15

FIG.6(B)

| BITS | MSB 00 | 01 | 02 | 03 | 04 | 05 | 06 | 07 | 08 | 09 | 10 | 11 | 12 | 13 | 14 | LSB 15 |
|---|---|---|---|---|---|---|---|---|---|---|---|---|---|---|---|---|
| WORD 00 | CRID | | | | SYNC WORD (MINUS 2, OCTAL 7776) | | | | | | | | | | | |
| 01 | CDID, CALL DISCONNECT I.D. NUMBER (0-15) | | | | | | | | | | | | | | | |
| 02 | CDID, CALL DISCONNECT I.D. NUMBER (16-31) | | | | | | | | | | | | | | | |
| 03 | SWID 1 | | | | | SWID 2 | | | | | SWID 3 | | | | | |
| 04 | ST - SWITCH TYPE | | | | | | | | EQ - EVENT QUALIFIER | | | | | | | |
| 05 | SERET - SER EVENT TIME (0-15) | | | | | | | | | | | | | | | |
| 06 | SERET - SER EVENT TIME (16-32) | | | | | | | | | | | | | | | |
| 07 | | | | | FCDID - FIRST RECORD CDID (12 LSBs) | | | | | | | | | | | |
| 08 | | | | | LCDID - LAST RECORD CDID (12 LSBs) | | | | | | | | | | | |
| 09 | | | | | NCDID - NEXT RECORD CDID (12 LSBs) | | | | | | | | | | | |
| 10 | NBSN - NEMAS BLOCK SEQUENCE NUMBER | | | | | | | | | | | | | | | |
| 11 | PT - PREVIOUS TIME (0-15) | | | | | | | | | | | | | | | |
| 12 | PT - PREVIOUS TIME (16-31) | | | | | | | | | | | | | | | |
| 13 | SI | | TIME OFFSET | | | | | | | | | | | | | |
| 14 | | | | | | | | | | | | | | | | |
| 15 | | | | | | | | | | | | | | | | |
| 16 | SOFTWARE LOAD ID1 | | | | | | | | SOFTWARE LOAD ID2 | | | | | | | |
| 17 | SOFTWARE LOAD ID3 | | | | | | | | SOFTWARE LOAD ID4 | | | | | | | |
| 18 | SOFTWARE LOAD ID5 | | | | | | | | SOFTWARE LOAD ID6 | | | | | | | |
| 19 | LAST PATCH#/PR RLS1 | | | | | | | | LAST PATCH#/PR RLS2 | | | | | | | |
| 20 | QCDR | | | | | | QECDR | | | | | | | | | |
| 21 | QPNR | | | | | | QEPNR | | | | | | | | | |
| 22 | QOSR | | | | | | QEOSR | | | | | | | | | |
| 23 | QPOSR | | | | | | QEPOSR | | | | | | | | | |
| 24 | QSER | | | | | | CHFN | | | | | | | | | SU |
| 25 | CDR THROTTLE START TIME (0-15) | | | | | | | | | | | | | | | |
| 26 | CDR THROTTLE START TIME (16-31) | | | | | | | | | | | | | | | |
| 27 | CDR THROTTLE STOP TIME (0-15) | | | | | | | | | | | | | | | |
| 28 | CDR THROTTLE STOP TIME (16-31) | | | | | | | | | | | | | | | |
| 29 | | | | | | | | | | | | | FORMAT VER. | | | |
| 30 | THROTTLE COUNT (0-15) | | | | | | | | | | | | | | | |
| 31 | THROTTLE COUNT (16-31) | | | | | | | | | | | | | | | |

FIG.7

SYSTEM AND METHOD FOR GENERATING A NETWORK CALL IDENTIFIER

BACKGROUND OF THE INVENTION

1. Field of the Invention

This invention relates generally to telecommunication networks, and more specifically, to switches of a telecommunication network that generate call records using a flexible and expandable record format, and that generate a unique call identifier for each telephone call that traverses the network.

2. Related Art

A typical telecommunication network comprises multiple telecommunication switches located throughout a geographical area. When a user makes a call, the call may be routed through one or more switches before reaching its destination.

FIG. 1 illustrates an exemplary telecommunications system 102 across the United States. For purposes of illustration, a caller 104 places a call from Los Angeles, Calif. to a party 112 located in New York City, N.Y. Such a call is typically transmitted across three (3) switches: the Los Angeles, Calif. switch 106; the Chicago, Ill. switch 108; and the New York City, N.Y. switch 110.

In this scenario, the originating switch is the Los Angeles, Calif. switch 106, and the terminating switch is the New York City, N.Y. switch 110.

Each switch 106–110 is connected to two (2) or more Data Access Points (DAP) 116–120, a primary DAP 116–120 and a backup DAP 116. A DAP 116–120 is a facility that receives requests for information from the switches 106–110, processes the requests, and returns the requested information back to the requesting switch 106–110. The switches 106–110 use information from the DAPs 116–120 to process calls through the network.

When a call passes through a switch 106–110, the switch 106–110 creates a call record. The call record contains information on the call, including but not limited to: routing, billing, call features, and trouble shooting information. After the call is terminated, each switch 106–110 that processed the call completes the associated call record. The switches 106–110 combine multiple call records into a billing block. When a switch 106–110 fills the billing block, the switch 106–110 sends the billing block to a billing center 114. Thus, the billing center 114 receives one billing block from each switch 106–110 that handled the call, which in this case would be three billing blocks. The billing center 114 searches each billing block and retrieves the call record associated with the call, thereby retrieving one call record per switch 106–110 that handled the call. The billing center 114 then uses one or more of the retrieved call records to generate a billing entry. The billing center 114 is also connected to each DAP 116–120 to retrieve information regarding a switch 106–110 or call record.

To better understand the invention, it is useful to describe some additional terminology relating to a telecommunication network. A telephone call comes into a switch on a transmission line referred to as the originating port, or trunk. The originating port is one of many transmission lines coming into the switch from the same location of origin. This group of ports is the originating trunk group. After processing an incoming call, the switch transmits the call to a destination location which may be another switch, a local exchange carrier, or a private branch exchange. The call is transmitted over a transmission line referred to as the terminating port, or trunk. Similar to the originating port, the terminating port is one of a group of ports going from the switch to the same destination. This group of ports is the terminating trunk group.

Contemporary telecommunication networks provide customers with the capability of using the general public network as well as the capability of defining a custom virtual network (VNet). With a VNet, a customer defines a private dialing plan, including plan telephone numbers. A VNet customer is not limited to the default telephone numbers allocated to a public telecommunication system dedicated to a specific geographic region, but can define custom telephone numbers.

Upon processing a telephone call, a switch must generate a call record large enough to contain all of the needed information on a call. The call record, however, must not be so large that the typical call results in the majority of the record fields in the call record to be unused. In such a case, storing such call records results in large amounts of wasted storage, and transmitting such a call record increases unnecessary transmissions.

One solution for creating and processing call records is to implement a fixed length call record format, such as a 32-word call record. A word is two (2) bytes, or sixteen (16) bits. A fixed length record format, however, cannot expand when new call features are implemented. More importantly, fixed call record formats cannot handle expanded data fields as the telecommunications network becomes more complex with new features and telephone numbers.

Contemporary fixed length record formats include time point fields recording local time in three (3) second increments where local switch time represents the time of day at a switch. The timepoint fields are used by the network switches, billing center, and other network subsystems. Each subsystem, however, may require the time period for a different use and in a different format, such as in an epoch time format. Epoch time is the number of one (1) second increments since a particular date and time in history. For example, the billing center requires epoch time for its billing records whereas switch reports and error logs require local switch time.

A problem also arises with using only local switch time in that there is no accommodation for time changes due to daylight savings time. Additionally, each subsystem may require a finer granularity of precision than the current three (3) second increments. By providing only local switch time at three (3) second increments, the switches have passed the burden of translating the time into a usable format to the network subsystems. The fixed record format cannot accommodate the various time period requirements because it only contains the time periods in local switch time at a low level of precision. Because of its fixed nature, the fixed record format cannot expand to include different time formats, nor to include a finer granularity of precision such as a one (1) second increment.

Therefore, there is a need for switches of a telecommunications network to store call record information in a flexible and expandable format. There is a further need to provide time point fields with one (1) second granularity in a flexible format that easily and efficiently responds to daylight savings time and time zone changes.

Requirements also exist for matching all of the call records associated with a specific telephone call. For example, for proper billing and cost control, it is necessary for the billing center to match the originating switch's call record to the terminating switch's call record. Additionally, for troubleshooting and security purposes, it may be necessary to trace a specific telephone call easily through the network in order to identify problem areas.

Therefore, there is a need for switches of a telecommunications network to uniquely identify each telephone call that traverses the network, thereby uniquely identifying all of the call records associated with a specific telephone call.

SUMMARY OF THE INVENTION a. Call Record Format

This invention solves the problems of providing a flexible and expandable call record format by implementing both a small and large call record format. In particular, the embodiment of the present invention implements a preferably 32 and 64 word call record format. The invention uses a 32-word call record format for the typical telephone call, which comprises the majority of all telephone calls, and uses a 64-word call record format when additional information is needed regarding the call. This implementation provides the flexibility needed to efficiently manage varying data requirements of a call record. New call features can be developed and easily incorporated into the variable call record format of the present invention.

This invention also records timepoints in the epoch time format. The invention records the origination time of a call in epoch time format and the remaining timepoints are offsets, or the number of seconds, from that origination time. This embodiment solves the problems associated with converting from/to daylight savings time because daylight savings time is simply a local time offset and does not effect the epoch time. Additionally, the timepoints in epoch time format require less space in the call record than local switch time format.

The epoch time format may represent coordinated universal time (UTC), as determined at Greenwich, England which has a time zone of zero (0), local switch time or any other time. Epoch time is just a format and does not dictate that UTC must be used. The billing time and the local switch time may be in UTC or local time, and the local switch time may not necessarily be the same time that is used for billing. Therefore, the switch must keep billing time and local switch time separate in order to prevent the problems that occur during daylight savings time changes.

b. Network Call Identifier

This invention solves the problem of uniquely identifying each telephone call and all of the call records associated with a specific telephone call by providing a unique identifier to each call record. This invention generates a network call identifier (NCID) that is assigned to each call record at the point of call origination, that is, the originating switch generates a NCID for each telephone call. The NCID accompanies the associated telephone call through the telecommunications network to the termination point at the terminating switch. Therefore, at any point of a telephone call in the network, the associated NCID identifies the point and time of origin of the telephone call. Each switch through which the telephone call passes records the NCID in the call record associated with the call. The NCID is small enough to fit in a 32-word call record, thereby reducing the data throughput and storage. The NCID provides the billing center and other network subsystems with the ability to match originating and terminating call records for a specific telephone call.

This invention also provides the switch capability of discarding a received NCID and generating a new NCID. A switch discards a received NCID if the NCID format is invalid or unreliable, thereby ensuring a valid unique identifier to be associated with each call going through the network. An NCID may be unreliable if generated by third party switches in the telecommunications network.

Additional features of this invention will become apparent from the following detailed description of the best mode for carrying out the invention and from appended claims.

BRIEF DESCRIPTION OF THE FIGURES

The present invention is described with reference to the accompanying drawings. In the drawings, like reference numbers indicate identical or functionally similar elements. Additionally, the left-most digit(s) of a reference number identifies the drawing in which the reference number first appears.

FIG. 3 illustrates the CDR and PNR call record formats;

FIGS. 4(A) and 4(B) collectively illustrate the ECDR and EPNR call record formats;

FIG. 5 illustrates the OSR and POSR call record formats;

FIGS. 6(A) and 6(B) collectively illustrate the EOSR and EPOSR call record formats;

FIG. 7 illustrates the SER record format;

DESCRIPTION OF THE PREFERRED EMBODIMENTS

The present invention relates to switches of a telecommunication network that generate call records using a flexible and expandable record format. The call record formats include a small (preferably 32-word) and a large (preferably 64-word) expanded format. It would be readily apparent to one skilled in the relevant art to implement a small and large record format of different sizes.

The present invention also relates to switches of a telecommunication network that generate a unique NCID for each telephone call traversing the network. The NCID provides a mechanism for matching all of the call records associated with a specific telephone call. It would be readily apparent to one skilled in the relevant art to implement a call record identifier of a different format.

Figure 1:
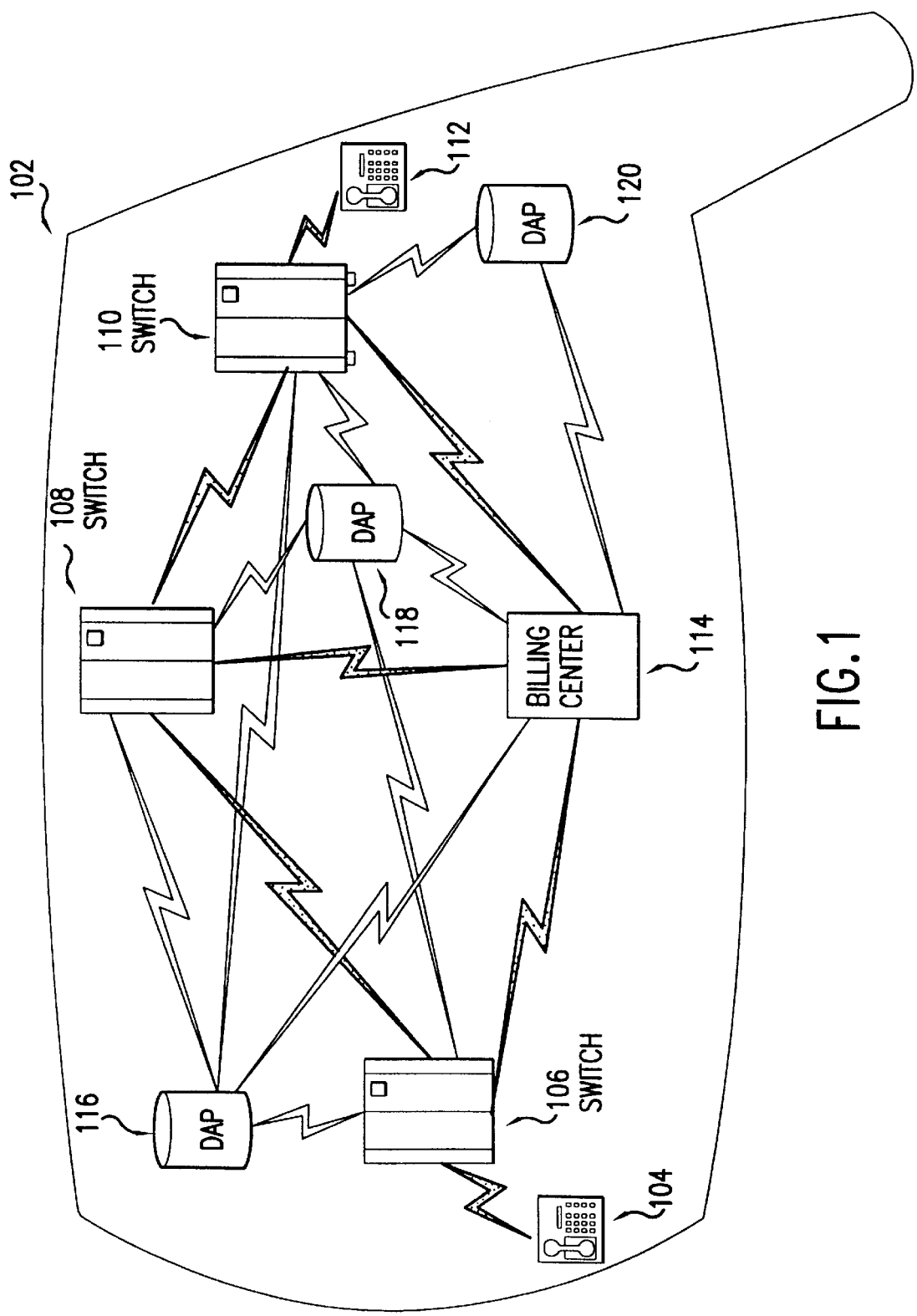
FIG. 1 is a block diagram of an exemplary telecommunications system.
Figure 2:
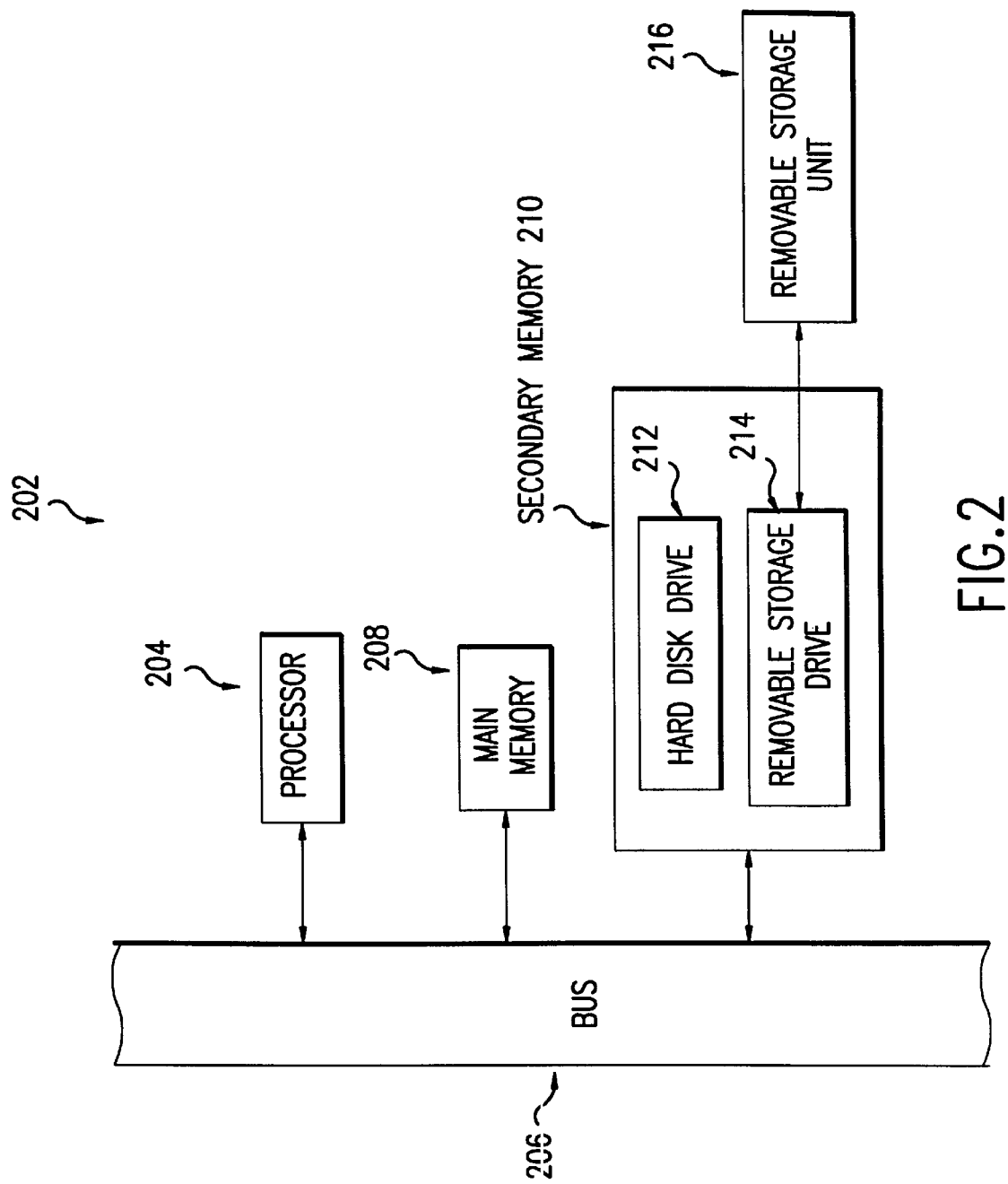
FIG. 2 is a block diagram of an exemplary computer system.

The chosen embodiment of the present invention is computer software executing within a computer system. FIG. 2 shows an exemplary computer system. The computer system 202 includes one or more processors, such as a processor 204. The processor 204 is connected to a communication bus 206.

The computer system 202 also includes a main memory 208, preferably random access memory (RAM), and a secondary memory 210. The secondary memory 210 includes, for example, a hard disk drive 212 and/or a removable storage drive 214, representing a floppy disk drive, a magnetic tape drive, a compact disk drive, etc. The removable storage drive 214 reads from and/or writes to a removable storage unit 216 in a well known manner.

Removable storage unit 216, also called a program storage device or a computer program product, represents a floppy disk, magnetic tape, compact disk, etc. As will be appreciated, the removable storage unit 216 includes a computer usable storage medium having stored therein computer software and/or data.

Computer programs (also called computer control logic) are stored in main memory 208 and/or the secondary memory 210. Such computer programs, when executed, enable the computer system 202 to perform the functions of the present invention as discussed herein. In particular, the computer programs, when executed, enable the processor 204 to perform the functions of the present invention. Accordingly, such computer programs represent controllers of the computer system 202.

In another embodiment, the invention is directed to a computer program product comprising a computer readable medium having control logic (computer software) stored therein. The control logic, when executed by the processor 204, causes the processor 204 to perform the functions of the invention as described herein.

In another embodiment, the invention is implemented primarily in hardware using, for example, a hardware state machine. Implementation of the hardware state machine so as to perform the functions described herein will be apparent to persons skilled in the relevant arts.

a. Call Record Format

This invention provides the switches of a telecommunication network with nine (9) different record formats. These records include: Call Detail Record (CDR), Expanded Call Detail Record (ECDR), Private Network Record (PNR), Expanded Private Network Record (EPNR), Operator Service Record (OSR), Expanded Operator Service Record (EOSR), Private Operator Service Record (POSR), Expanded Private Operator Service Record (EPOSR), and Switch Event Record (SER). MCI Communications Corporation (MCI) currently uses these record formats and describes them in detail in the MCI documents MCI 32/64-Word Billing Record Format Specification, 007-0001-09.8F-ES, revision 9.8, Aug. 31, 1995 which is incorporated herein by reference in its entirety. Each record is 32-words in length and the expanded version of each record is 64 words in length.

Example embodiments of the nine (9) call record formats discussed herein are further described in Tables 1–5 of the Appendix. The Appendix, and these Tables in the Appendix, form a part of this application and are self-explanatory. The embodiments of the call records of the present invention comprise both 32 word and 64 word call record formats. It would be apparent to one skilled in the relevant art to develop alternative embodiments for call records comprising a different number of words and different field definitions. Table 1 of the Appendix contains an example embodiment of the CDR and PNR call record formats. FIG. 3 shows a graphical representation of the CDR and PNR call record formats. Table 2 of the Appendix contains an example embodiment of the ECDR and EPNR call record formats. FIGS. 4(A) and 4(B) show a graphical representation of the ECDR and EPNR call record formats. Table 3 of the Appendix contains an example embodiment of the OSR and POSR call record formats. FIG. 5 shows a graphical representation of the OSR and POSR call record format. Table 4 of the Appendix contains an example embodiment of the EOSR and EPOSR call record formats. FIGS. 6(A) and 6(B) show a graphical representation of the EOSR and EPOSR call record formats. Table 5 of the Appendix contains an example embodiment of the SER record format. FIG. 7 shows a graphical representation of the SER record format.

The CDR and PNR, thereby the ECDR and EPNR, are standard call record formats and contain information regarding a typical telephone call as it passes through a switch. The CDR is used for a non-VNet customer, whereas the PNR is used for a VNet customer and is generated at switches which originate VNet calls. The fields of these two records are identical except for some field-specific information which is described below.

The OSR and POSR, thereby the EOSR and EPOSR, contain information regarding a telephone call requiring operator assistance and are generated at switches or systems actually equipped with operator positions. A switch completes an OSR for a non-VNet customer and completes a POSR for a private VNet customer. These records are only generated at switches or systems that have the capability of performing operator services or network audio response system (NARS) functions. The formats of the two (2) records are identical except for some field-specific information which is described below.

A SER is reserved for special events such as the passage of each hour mark, time changes, system recoveries, and at the end of a billing block. The SER record format is described in more detail below.

Figure 8A:
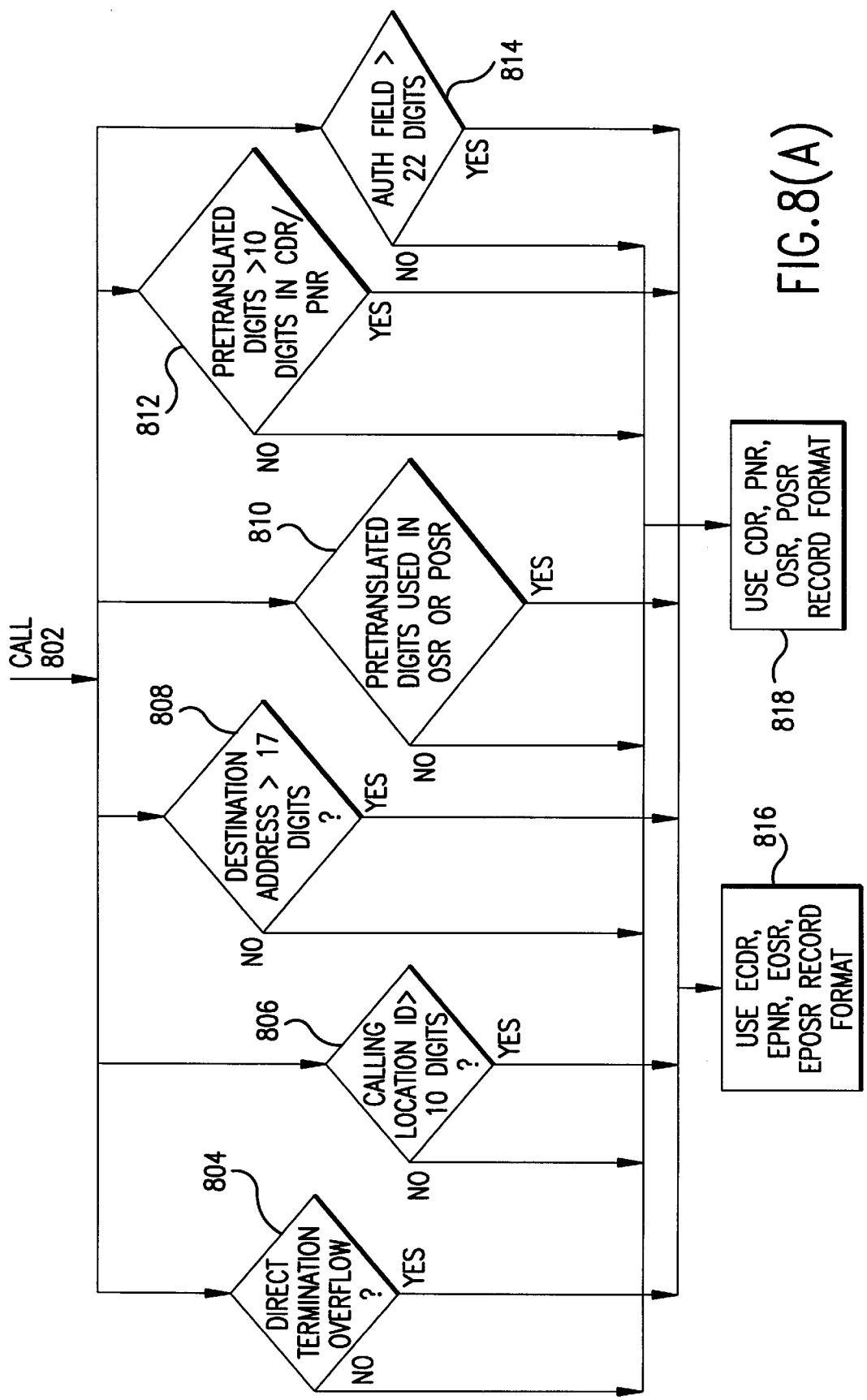
FIGS. 8(A) and 8(B) are control flow diagrams illustrating when a switch uses the expanded record format.
Figure 8B:
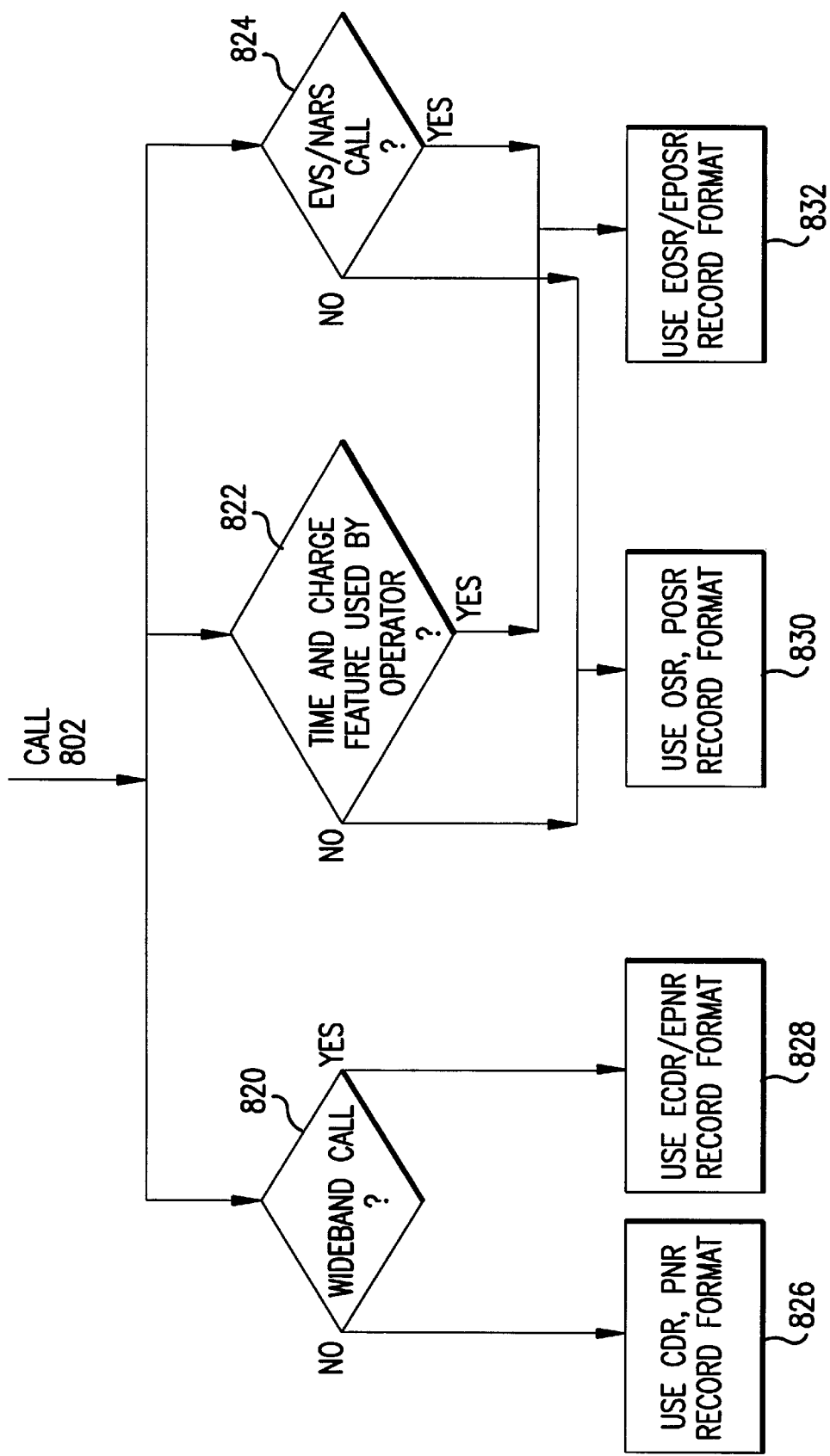

FIGS. 8(A) and 8(B) collectively illustrate the logic that a switch uses to determine when to use an expanded version of a record format. A call 802 comes into a switch 106–110 (called the current switch for reference purposes; the current switch is the switch that is currently processing the call), at which time the switch 106–110 determines what call record and what call record format (small/default or large/expanded) to use for the call's 802 call record. In this regard, the switch 106–110 makes nine (9) checks for each call 802 that it receives. The switch 106–110 uses an expanded record for a call 802 that passes any check, as well as, for a call 802 that passes any combination of checks.

The first check 804 determines if the call is involved in a direct termination overflow (DTO) at the current switch 106–110. For example, a DTO occurs when a customer makes a telephone call 802 to an 800 number and the original destination of the 800 number is busy. If the original destination is busy, the switch overflows the telephone call 802 to a new destination. In this case, the switch must record the originally attempted destination, the final destination of the telephone call 802, and the number of times of overflow. Therefore, if the call 802 is involved in a DTO, the switch 106–110 must complete an expanded record (ECDR, EPNR, EOSR, EPOSR) 816; otherwise, the switch 106–110 uses the default record format (CDR, PNR, OSR, POSR) 818.

The second check 806 made on a call 802 by a switch 106–110 determines if the calling location of the call 802 is greater than ten (10) digits. The calling location is the telephone number of the location from where the call 802 originated. Such an example is an international call which comprises at least eleven (11) digits. If the calling location is greater than ten (10) digits, the switch records the telephone number of the calling location in an expanded record (ECDR, EPNR, EOSR, EPOSR) 816; otherwise, the switch 106–110 uses the default record format (CDR, PNR, OSR, POSR) 818.

A switch 106–110 makes a third check 808 on a call 802 to determine if the destination address is greater than seventeen (17) digits. The destination address is the number of the called location and may be a telephone number or trunk group. If the destination is greater than seventeen (17) digits, the switch records the destination in an expanded record (ECDR, EPNR, EOSR, EPOSR) 816; otherwise, the switch 106–110 uses the default record format (CDR, PNR, OSR, POSR) 818.

A switch 106–110 makes a fourth check 810 on a call 802 to determine if the pre-translated digits field is used with an operator assisted service call. The pre-translated digits are the numbers of the call 802 as dialed by a caller if the call 802 must be translated to another number within the network. Therefore, when a caller uses an operator service, the switch 106–110 records the dialed numbers in expanded record (EOSR, EPOSR) 816; otherwise, the switch 106–110 uses the default record format (OSR, POSR) 818.

In a fifth check 812 on a call 802, a switch 106–110 determines if the pre-translated digits of a call 802 as dialed by a caller without operator assistance has more than ten (10) digits. If there are more than ten (10) pre-translated digits, the switch 106–110 records the dialed numbers in expanded record (ECDR, EPNR) 816; otherwise, the switch 106–110 uses the default record format (CDR, PNR) 818.

In a sixth check 814 on a call 802, a switch 106–110 determines if more than twenty-two (22) digits, including supplemental data, are recorded in the Authorization Code field of the call record. The Authorization Code field indicates a party who gets billed for the call, such as the calling location or a credit card call. If the data entry requires more than twenty-two (22) digits, the switch 106–110 records the billing information in an expanded record (ECDR, EPNR, EOSR, EPOSR) 816; otherwise, the switch 106–110 uses the default record format (CDR, PNR, OSR, POSR) 818.

In a seventh check 820 on a call 802, a switch 106–110 determines if the call 802 is a wideband call. A wideband call is one that requires multiple transmission lines, or channels. For example, a typical video call requires six (6) transmission channels: one (1) for voice and five (5) for the video transmission. The more transmission channels used during a wideband call results in a better quality of reception. Contemporary telecommunication systems currently provide up to twenty-four (24) channels. Therefore, to indicate which, and how many, of the twenty-four channels is used during a wideband call, the switch records the channel information in an expanded record (ECDR, EPNR) 828. If the call 802 is not a wideband call, the switch 106–110 may use the default record format (CDR, PNR) 826.

In an eighth check 822 on a call 802, a switch 106–110 determines if the time and charges feature was used by an operator. The time and charges feature is typically used in a hotel scenario when a hotel guest makes a telephone call using the operator's assistance and charges the call 802 to her room. After the call 802 has completed, the operator informs the hotel guest of the charge, or cost, of the call 802. If the time and charges feature was used with a call 802, the switch 106–110 records the hotel guest's name and room number in an expanded record (EOSR, EPOSR) 832. If the call did not use the time and charges feature, the switch 106–110 uses the default record format (OSR, POSR) 830.

The ninth, and final, check 824 made on a call 802 by a switch 106–110 determines if the call 802 is an enhanced voice service/network audio response system (EVS/NARS) call. An EVS/NARS is an audio menu system in which a customer makes selections in response to an automated menu via her telephone key pad. Such a system includes a NARS switch on which the audio menu system resides. Therefore, during an EVS/NARS call 802, the NARS switch 106–110 records the customer's menu selections in an expanded record (EOSR, EPOSR) 832. If the call did not involve a EVS/NARS, the switch 106–110 uses the default record format (OSR, POSR) 830.

Once the checks have been made against a call, a switch generates and completes the appropriate call record. Call record data is recorded in binary and Telephone Binary Coded Decimal (TBCD) format. TBCD format is illustrated below:

0000=TBCD-Null
0001=digit 1
0010=digit 2
0011=digit 3
0100=digit 4
0101=digit 5
0110=digit 6
0111=digit 7
1000=digit 8
1001=digit 9
1010=digit 0
1011=special digit 1 (DTMF digit A)
1100=special digit 2 (DTMF digit B)
1101=special digit 3 (DTMF digit C)
1110=special digit 4 (DTMF digit D)
1111=special digit 5 (Not Used)

All TBCD digit fields must be filled with TBCD-Null, or zero, prior to data being recorded. Where applicable, dialed digit formats conform to these conventions:

N=digits 2–9
X=digits 0–9
Y=digits 2–8

Thus, if the specification for a call record field contains a N, the valid field values are the digits 2–9.

Each call record, except SER, contains call specific timepoint fields. The timepoint fields are recorded in epoch time format. Epoch time is the number of one second increments since a particular date/time in history. The embodiment of the present invention uses a date/time of midnight (00:00 am UTC) on Jan. 1, 1976. It would be readily apparent to one skilled in the relevant art to implement an epoch time based on another date/time. In the records, Timepoints 1 represents the epoch time that is the origination time of the call 802. The other timepoint stored in the records are the number of seconds after Timepoint 1, that is, they are offsets from Timepoint 1 that a particular timepoint occurred. All of the timepoint fields must be filled in with "0's" prior to any data being recorded. Therefore, if a timepoint occurs, its count is one (1) or greater. Additionally, timepoint counters, not including Timepoint 1, do not rollover their counts, but stay at the maximum count if the time exceeds the limits.

The switch clock reflects local switch time and is used for all times except billing. Billing information is recorded in epoch time which in this embodiment is UTC. The Time offset is a number reflecting the switch time relative to the UTC, that is, the offset due to time zones and, if appropriate, daylight savings time changes. There are three factors to consider when evaluating time change relative to UTC. First, there are time zones on both sides of UTC, and therefore have both negative and positive offsets. Second, the time zone offsets count down from zero (in Greenwich, England) in an Eastward direction until the International Dateline is reached. At the Dateline, the date changes to the next day, such that the offset becomes positive and starts counting down until the zero offset is reached again at Greenwich. Third, there are many areas of the world that have time zones that are not in exact one-hour increments. For example, Australia has one time zone that has a thirty (30) minute difference from the two time zones on either side of it, and Northern India has a time zone that is fifteen (15) minutes after the one next to it. Therefore, the Time Offset of the call records must account for variations in both negative and positive offsets in fifteen (15) minute increments. The embodiment of the present invention satisfies this requirement by providing a Time Offset representing either positive or negative one minute increments.

There are two formulas used to convert local switch time to epoch time and back.
i) Epoch Time+(Sign Bit*Time Offset)=Local Switch Time
ii) Local Switch Time−(Sign Bit*Time Offset)=Epoch Time The switch records the Time Offset in the SER using a value where one (1) equals one (1) minute, and computes the Time Offset in seconds and adds this value to each local Timepoint 1 before the call record is recorded. For example, Central Standard Time is six (6) hours before UTC. In this case, the Sign Bit indicates "1" for negative offset and the Time Offset value recorded in the SER would be 360 (6 hours*60 minutes/hour=360 minutes). See Table 5 of the Appendix for more details on the SER record format. When recording Timepoint 1 in the call record, the switch multiplies the Time Offset by 60, because there are 60 seconds in each 1 minute increment, and determines whether the offset is positive or negative by checking the Sign Bit. This example results in a value of −21,600 (−1*360 minutes*60 seconds/minute=− 21,600 seconds). Using equation (ii) from above, if the local switch time were midnight, the corresponding epoch time might be, for example, 1,200,000,000. Subtracting the Time Offset of −21,600 results in a corrected epoch time of 1,200,021,600 seconds, which is the epoch time for 6 hours after midnight on the next day in epoch time. This embodiment works equally as well in switches that are positioned on the East side of Greenwich where the Time Offset has a positive value.

Figure 9:
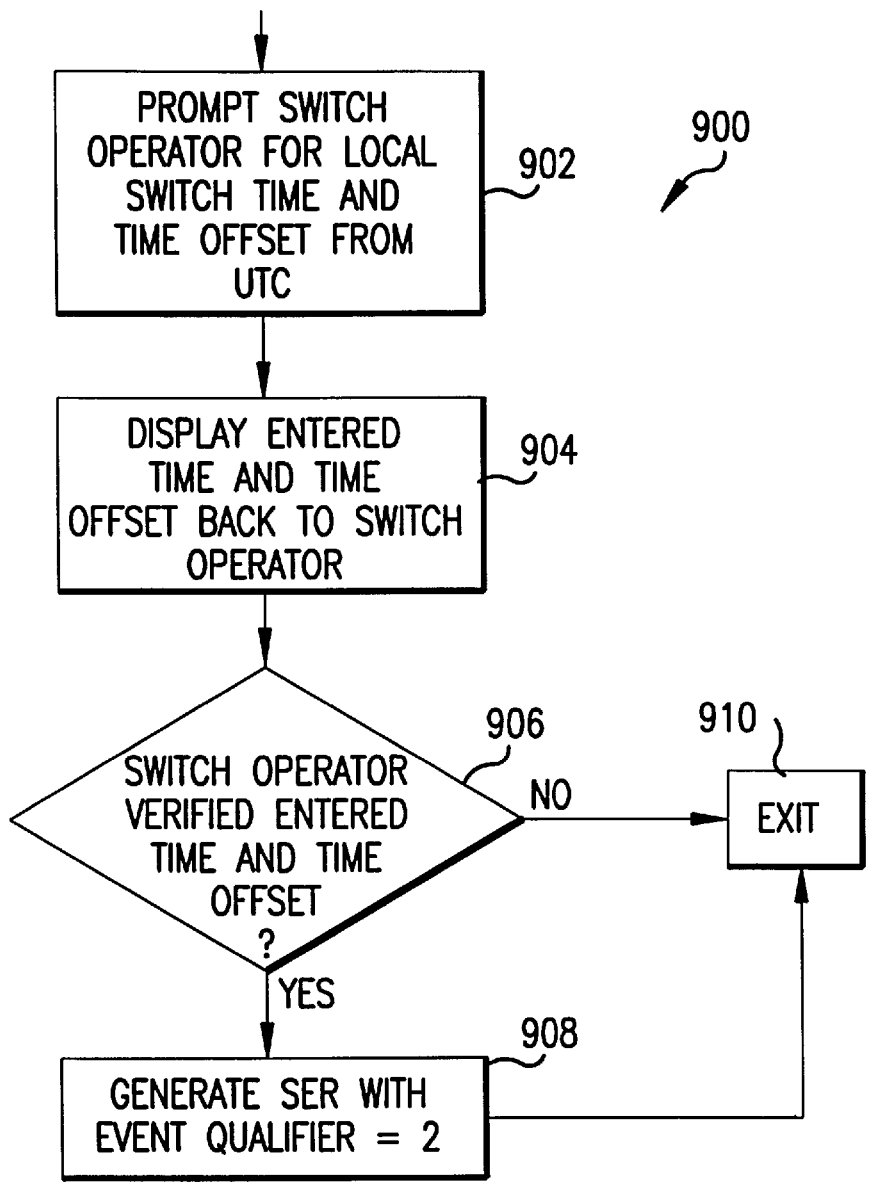
FIG. 9 is a control flow diagram illustrating the Change Time command.

Two commands are used when changing time. First, FIG. 9 illustrates the control flow of the Change Time command 900 which changes the Local Switch Time and the Time Offset. In FIG. 9, after a switch operator enters the Change Time command, the switch enters step 902 and prompts the switch operator for the Local Switch Time and Time Offset from UTC. In step 902 the switch operator enters a new Local Switch Time and Time Offset. Continuing to step 904, the new time and Time Offset are displayed back to the switch operator. Continuing to step 906, the switch operator must verify the entered time and Time Offset before the actual time and offset are changed on the switch. If in step 906 the switch operator verifies the changes, the switch proceeds to step 908 and generates a SER with an Event Qualifier equal to 2 which identifies that the change was made to the Local Switch Time and Time Offset of the switch. The billing center uses the SER for its bill processing. The switch proceeds to step 910 and exits the command. Referring back to step 906, if the switch operator does not verify the changes, the switch proceeds to step 910 and exits the command without updating the Local Switch Time and Time Offset. For more information on SER, see Table 5 in the Appendix.

Figure 10:
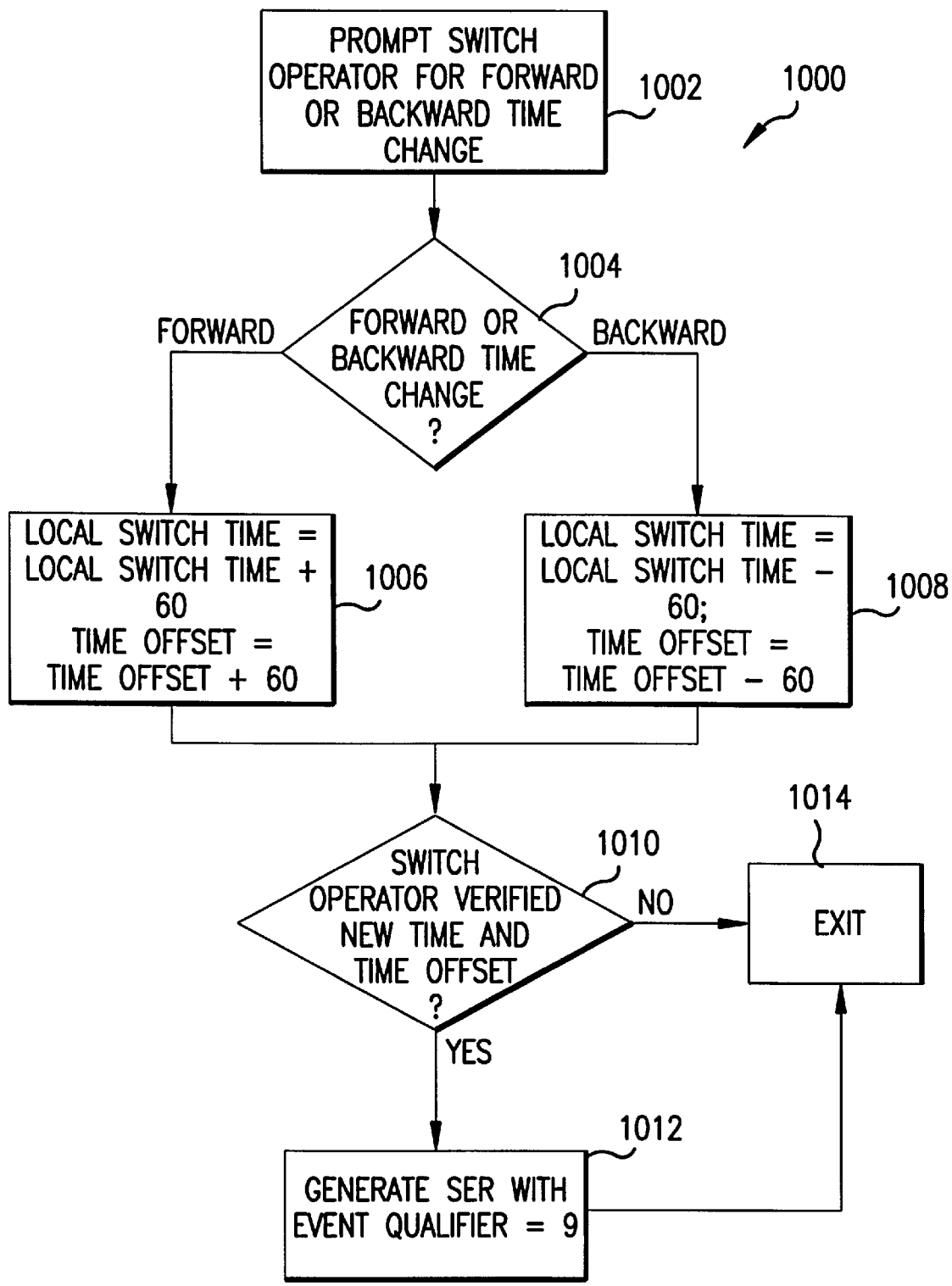
FIG. 10 is a control flow diagram illustrating the Change Daylight Savings Time command.

FIG. 10 illustrates the control flow for the Change Daylight Savings Time command 1000 which is the second command for changing time. In FIG. 10, after a switch operator enters the Change Daylight Savings Time command, the switch enters step 1002 and prompts the switch operator to select either a Forward or Backward time change. Continuing to step 1004, the switch operator makes a selection. In step 1004, if the switch operator selects the Forward option, the switch enters step 1006. In step 1006, the switch sets the Local Switch Time forward one hour and adds one hour (count of 60) to the Time Offset. The switch then proceeds to step 1010. Referring back to step 1004, if the switch operator selects the Backward option, the switch sets the Local Switch Time back one hour and subtract one hour (count of 60) from the Time Offset. The switch then proceeds to step 1010.

In step 1010, the switch operator must verify the forward or backward option and the new Local Switch Time and Time Offset before the actual time change takes place. If in step 1010, the switch operator verifies the new time and Time Offset, the switch proceeds to step 1012 and generates a SER with an Event Qualifier equal to 9 which changes the Local Switch Time and Time Offset of the switch. The switch proceeds to step 1014 and exits the command. Referring back to step 1010, if the switch operator does not verify the changes, the switch proceeds to step 1014 and exits the command without updating the Local Switch Time and Time Offset.

After the successful completion of a Change Daylight Savings Time Command, the billing records are affected by the new Time Offset. This embodiment allows the epoch time, used as the billing time, to increment normally through the daylight savings time change procedure, and not to be affected by the change of Local Switch Time and Time Offset.

b. Network Call Identifier

This invention provides a unique NCID that is assigned to each telephone call that traverses through the telecommunications network. Thus, the NCID is a discrete identifier among all network calls. The NCID is transported and recorded at each switch that is involved with the telephone call.

The originating switch of a telephone call generates the NCID. The chosen embodiment of the NCID of the present invention is an eighty-two (82) bit identifier that is comprised of the following subfields:

i) Originating Switch ID (14 bits): This field represents the NCS Switch ID as defined in the Office Engineering table at each switch. The SER call record, however, contains an alpha numeric representation of the Switch ID. Thus, a switch uses the alphanumeric Switch ID as an index into a database for retrieving the corresponding NCS Switch ID;

ii) Originating Trunk Group (14 bits): This field represents the originating trunk group as defined in the 32/64 word call record format described above;

iii) Originating Port Number (19 bits): This field represents the originating port number as defined in the 32/64 word call record format described above;

iv) Timepoint 1 (32 bits): This field represents the Timepoint 1 value as defined in the 32/64 word call record format described above; and v) Sequence Number (3 bits): This field represents the number of calls which have occurred on the same port number with the same Timepoint 1 (second) value. The first telephone call will have a sequence number set to '0.' This value increases incrementally for each successive call which originates on the same port number with the same Timepoint 1 value.

It would be readily apparent to one skilled in the relevant art to create an NCID of a different format.

Each switch records the NCID in either the 32 or 64 word call record format. Regarding the 32 word call record format, intermediate and terminating switches will record the NCID in the Authcode field of the 32 word call record if the Authcode filed is not used to record other information. In this case, the Originating Switch ID is the NCS Switch ID, not the alphanumeric Switch ID as recorded in the SER call record. If the Authcode is used for other information, the intermediate and terminating switches record the NCID in the 64 word call record format. In contrast, originating switches do not use the Authcode field when storing an NCID in a 32 word call record. Originating switches record the subfields of the NCID in the corresponding separate fields of the 32 word call record. That is, the Originating Switch ID is stored as an alphanumeric Switch ID in the Switch ID field of the SER call record; the Originating Trunk Group is stored in the Originating Trunk Group field of the 32 word call record; the Originating Port Number is stored in the Originating Port field of the 32 word call record; the Timepoint 1 is stored in the Timepoint 1 field of the 32 word call record; the Sequence Number is stored in the NCID Sequence Number field of the 32 word call record. The 32 word call record also includes a NCID Location (NCIDLOC) field to identify when the NCID is recorded in the Authcode field of the call record. If the NCID Location field contains a '1,' then the Authcode field contains the NCID. If the NCID Location field contains a '0,' then the NCID is stored in its separate sub-fields in the call record. Only intermediate and terminating switches set the NCID Location field to a '1' because originating switches store the NCID in the separate fields of the 32 word call record.

Regarding the 64 word call record format, the expanded call record includes a separate field, call the NCID field, to store the 82 bits of the NCID. This call record is handled the same regardless of whether an originating, intermediate, or terminating switch stores the NCID. In the 64 word call record format, the Originating Switch ID is the NCS Switch ID, not the alphanumeric Switch ID as recorded in the SER call record.

Figure 11:
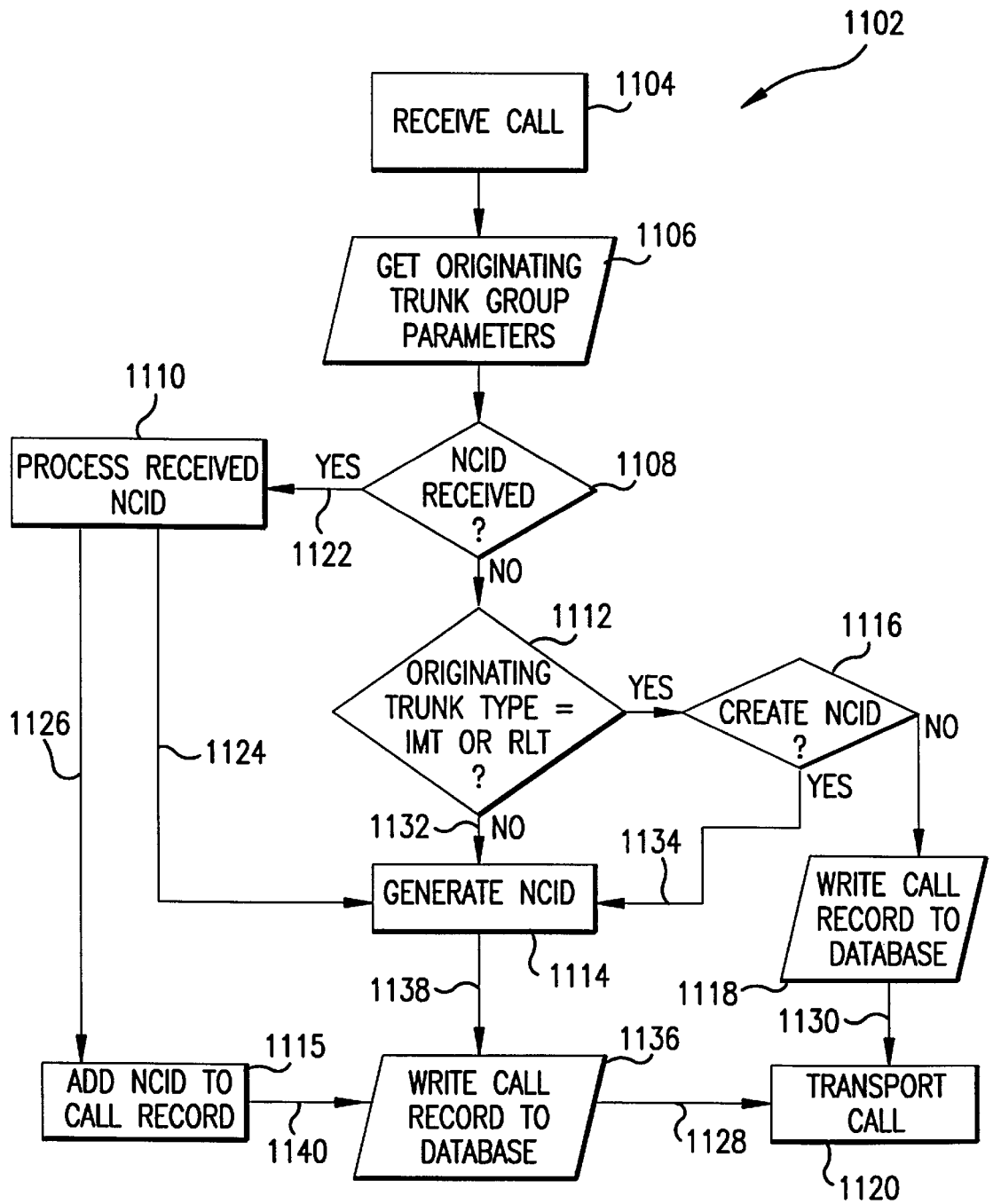
FIG. 11 is a control flow diagram illustrating the Network Call Identifier (NCID) switch call processing.

FIG. 11 illustrates the control flow of the Network Call Identifier switch call processing. A call 802 comes into a switch 106–110 (called the current switch for reference purposes; the current switch is the switch that is currently processing the call) at step 1104. In step 1104, the current switch receives the call 802 and proceeds to step 1106. In step 1106, the current switch accesses a local database and gets the trunk group parameters associated with the originating trunk group of the call 802. After getting the parameters, the current switch proceeds to step 1108. In step 1108, the current switch determines if it received an NCID with the call 802. If the current switch did not receive an NCID with the call 802, the switch continues to step 1112.

In step 1112, the switch analyzes the originating trunk group parameters to determine the originating trunk group type. If the originating trunk group type is an intermachine trunk (GMT) or a release link trunk (RLT), then the switch proceeds to step 1116. An IMT is a trunk connecting two normal telecommunication switches, whereas a RLT is a trunk connecting an intelligent service network (ISN) platform to a normal telecommunication switch. When the current switch reaches step 1116, the current switch knows that it is not an originating switch and that it has not received an NCID. In step 1116, the current switch analyzes the originating trunk group parameters to determine whether it is authorized to create an NCID for the call 802. In step 1116, if the current switch is not authorized to create an NCID for the call 802, the current switch proceeds to step 1118. When in step 1118, the current switch knows that it is not an originating switch, it did not receive an NCID for the call 802, but is not authorized to generate an NCID. Therefore, in step 1118, the current switch writes the call record associated with the call 802 to the local switch database and proceeds to step 1120. In step 1120, the current switch transports the call 802 out through the network with its associated NCID. Step 1120 is described below in more detail.

Referring again to step 1116, if the current switch is authorized to create an NCID for the call 802, the current switch proceeds to step 1114. In step 1114, the current switch generates a new NCID for the call 802 before continuing to step 1136. In step 1136, the current switch writes the call record, including the NCID, associated with the call 802 to the local switch database and proceeds to step 1120. In step 1120, the current switch transports the call 802 out through the network with its associated NCID. Step 1120 is described below in more detail.

Referring again to step 1112, if the current switch determines that the originating trunk group type is not an IMT or RLT, the current switch proceeds to step 1114. When reaching step 1114, the current switch knows that it is an originating switch and, therefore, must generate a NCID for the call 802. Step 1114 is described below in more detail. After generating a NCID in step 1114, the current switch proceeds to step 1136 to write the call record, including the NCID, associated with the call 802 to the local database. After writing the call record, the current switch proceeds to step 1120 to transport the call out through the network with its associated NCID. Step 1120 is also described below in more detail.

Referring again to step 1108, if the current switch determines that it received an NCID with the call 802, the current switch proceeds to step 1110. In step 1110, the current switch processes the received NCID. In step 1110, there are two possible results. First, the current switch may decide not to keep the received NCID thereby proceeding from step 1110 to step 1114 to generate a new NCID. Step 1110 is described below in more detail. In step 1114, the current switch may generate a new NCID for the call 802 before continuing to step 1136. Step 1114 is also described below in more detail. In step 1136, the current switch writes the call record associated with the call 802 to the local database. The current switch then proceeds to step 1120 and transports the call 802 out through the network with its associated NCID. Step 1120 is also described below in more detail.

Referring again to step 1110, the current switch may decide to keep the received NCID thereby proceeding from step 1110 to step 1115. In step 1115, the current switch adds the received NCID to the call record associated with the call 802. Steps 1110 and 1115 are described below in more detail. After step 1115, the current switch continues to step 1136 where it writes the call record associated with the call 802 to the local database. The current switch then proceeds to step 1120 and transports the call 802 out through the network with its associated NCID. Step 1120 is also described below in more detail.

Figure 12:
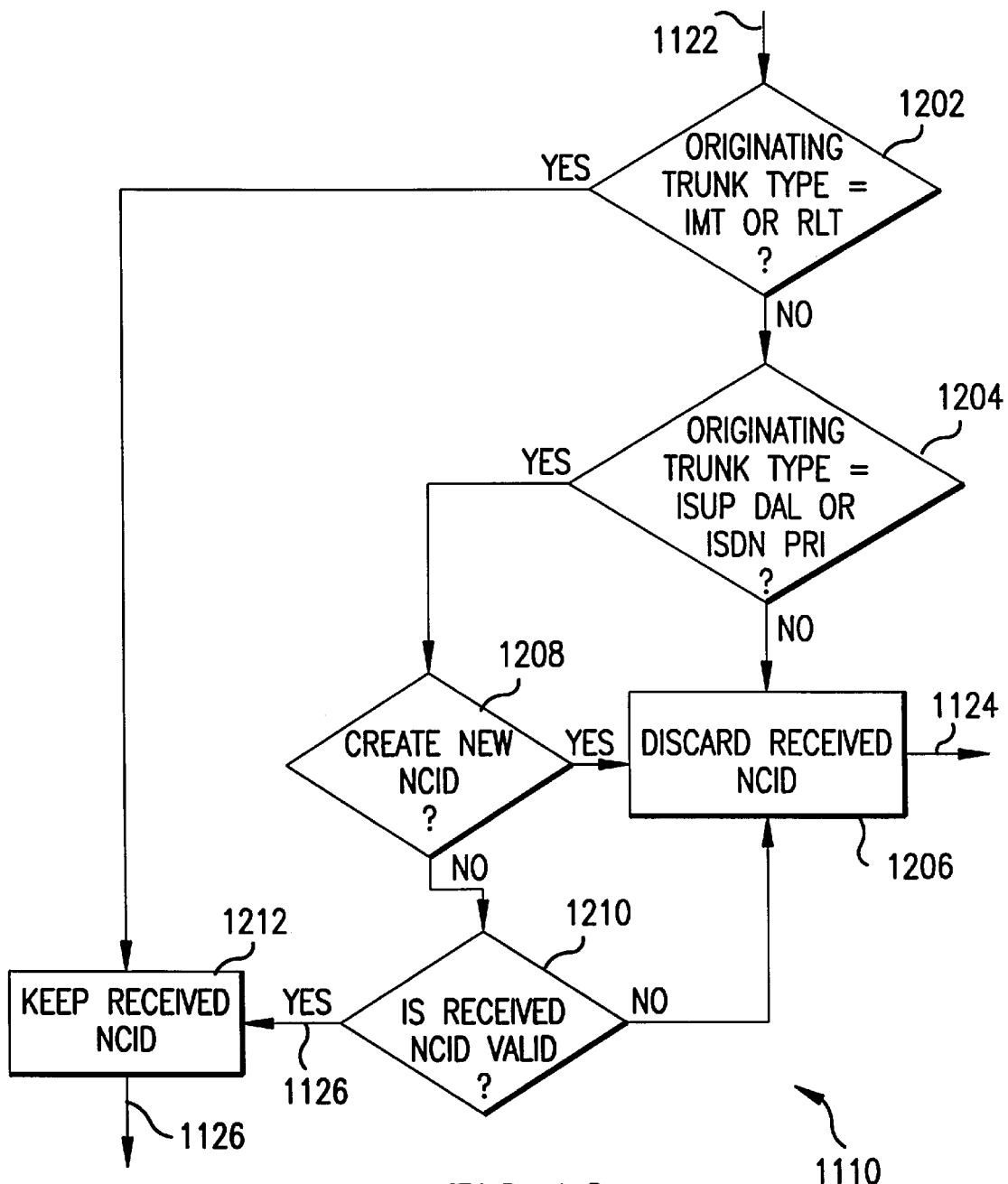
FIG. 12 is a control flow diagram illustrating the processing of a received Network Call Identifier.

FIG. 12 illustrates the control logic for step 1110 which processes a received NCID. The current switch enters step 1202 of step 11 10 when it determines that an NCID was received with the call 802. In step 1202, the current switch analyzes the originating trunk group parameters to determine the originating trunk group type. If the originating trunk group type is an IMT or RLT, then the current switch proceeds to step 1212. When in step 1212, the current switch knows that it is not an originating switch and that it received an NCID for the call 802. Therefore, in step 1212, the current switch keeps the received NCID and exits step 1110, thereby continuing to step 1115 in FIG. 11 where the current switch will store the received NCID in the call record and transport the call.

Referring again to step 1202, if the originating trunk group type is not an IMT or RLT, the current switch proceeds to step 1204. In step 1204, the current switch determines if the originating trunk group type is an Integrated Services User Parts Direct Access Line (ISUP DAL) or an Integrated Services Digital Network Primary Rate Interface (ISDN PRI). ISUP is a signalling protocol which allows information to be sent switch-to-switch as information parameters. An ISUP DAL is a trunk group that primarily is shared by multiple customers of the network, but can also be dedicated to a single network customer. In contrast, an ISDN PRI is a trunk group that primarily is dedicated to a single network customer, but can also be shared by multiple network customers. A network customer is an entity that leases network resources. In step 1204, if the current switch determines that the trunk group type is not an ISUP DAL or ISDN PRI, the current switch proceeds to step 1206. When in step 1206, the current switch knows that it received an NCID that was not generated by a switch that is part of the telecommunication network or by a switch that is a customer of the network. Therefore, in step 1206, the current switch discards the received NCID because it is an unreliable NCID. From step 1206, the current switch exits step 1110, thereby continuing to step 1114 in FIG. 11 where the current switch will create a new NCID and transport that NCID with the call 802.

Referring back to step 1204, if the current switch determines that the originating trunk group type is an ISUP DAL or ISDN PRI, the current switch continues to step 1208. When in step 1208, the current switch knows that it received an NCID from a customer trunk group. Therefore, the current switch analyzes the originating trunk group parameters to determine whether it is authorized to create a new NCID for the call 802. The current switch may be authorized to create a new NCID and overwrite the NCID provided by the customer to ensure that a valid NCID corresponds to the call 802 and is sent through the network. In step 1208, if the current switch is not authorized to create a new NCID for the call 802, the current switch proceeds to step 1210. In step 1210, the current switch checks the validity of the received NCID, for example, the NCID length. If the received NCID is invalid, the current switch proceeds to step 1206. In step 1206, the current switch discards the invalid NCID. From step 1206, the current switch exits step 1110, thereby continuing to step 1114 in FIG. 11 where the current switch will create a new NCID and transport that NCID with the call 802.

Referring again to step 1210, if the current switch determines that the received NCID is valid, the current switch proceeds to step 1212. In step 1212 the current switch keeps the received NCID and exits step 1110, thereby continuing to step 1115 in FIG. 11 where the current switch will store the received NCID in the call record and transport the call.

Figure 13A:
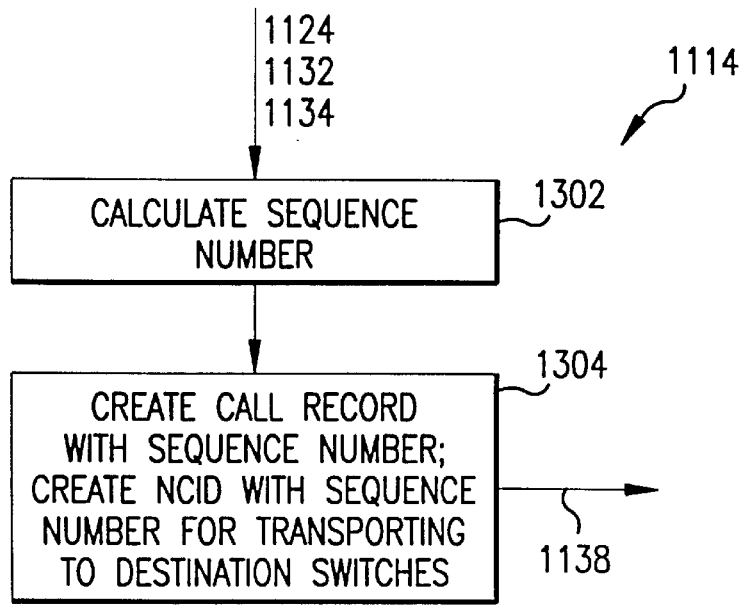
FIG. 13(A) is a control flow diagram illustrating the generating of a Network Call Identifier.

FIG. 13(A) illustrates the control logic for step 1114 which generates an NCID. The current switch enters step 1302 when an NCID must be created. In step 1302, the current switch will calculate a sequence number. The sequence number represents the number of calls which have occurred on the same port number with the same Timepoint 1 value. The first call has a sequence number value of '0,' after which the sequence number will increase incrementally for each successive call that originates on the same port number with the same Timepoint 1 value. After creating the sequence number in step 1302, the current switch proceeds to step 1304. In step 1304, the current switch creates a call record for the call 802 including in it the call's 802 newly created NCID. After the call record has been created, the current switch exits step 1114 and proceeds to step 1136 in FIG. 11 where the current switch writes the call record to the local switch database.

Figure 13B:
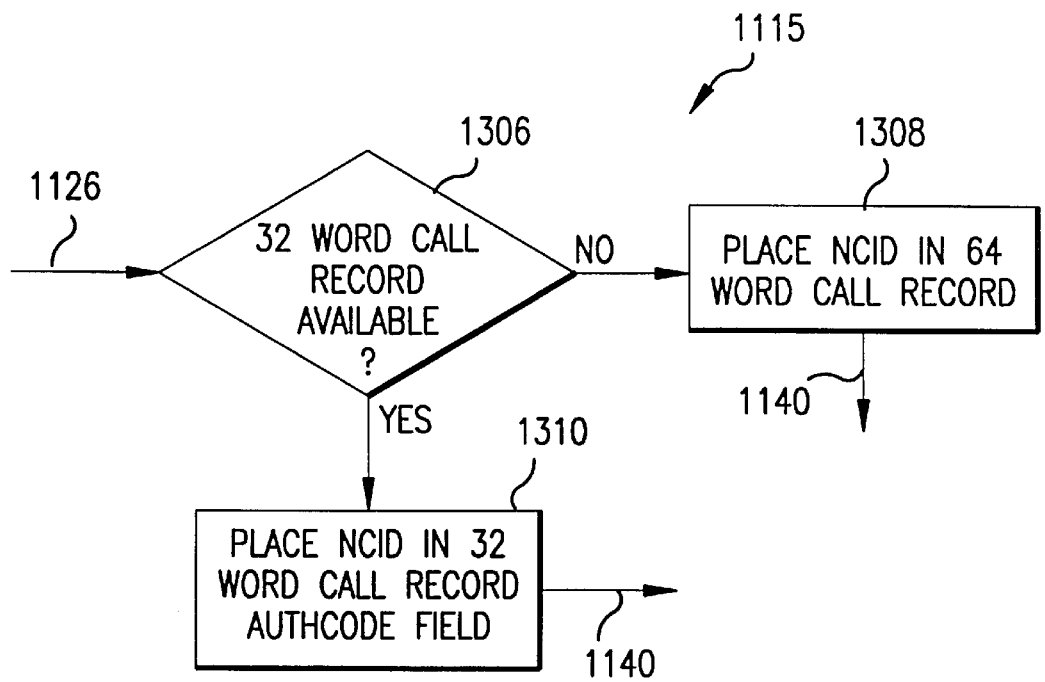
FIG. 13(B) is a control flow diagram illustrating the adding of a Network Call Identifier to a call record.

FIG. 13(B) illustrates the control logic for step 1115 which adds a received NCID to the call record associated with the call 802. Upon entering step 1115, the current switch enters step 1306. When in step 1306, the current switch knows that it has received a valid NCID from an intermediate or terminating switch, or from a customer switch. In step 1306, the current switch determines if the Authcode field of the 32 word call record is available for storing the NCID. If the Authcode field is available, the current switch proceeds to step 1310. In step 13 10, the current switch stores the NCID in the Authcode field of the 32 word call record. The current switch must also set the NCID Location field to the value '1' which indicates that the NCID is stored in the Authcode field. After step 13 10, the current switch exits step 1115 and continues to step 1136 in FIG. 11 where the current switch writes the call record to the local switch database.

Referring again to step 1306, if the Authcode field is not available in the 32 word call record, the current switch proceeds to step 1308. In step 1308, the current switch stores the NCID in the NCID field of the 64 word call record. After step 1308, the current switch exits step 1115 and continues to step 1136 in FIG. 11 where the current switch writes the call record to the local switch database.

Figure 14:
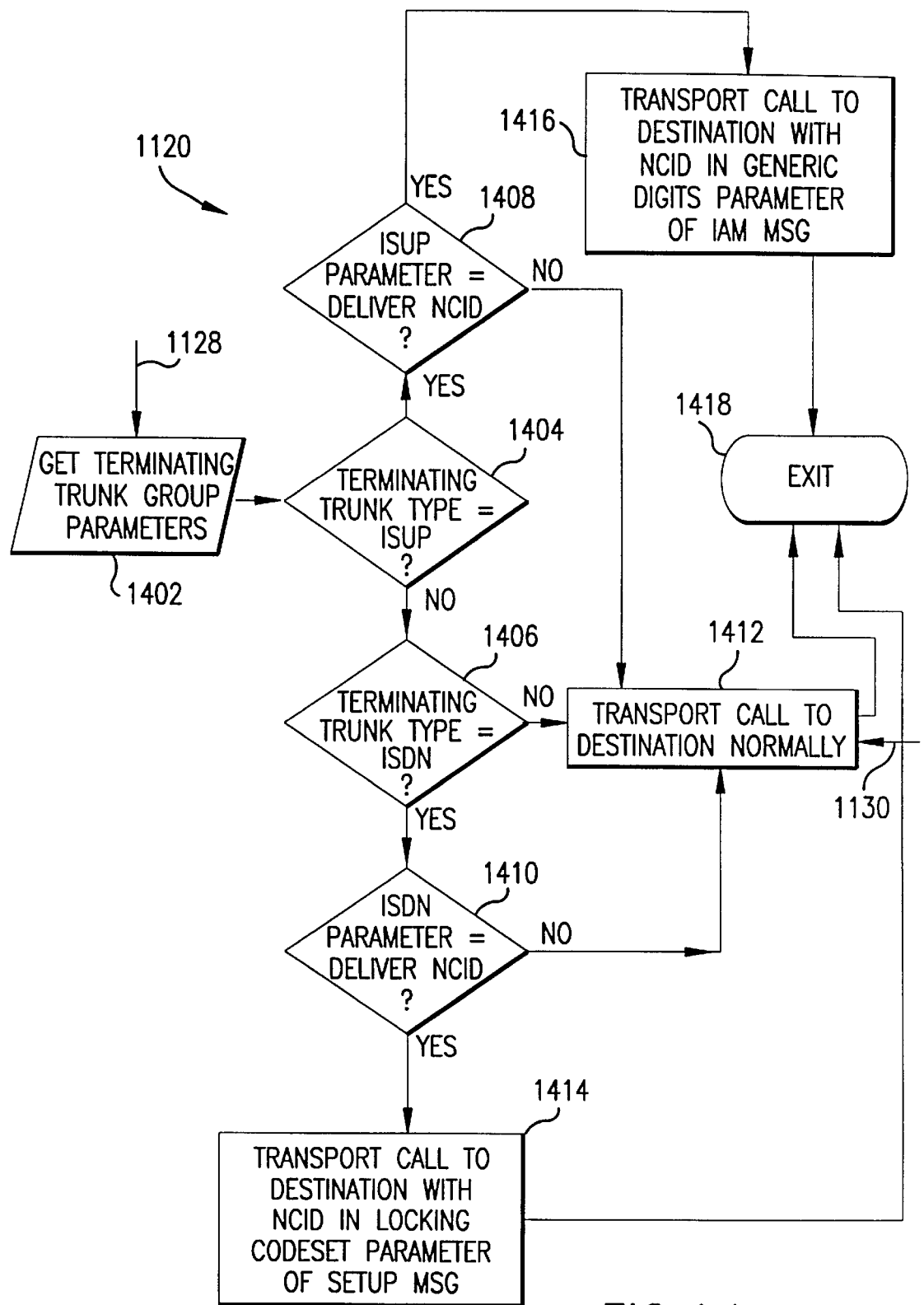
FIG. 14 is a control flow diagram illustrating the transporting of a call.

FIG. 14 illustrates the control logic for step 1120 which transports the call from the current switch. There are two entry points for this control logic: steps 1402 and 1412. Upon entering step 1402 from step 1136 on FIG. 11, the current switch knows that it has created an NCID or has received a valid NCID. In step 1402, the current switch accesses a local database and gets the trunk group parameters associated with the terminating trunk group for transporting the call 802. After getting the parameters, the current switch proceeds to step 1404. In step 1404, the current switch determines the terminating trunk group type. If the terminating trunk is an ISUP trunk, the current switch proceeds to step 1408. In step 1408, the current switch analyzes the parameters associated with the ISUP trunk type to determine whether or not to deliver the NCID to the next switch. If the current switch is authorized to deliver the NCID, the current switch proceeds to step 1416. In step 1416, the current switch transports the call to the next switch along with a SS7 initial address message (IAM). The NCID is transported as part of the generic digits parameter of the IAM. The IAM contains setup information for the next switch which prepares the next switch to accept and complete the call 802. The format of the generic digits parameter is shown below in Table 6:

TABLE 6

Generic Digits Parameter:
  Code: 11000001
  Type: 0

| Byte #, Bit # | Description |
| --- | --- |
| byte 1, bits 0–4 | Type of Digits : Indicates the contents of the parameter. This field has a binary value of '11011' to indicate that the parameter contains the NCID. |
| byte 1, bits 5–7 | Encoding Scheme: Indicates the format of the parameter contents. This field has a binary value of '011' to indicate that the NCID is stored in the binary format. |
| byte 2, bits 0–7 | Originating Switch ID |

TABLE 6-continued

Generic Digits Parameter:
Code: 11000001
Type: 0

| Byte #, Bit # | Description |
|---|---|
| byte 3, bits 0–5 | |
| byte 3, bits 6–7 | Originating Trunk Group |
| byte 4, bits 0–7 | |
| byte 5, bits 0–3 | |
| byte 5, bits 4–7 | Originating Port Number |
| byte 6, bits 0–7 | |
| byte 7, bits 0–6 | |
| byte 7, bit 7 | Not Used |
| byte 8, bits 0–7 | Timepoint 1 |
| byte 9, bits 0–7 | |
| byte 10, bits 0–7 | |
| byte 11, bits 0–7 | |
| byte 12, bits 0–2 | NCID Sequence Number |
| byte 12, bits 3–7 | Not Used |

After transporting the call 802 and the IAM, the current switch proceeds to step 1418, thereby exiting the switch processing.

Referring again to step 1408, if the current switch is not authorized to deliver the NCID to the next switch in an IAM message, the current switch proceeds to step 1412. In step 1412, the current switch transports the call 802 to the next switch under normal procedures which consists of sending an IAM message to the next switch without the NCID recorded as part of the generic digits parameter. After transporting the call 802, the current switch proceeds to step 1418, thereby exiting the switch processing.

Referring again to step 1404, if the current switch determines that the terminating trunk is not an ISUP, the current switch proceeds to step 1406. In step 1406, the current switch determines if the terminating trunk group is an ISDN trunk (the terminating trunk group is dedicated to one network customer). If the terminating trunk group is an ISDN, the current switch proceeds to step 1410. In step 1410, the current switch analyzes the parameters associated with the ISDN trunk group type to determine whether or not to deliver the NCID to the next switch. If the current switch is authorized to deliver the NCID, the current switch proceeds to step 1414. In step 1414, the current switch transports the call to the next switch along with a setup message. The setup message contains setup information for the next switch which prepares the next switch to accept and complete the call 802. The NCID is transported as part of the locking shift codeset 6 parameter of the setup message. The format of the locking shift codeset 6 parameter is shown below in Table 7:

TABLE 7

Locking Shift Codeset 6 Parameter:
Code: 11000001
Type: 0

| Byte #, Bit # | Description |
|---|---|
| byte 1, bits 0–4 | Type of Digits: Indicates the contents of the parameter. This field has a binary value of '11011' to indicate that the parameter contains the NCID. |
| byte 1, bits 5–7 | Encoding Scheme: Indicates the format of the parameter contents. |

TABLE 7-continued

Locking Shift Codeset 6 Parameter:
Code: 11000001
Type: 0

| Byte #, Bit # | Description |
|---|---|
| | This field has a binary value of '011' to indicate that the NCID is stored in the binary format. |
| byte 2, bits 0–7 | Originating Switch ID |
| byte 3, bits 0–5 | |
| byte 3, bits 6–7 | Originating Trunk Group |
| byte 4, bits 0–7 | |
| byte 5, bits 0–3 | |
| byte 5, bits 4–7 | Originating Port Number |
| byte 6, bits 0–7 | |
| byte 7, bits 0–6 | |
| byte 7, bit 7 | Not Used |
| byte 8, bits 0–7 | Timepoint 1 |
| byte 9, bits 0–7 | |
| byte 10, bits 0–7 | |
| byte 11, bits 0–7 | |
| byte 12, bits 0–2 | NCID Sequence Number |
| byte 12, bits 3–7 | Not Used |

After transporting the call 802 and the setup message, the current switch proceeds to step 1418, thereby exiting the switch processing.

Referring again to step 1410, if the current switch determines that it does not have authority to deliver the NCID to the next switch in a setup message, the current switch proceeds to step 1412. In step 1412, the current switch transports the call 802 to the next switch under normal procedures a setup message to tnding a setup message to the next switch without the NCID recorded as part of the locking shift codeset 6 parameter. After transporting the call 802, the current switch proceeds to step 1418, thereby exiting the switch processing.

Referring again to step 1412, this step is also entered from step 1118 on FIG. 11 when the current switch did not receive an NCID, is an intermediate or terminating switch, and is not authorized to create an NCID. In this case, in step 1412, the current switch also transports the call 802 to the next switch under normal procedures which consists of sending an IAM or setup message to the next switch without the NCID recorded as part of the parameter. After transporting the call 802, the current switch proceeds to step 1418, thereby exiting the switch processing.

While various embodiments of the present invention have been described above, it should be understood that they have been presented by the way of example only, and not limitation. If it will be understood by those skilled in the art that various changes in form and details may be made therein without departing from the spirit and scope of the invention as defined in the appended claims. Thus, the breadth and scope of the present invention should not be limited by any of the above-described exemplary embodiments, but should be defined only in accordance with the following claims and their equivalents.

TABLE 1

APPENDIX
CDR/PNR Record Format:

| Word #, Bit # | Description |
| --- | --- |
| Word 0, bits 0–3 | Call Record Id (CRID): Identifies the record type.<br>0 = Default<br>1 = CDR<br>2 = SER<br>3 = PNR<br>4 = OSR<br>5 = POSR<br>6 = ECDR<br>7 = EPNR<br>8 = EOSR<br>9 = EPOSR<br>10–15 = Not Used |
| Word 0, bits 4–15 | Call Disconnect ID (CDID): Identifies the call record. Each call record has a unique ID number. These 12 bits contain the 12 least significant bits of the CDID. |
| Word 1, bits 0–15<br>Word 2, bits 0–15 | Timepoint 1 (TP1): A binary count of the number of seconds that occurred between midnight (UTC) on January 1, 1976, and the time that the incoming call was detected by the switch. |
| Word 3, bits 0–12 | Timepoint 3 (TP3): A binary count of the number of seconds between Timepoint 1 and the time the outgoing signaling protocol was completed; that is, the number of seconds that it took for the switch to connect to the outgoing trunk. |
| Word 3, bits 13–15<br>Word 4, bits 0–9 | Timepoint 6 (TP6): A binary count of the number of seconds between timepoint 1 and the time Answer Supervision was detected or received. This is the time that it took for the call to be answered by the person or audio system being called. |
| Word 4, bits 10–15<br>Word 5, bits 0–15 | Timepoint 7 (TP7): A binary count of the number of seconds between timepoint 1 and the time that the originating or terminating party disconnected whichever is first. |
| Word 6, bits 0–15<br>Word 7, bit 0 | Originating Port (OP): The absolute port number of the originating truck. Originating truck is the line on which the call came to the switch. |
| Word 7, bits 1–15<br>Word 8, bits 0–1 | Terminating Port (TP): The absolute port number of the last terminating trunk seized for an outgoing call attempt. The terminating trunk is the last line on which the call is transmitted. |
| Word 8, bits 2–14 | Originating Trunk Group (OTG): A binary number expressing the Originating Trunk Group number of the originating trunk. An originating trunk group is a group of ports coming from the same location. |
| Word 8, bit 15<br>Word 9, bits 0–11 | Terminating Trunk Group (TTG): A binary number expressing the Terminating Trunk Group number of the Terminating trunk. A terminating trunk group is a group of ports going to the same location. If a call fails because no trunks are available, record the last trunk group number that was attempted. |
| Word 9, bits 12–15 | Timepoint 3 qualifier (TP3Q): Contains the outpulsed call disposition qualifier which provides the telephone number of the person making the call to the person being called. The person being called needs to have signed up for the "ANI Delivery" service and have a display device for displaying the caller's telephone number.<br>0 = Default<br>1 = ANI/CSI was delivered<br>2 = DNIS was delivered<br>3 = ANI/CSI and DNIS were delivered<br>4–5 = Not Used<br>6 = NCT<br>7 = NCT, ANI/CSI was delivered<br>8 = NCT, DNIS was delivered<br>9 = NCT, ANI/CSI and DNIS was delivered<br>10 = NCT Tandem<br>11–15 = Not Used |
| Word 10, bits 0–1 | Timepoint 6 qualifier (TP6Q): Contains the answer supervision qualifier indicating the way in which the telephone call was answered.<br>0 = Hardware detected an Answer<br>1 = Software detected Voice<br>2 = Not Used<br>3* = Operator/NARS detected an Answer<br>*Not Used in CDR/PNR |
| Word 10, bits 2–7 | Action Code (AC): The switch provides an action code which indicates the type of destination address, or what type of telephone number was called, or an error code.<br>0 = Default<br>1 = 7-digit number without overflow |

TABLE 1-continued

APPENDIX
CDR/PNR Record Format:

| Word #, Bit # | Description |
|---|---|
| | 2 = 7-digit number with overflow |
| | 3 = DDD number |
| | 4 = IDDD number |
| | 5 = Switch generated Action Code |
| | 6 = Incoming exclusion failure |
| | 7 = ID code failure |
| | 8 = Unexpected error occurs in the NCS/DAP |
| | 9 = Misdialed number and the NCS/DAP is unable to translate the dialed number |
| | 10 = 10-digit number without overflow |
| | 11 = 10-digit number with overflow |
| | 12 = National with overflow |
| | 13 = International with overflow |
| | 14 = ANI not found |
| | 15 = NPA-NXXX not found |
| | 16 = Pilot number not found |
| | 17 = Associated partition not found |
| | 18 = ADF format error |
| | 19 = Switch ID not found |
| | 20 = 800 number not found |
| | 21 = 800 number out of band |
| | 22 = 800 number no longer in service |
| | 23 = Invalid ID code |
| | 24 = Range privilege |
| | 25 = 7-digit number not in database |
| | 26 = 10-digit exclusion feature |
| | 27 = 900 number not found |
| | 28 = 900 number out of band |
| | 29 = 900 number no longer in service |
| | 30 = NCS network management blocked |
| | 31 = NCS Gate denial |
| | 32 = FlexSTC, Overflow Not Allowed |
| | 33 = FlexSTC, Overflow Allowed |
| | 34 = SAC Number Not Found |
| | 35 = SAC Number Out of Band |
| | 36 = 700 Number Not Found |
| | 37 = 700 Number Out of Band |
| | 38 = ICR designated Out of Band |
| | 39 = NCT - Reversed Call Direction |
| | 40–49 = Not Used |
| | 50 = Flexible Direct Termination Call without overflow |
| | 51 = Flexible Direct Termination Call with overflow |
| | 52 = Outbound IVNet without overflow |
| | 53 = Outbound IVNet with overflow |
| | 54 = Global Switch Profile Not Found |
| | 55 = ANI Index Provided by DAP |
| | 56–62 = Not Used |
| | 63 = International Inbound AAP |
| Word 10, bits 8–11 | Originating Trunk Class (OTC): Indicates what type of originating trunk was accessed. |
| | 0 = ONAL (FG-A) |
| | 1 = ONAT (FG-B, FG-C, FG-D, CAMA, LAMA) |
| | 2 = DAL, VNET CAMA, FGS-DAL |
| | 3 = IMT (Inband or SS7) |
| | 4 = Internation Circuit (R1, R2, #5, #6, #7) |
| | 5 = ISDN PRI |
| | 6 = OST |
| | 7–15 = Not Used |
| | FG = Feature Group |
| Word 10, bits 12–15 | Terminating Trunk Class (TTC): Indicates what type of terminating trunk was accessed. |
| | 0 = ONAL (FG–A) |
| | 1 = ONAT (FG–B, FG-C, FG-D, CAMA, LAMA) |
| | 2 = DAL, VNET CAMA, FGS-DAL |
| | 3 = IMT(In band or SS7) |
| | 4 = Internation Circuit #1, #, #5, #6, #7) |
| | 5 = ISDN PRI |
| | 6 = OST |
| | 7–15 = Not Used |
| | FG = Feature Group |
| Word 11, bits 0–7 | Information Digits (ID): The switch receives these digits from the originating trunk group indicating the type of telephone on which the telephone call originated, such as a home telephone, pay telephone, or prison telephone. |

TABLE 1-continued

APPENDIX
CDR/PNR Record Format:

| Word #, Bit # | Description |
|---|---|

|  | | FG-B Direct, CAMA | FG-D | MCI IMT | #5 | #6 |
|---|---|---|---|---|---|---|
|  | bits 0–3: | TBCD-Null | X | X | TBCD-Null | X |
|  | bits 4–7: | X | X | X | X | X |

| Word #, Bit # | Description |
|---|---|
| Word 11, bits 8–15 | Automatic Number Identification (ANI) Index Number: The index number is obtained from the ANI Index Table for all calls except 800 calls. The ANI number is looked up to determine whether the caller is a VNet customer or not. If the caller is a VNet caller, the index number is used to looked up the destination address. |
| Word 12, bits 0–15<br>Word 13, bits 0–15<br>Word 14, bits 0–7 | Call Location ID (CLI): Represents the 10 digits from where the call came. If switch receives more than 10 digits, record them in the ECDR/EPNR. There are nine (9) types of calling location:<br>1. VNet CAMA DAL originations: If CSI is available, prefix the CSI with filed HNPA and HNXX information, if available, and record. Use NOCLI value of 7.<br>2. FG–C originations: If ANI or CSI information is not available and the number is in the 00Y+NXX+XXXX format, record the 00Y in CLI1-3, and record the OSID/OTG in CLI4-10. Use NOCLI value of 8.<br>3. Inband FG-D Originations : Record the ANI that was received starting with CLI1. Use NOCLI value of 1.<br>4. SS7 FG-D Originations: Record the charge number, if available. If not available, record the calling party number. Use NOCLI value of 2 or 3.<br>5. International originations: Record the country code and the national number of the calling party. Use NOCLI of 9.<br>6. SS7 IMTs Originations: Record the following information in this order of importance: 1) charge number, 2) calling party number, 3) OSID/OTG from generic digits. Use NOCLI of 2, 3, or 8.<br>7. SS7 Reseller Originations: The CLI field is filled with TBCD-Nulls.<br>8. SS7 Private Network Originations: The CLI field is filled with TBCD-Nulls.<br>9. PRI Organizations: Record the calling party number received in the ISDN setup message.<br>The format: |

|  | 1–10 digit ANI | OSID/OTG | Incoming Int'l |
|---|---|---|---|
| Word 12, bits 0–3 | CLI1 | TBCD Null | X(CC) |
| Word 12, bits 4–7 | CLI2 | TBCD Null | X(CC) |
| Word 12, bits 8–11 | CLI3 | TBCD Null | X(CC) |
| Word 12, bits 12–15 | CLI4 | X(OSID) | X(NN) |
| Word 13, bits 0–3 | CLI5 | X(OSID) | X(NN) |
| Word 13, bits 4–7 | CLI6 | X(OSID) | X(NN) |
| Word 13, bits 8–11 | CLI7 | X(OTG) | X(NN) |
| Word 13, bits 12–15 | CLI8 | X(OTG) | X(NN) |
| Word 14, bits 0–3 | CLI9 | X(OTG) | X(NN) |
| Word 14, bits 4–7 | CLI10 | X(OTG) | X(NN) |

CC = Customer Connect
NN = National Number
OSID = Originating Switch NSC ID (000–999)
OTG = Originating Trunk Group (0000–8191)

| Word #, Bit # | Description |
|---|---|
| Word 14, bits 8–15<br>Word 15, bits 0–15<br>Word 16, bits 0–15<br>Word 17, bits 0–15<br>Word 18, bits 0–15<br>Word 19, bits 0–15 | Authorization Codes: Represents 22 digits of who gets billed for the call which includes one or more of the following and/or an optional Supplementary Code:<br><br>1. Authorization Code - Contains the authorization code digits. AUTH1–AUTH5 records the dialed or filed authorization codes, afterwhich is recorded an optional variable 1–4 digit security code, SEC1–SEC4, comprised of TBCD digits 0–9 and A–D. After the last digit, record a TBCD–Null, after which record any supplementary code digits, SUPP1–SUPP12. Record TBCD-Null in any unused byte. Authorization Code format: |

|  |  | 5 digit Auth Code | 6 digit Auth Code | 7 digit Auth Code |
|---|---|---|---|---|
| Word 14, bits 8–11 | A1 | AUTH1 | AUTH1 | AUTH1 |
| Word 14, bits 12–15 | A2 | AUTH2 | AUTH2 | AUTH2 |
| Word 15, bits 0–3 | A3 | AUTH3 | AUTH3 | AUTH3 |
| Word 15, bits 4–7 | A4 | AUTH4 | AUTH4 | AUTH4 |
| Word 15, bits 8–11 | A5 | AUTH5 | AUTH5 | AUTH5 |
| Word 15, bits 12–15 | A6 | SEC1 | AUTH6 | AUTH6 |
| Word 16, bits 0–3 | A7 | SEC2 | SEC1 | AUTH7 |

TABLE 1-continued

APPENDIX
CDR/PNR Record Format:

Word #, Bit #  Description

| Word #, Bit # | | | | |
|---|---|---|---|---|
| Word 16, bits 4–7 | A8 | SEC3 | SEC2 | SEC1 |
| Word 16, bits 8–11 | A9 | SEC4 | SEC3 | SEC2 |
| Word 16, bits 12–15 | A10 | TBCD-Null | SEC4 | SEC3 |
| Word 17, bits 0–3 | A11 | SUPP1 | TBCD-Null | SEC4 |
| Word 17, bits 4–7 | A12 | SUPP2 | SUPP1 | TBCD-Null |
| Word 17, bits 8–11 | A13 | SUPP3 | SUPP2 | SUPP1 |
| Word 17, bits 12–15 | A14 | SUPP4 | SUPP3 | SUPP2 |
| Word 18, bits 0–3 | A15 | SUPP5 | SUPP4 | SUPP3 |
| Word 18, bits 4–7 | A16 | SUPP6 | SUPP5 | SUPP4 |
| Word 18, bits 8–11 | A17 | SUPP7 | SUPP6 | SUPP5 |
| Word 18, bits 12–15 | A18 | SUPP8 | SUPP7 | SUPP6 |
| Word 19, bits 0–3 | A19 | SUPP9 | SUPP8 | SUPP7 |
| Word 19, bits 4–7 | A20 | SUPP10 | SUPP9 | SUPP8 |
| Word 19, bits 8–11 | A21 | SUPP11 | SUPP10 | SUPP9 |
| Word 19, bits 12–15 | A22 | SUPP12 | SUPP11 | SUPP10 |

2. Calling Station ID (CSI) –Contains the digits of the calling station identifier. The CSI digits will be recorded starting at A1. A TBCD-Null is recorded after the last CSI digit, followed by Supplemental Code digits. Unused bytes contain a TBCD-Null. Calling Station ID format:

| | | 7 digit CSI | 10 digit CSI |
|---|---|---|---|
| Word 14, bits 8–11 | A1 | X | X |
| Word 14, bits 12–15 | A2 | X | X |
| Word 15, bits 0–3 | A3 | X | X |
| Word 15, bits 4–7 | A4 | X | X |
| Word 15, bits 8–11 | A5 | X | X |
| Word 15, bits 12–15 | A6 | X | X |
| Word 16, bits 0–3 | A7 | X | X |
| Word 16, bits 4–7 | A8 | TBCD-Null | X |
| Word 16, bits 8–11 | A9 | SUPP1 | X |
| Word 16, bits 12–15 | A10 | SUPP2 | X |
| Word 17, bits 0–3 | A11 | SUPP3 | TBCD-Null |
| Word 17, bits 4–7 | A12 | SUPP4 | SUPP1 |
| Word 17, bits 8–11 | A13 | SUPP5 | SUPP2 |
| Word 17, bits 12–15 | A14 | SUPP6 | SUPP3 |
| Word 18, bits 0–3 | A15 | SUPP7 | SUPP4 |
| Word 18, bits 4–7 | A16 | SUPP8 | SUPP5 |
| Word 18, bits 8–11 | A17 | SUPP9 | SUPP6 |
| Word 18, bits 12–15 | A18 | SUPP10 | SUPP7 |
| Word 19, bits 0–3 | A19 | SUPP11 | SUPP8 |
| Word 19, bits 4–7 | A20 | SUPP12 | SUPP9 |
| Word 19, bits 8–11 | A21 | SUPP13 | SUPP10 |
| Word 19, bits 12–15 | A22 | SUPP14 | SUPP11 |

3. Supplementary Codes - Supplemental Codes are recorded starting in A1. Unused bytes contain TBCD-Null. Supplementary Code format:

| | | 800/900 VNet Supp. Codes |
|---|---|---|
| Word 14, bits 8–11 | A1 | SUPP1 |
| Word 14, bits 12–15 | A2 | SUPP2 |
| Word 15, bits 0–3 | A3 | SUPP3 |
| Word 15, bits 4–7 | A4 | SUPP4 |
| Word 15, bits 8–11 | A5 | SUPP5 |
| Word 15, bits 12–15 | A6 | SUPP6 |
| Word 16, bits 0–3 | A7 | SUPP7 |
| Word 16, bits 4–7 | A8 | SUPP8 |
| Word 16, bits 8–11 | A9 | SUPP9 |
| Word 16, bits 12–15 | A10 | SUPP10 |
| Word 17, bits 0–3 | A11 | SUPP11 |
| Word 17, bits 4–7 | A12 | SUPP12 |
| Word 17, bits 8–11 | A13 | SUPP13 |
| Word 17, bits 12–15 | A14 | SUPP14 |
| Word 18, bits 0–3 | A15 | SUPP15 |
| Word 18, bits 4–7 | A16 | SUPP16 |
| Word 18, bits 8–11 | A17 | SUPP17 |
| Word 18, bits 12–15 | A18 | SUPP18 |
| Word 19, bits 0–3 | A19 | SUPP19 |
| Word 19, bits 4–7 | A20 | SUPP20 |
| Word 19, bits 8–11 | A21 | SUPP21 |
| Word 19, bits 12–15 | A22 | SUPP22 |

4. VNet Remote Access - If the caller accesses VNet services through the Remote Access Service, the access number is recorded starting at A1. A TBCD-Null is recorded after the last digit

TABLE 1-continued

APPENDIX
CDR/PNR Record Format:

| Word #, Bit # | Description |
|---|---| followed by any Supplemental Codes. Unused bytes contain TBCD-Null. VNet Remote Access format:

| | | |
|---|---|---|
| Word 14, bits 8–11 | A1 | X |
| Word 14, bits 12–15 | A2 | S |
| Word 15, bits 0–3 | A3 | X |
| Word 15, bits 4–7 | A4 | X |
| Word 15, bits 8–11 | A5 | X |
| Word 15, bits 12–15 | A6 | X |
| Word 16, bits 0–3 | A7 | X |
| Word 16, bits 4–7 | A8 | X |
| Word 16, bits 8–11 | A9 | X |
| Word 16, bits 12–15 | A10 | X |
| Word 17, bits 0–3 | A11 | TBCD-Null |
| Word 17, bits 4–7 | A12 | SUPP1 |
| Word 17, bits 8–11 | A13 | SUPP2 |
| Word 17, bits 12–15 | A14 | SUPP3 |
| Word 18, bits 0–3 | A15 | SUPP4 |
| Word 18, bits 4–7 | A16 | SUPP5 |
| Word 18, bits 8–11 | A17 | SUPP6 |
| Word 18, bits 12–15 | A18 | SUPP7 |
| Word 19, bits 0–3 | A19 | SUPP8 |
| Word 19, bits 4–7 | A20 | SUPP9 |
| Word 19, bits 8–11 | A21 | SUPP10 |
| Word 19, bits 12–15 | A22 | SUPP11 |

5. Calling Party Number - The calling party number is recorded for SS7 FGD call originations received with a charge number and a calling party number. Record the SS7 calling party number in A1-10. A TBCD-Null is recorded after the last digit, followed by supplementary codes. Unused bytes contain TBCD-Null. Calling party number format:

| | | |
|---|---|---|
| Word 14, bits 8–11 | A1 | N |
| Word 14, bits 12–15 | A2 | X |
| Word 15, bits 0–3 | A3 | X |
| Word 15, bits 4–7 | A4 | N |
| Word 15, bits 8–11 | A5 | X |
| Word 15, bits 12–15 | A6 | X |
| Word 16, bits 0–3 | A7 | N |
| Word 16, bits 4–7 | A8 | X |
| Word 16, bits 8–11 | A9 | X |
| Word 16, bits 12–15 | A10 | X |
| Word 17, bits 0–3 | A11 | TBCD-Null |
| Word 17, bits 4–7 | A12 | SUPP1 |
| Word 17, bits 8–11 | A13 | SUPP2 |
| Word 17, bits 12–15 | A14 | SUPP3 |
| Word 18, bits 0–3 | A15 | SUPP4 |
| Word 18, bits 4–7 | A16 | SUPP5 |
| Word 18, bits 3–11 | A17 | SUPP6 |
| Word 18, bits 12–15 | A18 | SUPP7 |
| Word 19, bits 0–3 | A19 | SUPP8 |
| Word 19, bits 4–7 | A20 | SUPP9 |
| Word 19, bits 8–11 | A21 | SUPP10 |
| Word 19, bits 12–15 | A22 | SUPP11 |

6. Credit Card Number - Record the commercial credit card or presubscribed credit card number starting in A1. The PIN digits of a valid presubscribed credit card number are masked out by writing TBCD-A over the 4 PIN digits. A TBCD-Null is recorded after the last digit, followed by supplementary codes. Unused bytes contain TBCD-Null. Credit card number format:

| | | |
|---|---|---|
| Word 14, bits 8–11 | A1 | X |
| Word 14, bits 12–15 | A2 | X |
| Word 15, bits 0–3 | A3 | X |
| Word 15, bits 4–7 | A4 | X |
| Word 15, bits 8–11 | A5 | X |
| Word 15, bits 12–15 | A6 | X |
| Word 16, bits 0–3 | A7 | X |
| Word 16, bits 4–7 | A8 | X |
| Word 16, bits 8–11 | A9 | X |
| Word 16, bits 12–15 | A10 | X |
| Word 17, bits 0–3 | A11 | X |
| Word 17, bits 4–7 | A12 | X |
| Word 17, bits 8–11 | A13 | X |
| Word 17, bits 12–15 | A14 | X |
| Word 18, bits 0–3 | A15 | X |
| Word 18, bits 4–7 | A16 | X |

TABLE 1-continued

APPENDIX
CDR/PNR Record Format:

| Word #, Bit # | Description | | |
|---|---|---|---|
| | Word 18, bits 8–11 | A17 | X |
| | Word 18, bits 12–15 | A18 | X |
| | Word 19, bits 0–3 | A19 | X |
| | Word 19, bits 4–7 | A20 | TBCD-Null |
| | Word 19, bits 8–11 | A21 | SUPP1 |
| | Word 19, bits 12–15 | A22 | SUPP2 |

7. 14 Digit MCI/VNet Cards - The 14 digit calling card/VNet card number is recorded starting in A1 with the last 4 PIN digits masked out by writing TBCD-A for those digits. A TBCD-Null is written after the last digit, followed by supplemental codes. Unused bytes contain TBCD-Null. Calling card/VNet card format:

| | | | |
|---|---|---|---|
| | Word 14, bits 8–11 | A1 | X |
| | Word 14, bits 12–15 | A2 | X |
| | Word 15, bits 0–3 | A3 | X |
| | Word 15, bits 4–7 | A4 | X |
| | Word 15, bits 8–11 | A5 | X |
| | Word 15, bits 12–15 | A6 | X |
| | Word 16, bits 0–3 | A7 | X |
| | Word 16, bits 4–7 | A8 | X |
| | Word 16, bits 8–11 | A9 | X |
| | Word 16, bits 12–15 | A10 | X |
| | Word 17, bits 0–3 | A11 | TBCD-A |
| | Word 17, bits 4–7 | A12 | TBCD-A |
| | Word 17, bits 8–11 | A13 | TBCD-A |
| | Word 17, bits 12–15 | A14 | TBCD-A |
| | Word 18, bits 0–3 | A15 | TBCD-Null |
| | Word 18, bits 4–7 | A16 | SUPP1 |
| | Word 18, bits 8–11 | A17 | SUPP2 |
| | Word 18, bits 12–15 | A18 | SUPP3 |
| | Word 19, bits 0–3 | A19 | SUPP4 |
| | Word 19, bits 4–7 | A20 | SUPP5 |
| | Word 19, bits 8–11 | A21 | SUPP6 |
| | Word 19, bits 12–15 | A22 | SUPP7 |

8. Telecommunications/PTT Cards - The 23 digits, or less, of the telecommunications card is recorded starting in A1. A TBCD-Null is recorded after the last digit, followed by supplemental codes. Unused bytes contain TBCD-Null. Telecommunications card format:

| | | | |
|---|---|---|---|
| | Word 14, bits 8–11 | A1 | X |
| | Word 14, bits 12–15 | A2 | X |
| | Word 15, bits 0–3 | A3 | X |
| | Word 15, bits 4–7 | A4 | X |
| | Word 15, bits 8–11 | A5 | X |
| | Word 15, bits 12–15 | A6 | X |
| | Word 16, bits 0–3 | A7 | X |
| | Word 16, bits 4–7 | A8 | X |
| | Word 16, bits 8–11 | A9 | X |
| | Word 16, bits 12–15 | A10 | X |
| | Word 17, bits 0–3 | A11 | X |
| | Word 17, bits 4–7 | A12 | X |
| | Word 17, bits 8–11 | A13 | X |
| | Word 17, bits 12–15 | A14 | X |
| | Word 18, bits 0–3 | A15 | X |
| | Word 18, bits 4–7 | A16 | X |
| | Word 18, bits 8–11 | A17 | X |
| | Word 18, bits 12–15 | A18 | X |
| | Word 19, bits 0–3 | A19 | X |
| | Word 19, bits 4–7 | A20 | X |
| | Word 19, bits 8–11 | A21 | X |
| | Word 19, bits 12–15 | A22 | X |

9. OSID and OTG - For international inbound VNet or SAC calls, the OSID and OTG are recorded as received from the SS7 Generic Digits parameter. After the parameters are recorded, the remaining bytes contain TBCD-Null. OSID and OTG format:

| | | | |
|---|---|---|---|
| | Word 14, bits 8–11 | A1 | X (OSID) |
| | Word 14, bits 12–15 | A2 | X (OSID) |
| | Word 15, bits 0–3 | A3 | X (OSID) |
| | Word 15, bits 4–7 | A4 | X (OTG) |
| | Word 15, bits 8–11 | A5 | X (OTG) |
| | Word 15, bits 12–15 | A6 | X (OTG) |
| | Word 16, bits 0–3 | A7 | X (OTG) |
| | Word 16, bits 4–7 | A8 | TBCD-Null |
| | Word 16, bits 8–11 | A9 | TBCD-Null |

TABLE 1-continued

APPENDIX
CDR/PNR Record Format:

| Word #, Bit # | Description | | |
|---|---|---|---|
| | Word 16, bits 12–15 | A10 | TBCD-Null |
| | Word 17, bits 0–3 | A11 | TBCD-Null |
| | Word 17, bits 4–7 | A12 | TBCD-Null |
| | Word 17, bits 8–11 | A13 | TBCD-Null |
| | Word 17, bits 12–15 | A14 | TBCD-Null |
| | Word 18, bits 0–3 | A15 | TBCD-Null |
| | Word 18, bits 4–7 | A16 | TBCD-Null |
| | Word 18, bits 8–11 | A17 | TBCD-Null |
| | Word 18, bits 12–15 | A18 | TBCD-Null |
| | Word 19, bits 0–3 | A19 | TBCD-Null |
| | Word 19, bits 4–7 | A20 | TBCD-Null |
| | Word 19, bits 8–11 | A21 | TBCD-Null |
| | Word 19, bits 12–15 | A22 | TBCD–Null |

OSID = Originating Switch ID
OTG = Originating Trunk Group
10. Business Group ID - For some SS7 trunk groups, a business group ID is received in a SS7 parameter and is recorded in A1–A6. After the last digit, a TBCD-Null is recorded followed by any supplemental codes. Unused bytes contain TBCD-Null.

| | | | |
|---|---|---|---|
| | Word 14, bits 8–11 | A1 | X |
| | Word 14, bits 12–15 | A2 | X |
| | Word 15, bits 0–3 | A3 | X |
| | Word 15, bits 4–7 | A4 | X |
| | Word 15, bits 8–11 | A5 | X |
| | Word 15, bits 12–15 | A6 | X |
| | Word 16, bits 0–3 | A7 | TBCD-Null |
| | Word 16, bits 4–7 | A8 | SUPP1 |
| | Word 16, bits 8–11 | A9 | SUPP2 |
| | Word 16, bits 12–15 | A10 | SUPP3 |
| | Word 17, bits 0–3 | A11 | SUPP4 |
| | Word 17, bits 4–7 | A12 | SUPP5 |
| | Word 17, bits 8–11 | A13 | SUPP6 |
| | Word 17, bits 12–15 | A14 | SUPP7 |
| | Word 18, bits 0–3 | A15 | SUPP8 |
| | Word 18, bits 4–7 | A16 | SUPP9 |
| | Word 18, bits 8–11 | A17 | SUPP10 |
| | Word 18, bits 12–15 | A18 | SUPP11 |
| | Word 19, bits 0–3 | A19 | SUPP12 |
| | Word 19, bits 4–7 | A20 | SUPP13 |
| | Word 19, bits 8–11 | A21 | SUPP14 |
| | Word 19, bits 12–15 | A22 | SUPP15 |

11. Network Information - For some SS7 trunk groups, a network information ID is received in a SS7 parameter and is recorded in A1–A4. After the last digit, a TBCD-Null is recorded followed by any supplemental codes. Unused bytes contain TBCD-Null.

| | | | |
|---|---|---|---|
| | Word 14, bits 8–11 | A1 | N |
| | Word 14, bits 12–15 | A2 | X |
| | Word 15, bits 0–3 | A3 | X |
| | Word 15, bits 4–7 | A4 | N |
| | Word 15, bits 8–11 | A5 | TBCD-Null |
| | Word 15, bits 12–15 | A6 | SUPP1 |
| | Word 16, bits 0–3 | A7 | SUPP2 |
| | Word 16, bits 4–7 | A8 | SUPP3 |
| | Word 16, bits 8–11 | A9 | SUPP4 |
| | Word 16, bits 12–15 | A10 | SUPP5 |
| | Word 17, bits 0–3 | A11 | SUPP6 |
| | Word 17, bits 4–7 | A12 | SUPP7 |
| | Word 17, bits 8–11 | A13 | SUPP8 |
| | Word 17, bits 12–15 | A14 | SUPP9 |
| | Word 18, bits 0–3 | A15 | SUPP10 |
| | Word 18, bits 4–7 | A16 | SUPP11 |
| | Word 18, bits 8–11 | A17 | SUPP12 |
| | Word 18, bits 12–15 | A18 | SUPP13 |
| | Word 19, bits 0–3 | A19 | SUPP14 |
| | Word 19, bits 4–7 | A20 | SUPP15 |
| | Word 19, bits 8–11 | A21 | SUPP16 |
| | Word 19, bits 12–15 | A22 | SUPP17 |

12. Network Call Identifier (NCID) - If the NCID is recorded in the "A" field, it will be recorded in binary beginning with A1. The Entry Code field will be indicative of the call processing associated with the particular call or "0" If the NCID is recorded in the NCID field of a 64 word call record, the Entry Code will also be indicative of the call processing associated with the particular call or "0". The NCID is comprised of the following:

TABLE 1-continued

APPENDIX
CDR/PNR Record Format:

| Word #, Bit # | Description |
|---|---|
| | Originating Switch ID |
| | Originating Trunk Group |
| | Originating Port Number |
| | Timepoint One |
| | NCID Sequence Number |
| Word 20, bits 0–15<br>Word 21, bits 0–15<br>Word 22, bits 0–15<br>Word 23, bits 0–15<br>Word 24, bits 0–3 | Destination Address: This is the seventeen digits of the destination address which is the number being called. If more than 17 digits is required, use ECDR/EPNR format. Unused bytes contain TBCD-Null. |

|  |  | 7-digit | 10-digit | DDD | IDDD |
|---|---|---|---|---|---|
| Word 20, bits 0–3 | D1 | N | N | N | CC |
| Word 20, bits 4–7 | D2 | X | X | X | CC |
| Word 20, bits 8–11 | D3 | X | X | X | CC |
| Word 20, bits 12–15 | D4 | X | N | N | NN |
| Word 21, bits 0–3 | D5 | X | X | X | NN |
| Word 21, bits 4–7 | D6 | X | X | X | NN |
| Word 21, bits 8–11 | D7 | X | X | X | NN |
| Word 21, bits 12–15 | D8 | X(TSID) | X | X | NN |
| Word 22, bits 0–3 | D9 | X(TSID) | X | X | NN |
| Word 22, bits 4–7 | D10 | X(TSID) | X | X | NN |
| Word 22, bits 8–11 | D11 | X(TTG) | X(TSID) | T-Null | NN |
| Word 22, bits 12–15 | D12 | X(TTG) | X(TSID) | T-Null | NN |
| Word 23, bits 0–3 | D13 | X(TTG) | X(TSID) | T-Null | NN |
| Word 23, bits 4–7 | D14 | X(TTG) | X(TSID) | T-Null | NN |
| Word 23, bits 8–11 | D15 | T-Null | X(TTG) | T-Null | NN |
| Word 23, bits 12–15 | D16 | T-Null | X(TTG) | T-Null | T-Null |
| Word 24, bits 0–3 | D17 | T-Null | X(TTG) | T-Null | T-Null |

CC = Customer Carrier
NN = National Number
TSID = Terminating Switch ID
TTG = Terminating Trunk Group

| Word #, Bit # | Description |
|---|---|
| Word 24, bits 4–15<br>Word 25, bits 0–15<br>Word 26, bits 0–11 | Pretranslated Digits: This represents the digits as dialed by the caller which may or may not be the Destination Address. The pretranslated digits are only recorded if a translation of the number occurs. If the dialed number is the destination number, and is not translated to another number, this field contains TBCD–Nulls. If there are more than 10 digits, use the ECDR/EPNR format. |

|  |  | 10 digit VNet, SAC DNIS, or Hotline | 00y SAC Code | 7 digit VNet or Hotline | IDDD 10 digit (example) |
|---|---|---|---|---|---|
| Word 24, bits 4–7 | PTD1 | N | 0 | N | N |
| Word 24, bits 8–11 | PTD2 | X | 0 | X | N |
| Word 24, bits 12–15 | PTD3 | X | Y | X | N |
| Word 25, bits 0–3 | PTD4 | N | N | X | N |
| Word 25, bits 4–7 | PTD5 | X | X | X | N |
| Word 25, bits 8–11 | PTD6 | X | X | X | |
| Word 25, bits 12–15 | PTD7 | X | X | N | |
| Word 26, bits 0–3 | PTD8 | X | X | TBDC-Null | N |
| Word 26, bits 4–7 | PTD9 | X | X | TBDC-Null | N |
| Word 26, bits 8–11 | PTD10 | X | X | TBDC-Null | N |

| Word #, Bit # | Description |
|---|---|
| Word 26, bits 12–15 | Not Used. |
| Word 27, bits 0–3 | Feature Code (FC): The switch determines a feature code for the call which indicates whether a specific type of data line is required for the call such as a higher quality line for facsimile transmissions.<br>0 = Default<br>1 = FAX<br>2 = NARS<br>3 = Data Call<br>4 = Switched DS1 (HSCS)<br>5 = Switched DS3 (HSCS)<br>6–8 = Not Used<br>9 = NX64<br>10 = Offnet Routing<br>11 = AAP Call (Used in Gateway Toll Ticket Conversion)<br>12 = Card Gate Denial<br>13 = Forum Dial In audio/video conference<br>14 = Concert Freephone<br>15 = Not Used |
| Word 27, bits 4–7 | Terminating Network Code (TNC): Indicates the terminating facilities to be used for the remainder of the path of the call. For example, an indicator for no satellite transmission. |

TABLE 1-continued

APPENDIX
CDR/PNR Record Format:

| Word #, Bit # | Description |
|---|---|
| | 0 = Default |
| | 1 = No Routing Restrictions |
| | 2 = Avoid Satellite |
| | 3 = Route via DS1 |
| | 4 = Route via DS1 and avoid satellite |
| | 5 = Route via Protected Facilities Required |
| | 6 = Route via Protected Facilities Preferred |
| | 7–15 = Not Used |
| Word 27, bits 8–11 | Network Access Type (NAT): Indicates which type of network access was used as defined at the originating switch on the network; that is, how the caller gained access to the network. The types of access are: |
| | 0 = Default |
| | 1 = 800 call |
| | 2 = Credit Card Access |
| | 3 = Operator Assistance Access |
| | 4 = VNET Remote Access |
| | 5 = BPP Access |
| | 6 = FGD Cut–Through Access |
| | 715 = Not Used |
| Word 27, bits 12–15 | Timepoint 7 Qualifier (TP7Q): Contains the call's first disconnect qualifier; that is, how the call was terminated. The types of disconnection are: |
| | 0 = Calling party disconnects |
| | 1 = Failed party disconnects |
| | 2 = Calling party reorigination |
| | 3 = Switch initiated (ex. switch error cut off the call) |
| | 4 = All Routes Busy |
| | 5 = Disconnected due to a long ring; ring timer exceeded |
| | 6 = Call disconnected due to network invoked transfer |
| | 7 = Feature/Service Interaction |
| | 8–15 = Not Used |
| Word 28, bits 0–6 | Entry Code (EC): Indicates the type of call processing that took place and what type of information is recorded in the Authorization Code field. If more than one entry code is received, record the last one. The following codes are valid: |
| | 0 = Default |
| | 1 = Person-to-Person (P-P) |
| | 2 = Station-to-Station (S-S) |
| | 3 = Third Party Billing (3rd party number recorded) |
| | 4 = P-P collect (bill to called party) |
| | 5 = S-S collect (bill to called party) |
| | 6 = MCI card or VNet card (S-S) |
| | 7 = BOC inward dialing without call completion |
| | 8 = general assistance |
| | 9 = BOC/LEC card |
| | 10 = Presubscribed credit card |
| | 11 = PTT card |
| | 12 = Directory Assistance |
| | 13 = Commercial Credit Card |
| | 14 = BOC inward dialing with call completion |
| | 15 = MCI card or VNet card (P-P) |
| | 16 –19 = Not Used |
| | 20 = ANI validation (screened pass/fail) |
| | 21 = Auth Validation (filed or dialed) |
| | 22 = Not Used |
| | 23 = 700 Service Access Code (overrides #20) |
| | 24 = 500, 800 Service Access Code (overrides #20) |
| | 25 = 900 Service Access Code (overrides #20) |
| | 26–28 = Not Used |
| | 29 = Operator Release Timer Expired |
| | 30 = EVS/NARS - Disconnect message referral (DMR) without referral |
| | 31 = EVS/NARS - DMR with referral to MCI number |
| | 32 = EVS/NARS - DMR with referral to non-MCI number |
| | 33 = EVS/NARS - DMR with referral and call extension (CE) to MCI number |
| | 34 = EVS/NARS - DMR with referral and CE to non-MCI number |
| | 35 = EVS/NARS - Customized Message Announcement (CMA) with CE |
| | 36 = EVS/NARS - CMA without CE |
| | 37 = EVS/NARS - Enhanced Call Routing (ECR) |
| | 38 –41 = EVS/NARS - Reserved |
| | 42–47 = Not Used |

TABLE 1-continued

APPENDIX
CDR/PNR Record Format:

| Word #, Bit # | Description |
|---|---|
| | 48 = GETS card |
| | 49 = Not Used |
| | 50 = Billed to international number |
| | 51 = Calling station ID information recorded |
| | 52 = Supplemental code only recorded |
| | 53 = VNet remote access number recorded |
| | 54 = SS7 calling party number recorded |
| | 55 = OSID and OTG recorded |
| | 56 = DNIS recorded |
| | 57 = Business group ID recorded |
| | 58 = Network information recorded |
| | 59 = BG + Null + OSID/OTG |
| | 60 = Card Number + Null + OSID/OTG |
| | 61 = VNet RA + Null + OSID/OTG |
| | 62 = VNet RA + Null + OSID/OTG |
| | 63 = Network Call Transfer (NCT) |
| | 64–79 = Reserved |
| | 80–89 = Reserved |
| | 90–99 = Reserved |
| | 100 = 18C It's Me PIN S/S |
| | 101 = 18C It's Me Global S/S |
| | 102 = 18C It's Me ANI S/S |
| | 103 = 18C It's Me NPA S/S |
| | 104 = 18C It's Me Messenger S/S |
| | 105 = 18C It's Me Messenger PIN S/S |
| | 106 = 18C It's Me Messenger Global S/S |
| | 107 = 18C BOC Card S/S |
| | 108 = 18C MCI Card S/S |
| | 109 = Aos Messenger S/S |
| | 110 = International Messenger S/S |
| | 111 = International Speed Dial |
| | 112–127 = Not Used |
| Word 28, bits 7–9 | Prefix Digits (PD): Represents the prefix digits of the called number. These digits tell the switch how to process the call. |
| | 0 = No prefix digits received |
| | 1 = 0 – (operator assisted) |
| | 2 = 0 + (domestic CDOS) |
| | 3 = 01 + (international CDOS) |
| | 4 = 011 + IDDD |
| | 5 = 1 + DDD |
| | 6 = 0 + operator assisted, subscriber address |
| | 7 = *XX where XX = 0–9, Star Card |
| Word 28, bits 10–12 | NDID (NCS/DAP ID): Indicates whether the switch processed the call or if one of the databases, such as NCS/DAP, was queried for information for services, including but not limited to, VNET, Calling Card, 800, and 900 calls. The NDID further indicates the ID of the NCS/DAP that was involved in the last transaction attempt. |
| | 0 = Switch call processing |
| | 1 = NCS/DAP 1 |
| | 2 = NCS/DAP 2 |
| | 3 = NCS/DAP 3 |
| | 4–5 = Not Used |
| | 6 = Received from operator platform via RLT |
| | 7 = TCAP to NCS/DAP |
| Word 28, bits 13–15 | Division ID (DIVID): Contains the division ID for credit card calls, including the telecommunication system's card. The DIVID is received from the NCS/DAP for the card number validation. If no information is received by the switch, record the default value of "0." |
| | 0 = No division ID specified |
| | 1 = Division ID1 |
| | 2 = Division ID2 |
| | 3 = Division ID3 |
| | 4 = Division ID4 |
| | 5 = Division ID5 |
| | 6 = Division ID6 |
| | 7 = Division ID7 |
| Word 29, bit 0 | Distant Overflow (DO): When set to 1 in the originating switch's call record, indicates that a direct termination overflow (DTO) transaction was attempted at an intermediate or terminating switch in order to get the final destination address digits for this call. |
| Word 29, bit 1 | Not Used. |
| Word 29, bit 2 | Customer Connect (CC): Indicates whether to use timepoint 6 or |

TABLE 1-continued

APPENDIX
CDR/PNR Record Format:

| Word #, Bit # | Description |
|---|---|
| | timepoint 3 to calculate the call duration.<br>0 = Use Time Point 6, *F to calculate the call duration<br>1 = Use Time Point 3, *C to calculate the call duration |
| Word 29, bit 3 | Inter-Network (IN): Indicates whether or not a call is originating from one customer/network and is terminating to a different customer/network. The default setting = 0; bit set to 1 if a business group or Netinfo parameter is received from the NCS/DAP. |
| Word 29, bit 4 | Not Used. |
| Word 29, bit 5 | SAC Bit (SC): This bit is used for the Flexible SAC feature. This bit will be set to "1" whenever the received number which is collected during the address digit collection phase, is identified as a SAC number in the FlexSac Index associated with the originating trunk group. This bit will be set to "0" in all other cases. |
| Word 29, bit 6 | Call Direction (CD): Indicates whether the call originated in the domestic or international network.<br>0 = Call origination occurred in the Domestic Network<br>1 = Call origination occurred in the International Network |
| Word 29, bit 7 | Destination (DE): Indicates when a call is expected to terminate to an international destination.<br>0 = Default, NANP, Domestic VNet, or any other calls which not expected to terminate to an international destination<br>1 = Calls expected to terminate to an international destination |
| Word 29, bit 8 | Dedicated Termination (DT): Indicates that a 10-digit shared network number was completed to a dedicated destination. IF the terminating trunk class (TTC) in the call record is equal to 3 or 7, then it is considered to be a direct termination trunk. |
| Word 29, bits 9-10 | Not Used. |
| Word 29, bit 11 | Satellite (SA): Indicates that a satellite circuit was involved in the call. The default setting is 0; bit set to 1 indicates that a satellite was involved in the call. The bit is set when the incoming trunk group is classmarked as satellite equipped, when the SAT digit on an incoming inband IMT call shows that a satellite circuit is involved in the connection, or when the SS7 Nature of Connection parameter indicates that a satellite trunk was previously used. This is used for trouble-shooting purposes, and not for billing. |
| Word 29, bits 12-15 | Nature Of Calling Location ID (NOCLI): A binary value that identifies what data is recorded in the Call Location ID. The Calling Location ID field will contain the information that is referenced in the NOCLI.<br>0 = Not Used<br>1 = ANI from Inbound trunk<br>2 = SS7 charge number<br>3 = SS7 calling party number<br>4 = original called number<br>5 = Pseudo ANI created at this switch<br>6 = CSI from originating trunk<br>7 = Filed NPA-NXX trunk group information plus CSI<br>8 = NNN + OSID + OTG or 00Y + OSID + OTG (N = TBCD-Null)<br>9 = Country Code + national number<br>10 = No CLI record<br>11 = Redirecting Number<br>12 = CLI received from Operator platform via RLT<br>13 = ANI of NCT originator<br>14-15 = Not Used |
| Word 30, bits 0-15 | Carrier Number (CN): Represents the carrier number provided on FG-B or FG-D originations, or the carrier number received over an SS7 IMT. If only three digits are used, then they are recorded in CN2-CN4 and CN1 will contain a TBCD-Null. This field also contains the last four digits of the specific 800 number assigned to VISA cards (9595). It will also contain the last four digits of the MCI card access number regardless of the access facility.<br>Examples of carrier numbers are : MCI = 222, ATT = 288, and Friends = 333. |

| | | | FGB/FGD<br>3 digit<br>CIC | FGB/D<br>4 digit<br>CIC | visa<br>card |
|---|---|---|---|---|---|
| Word 30, bits 0-3 | CN1 | | TBCD-Null | X | 9 |
| Word 30, bits 4-7 | CN2 | | X | X | 5 |
| Word 30, bits 8-11 | CN3 | | X | X | 9 |
| Word 30, bits 12-15 | CN4 | | X | X | 5 |
| | | | SS7<br>TNS | MCI<br>card | VNet<br>card |

TABLE 1-continued

APPENDIX
CDR/PNR Record Format:

| Word #, Bit # | Description |
|---|---|
| | Word 30, bits 0–3    CN1    X    1    1 |
| | Word 30, bits 4–7    CN2    X    0    1 |
| | Word 30, bits 8–11    CN3    X    2    1 |
| | Word 30, bits 12–15 CN4    X    2    1 |
| Word 31 ,bits 0–3 | Authorization Code ID Field (ACIF): Contains the Authorization Code Identification Field for recording a card number status. This field indicates whether the card number (calling card or credit card) is good or bad.<br>0 = Seven digit authcode file (default)<br>1 = 1st or only five digit authcode file<br>2 = 2nd five digit file<br>3 = 3rd five digit file<br>4 = 4th five digit file<br>5 = 5th five digit file<br>6 = Six digit authcode file<br>7 = Range restriction failure (invalid address digits)<br>8 = Positive Commercial Credit Card/89 Card/M Card Validation<br>9 = Not Used<br>10 = MCI Card/Visa Card invalid or not assigned. Disallowed.<br>11 = BOC billing number assigned but blocked<br>12 = BOC billing number usage exceeded<br>13 = Not Used<br>14 = Default authorization of MCI Card/VISA Card if response timeout from NCS/DAP<br>15 = MCI Card/VISA Card authorized by NCS/DAP |
| Word 31, bits 4–10 | Release Code: Used with timepoint 7 qualifier to determine from which direction the release message came. The code indicates why one of the parties hung up, for example, normal release = 16, and no circuit available = 34.<br>1 = Unallocated number<br>2 = No route to specified network<br>3 = No route to destination<br>4 = Send special information tone<br>5 = Misdialed trunk prefix<br>16 = Normal clearing<br>17 = User Busy<br>18 = No user responding<br>19 = No user responding (user alerted)<br>21 = Call rejected<br>22 = Number changed<br>27 = Destination out of service<br>28 = Address incomplete<br>29 = Facility rejected<br>31 = Normal-unspecified<br>34 = No circuit available<br>38 = Network out of order<br>41 = Temporary failure<br>42 = Switching equipment congestion<br>44 = Requested channel not available<br>47 = Resource unavailable –unspecified<br>50 = Requested facility not subscribed<br>55 = Incoming calls barred within CUG<br>57 = Bearer capability not authorized<br>58 = Bearer capability not available<br>63 = Service or option not available<br>65 = Bearer capability not implemented<br>69 = Requested facility not implemented<br>70 = Only restricted digital information bearer capability is available<br>79 = Service or option not implemented<br>87 = Called user not member of CUG<br>88 = Incompatible destination<br>91 = invalid transit network selector<br>95 = Invalid message - unspecified<br>97 = Message type non-existent or not implemented<br>99 = Parameter non-existent or not implemented - discarded<br>102 = Recovery on timer expired<br>103 = Parameter non-existent or not implemented - passed on<br>111 = Protocol error - unspecified<br>127 = Interworking - unspecified |
| Word 31, bits 11–13 | NCID Sequence Number: Represents the number of calls which have occurred on the same port number with the same Timepoint 1 value. The first call will have the sequence number set to '0'. This value will increase incrementally for each successive call |

TABLE 1-continued

APPENDIX
CDR/PNR Record Format:

| Word #, Bit # | Description |
|---|---|
| | which originates on the same port number which has the same Timepoint 1 value. Range = 0–7. |
| Word 31, bit 14 | NCID Location (NCIDLOC): This bit identifies when the NCID is recorded in the Authcode field of the call record. The NCID is recorded in the Authcode field of the call record at intermediate and terminating switches if the Authcode field is not being used to record other information. If the Authcode field is being used to record other information, the NCID is recorded in the "NCID" field of the 64 word call record.<br>0 = NCID is not recorded in the Authcode field (default)<br>1 = NCID is recorded in the Authcode field |
| Word 31, bit 15 | Remote ANI Screened (RS): This bit is set to '1' if the NPA of the ANI is not listed in the switch's Local-Service-Area table, and the ANI was sent to the DAP for ANI index screening purposes. This bit is set to '0' if the switch sent the ANI to the DAP for ANI index screening purposes and no response is received from the DAP or if normal switch ANI screening occurs.<br>0 = ANI was not screened by the DAP (default)<br>1 = ANI was screened by the DAP |

TABLE 2

ECDR/EPNR Record Format:

| Word #, Bit # | Description |
|---|---|
| Words 0–11, bits 0–15 | Same as CDR/PNR format. |
| Word 12, bits 0–15<br>Word 13, bits 0–15<br>Word 14, bits 0–15<br>Word 15, bits 0–11 | Calling Location ID: Contains 1–15 digits of the originating station line. This is the ANI number of the calling party. If 1 to 15 ANI or CSI digits are received, they are recorded in order starting with CLI1. Unused bytes contain TBCD-Null. If no ANI or CSI is available, record the OSID/OTG in CLI4-10, except where noted. If nothing is recorded in the CLI field, use a NOCLI value of 10. This field contains 1 of the following nine formats:<br>1. VNet CAMA DAL originations: If CSI is available, prefix the CSI with filed HNPA and HNXX information, if available, and record. Use NOCLI value of 7.<br>2. FG-C Originations: If ANI or CSI information is not available and the number is in the 00Y+NXX–XXXX format, record the 00Y code that was received in CLI1-3, and record the OSID/OTG in CLI4-10. Use NOCLI value of 8.<br>3. Inband FG-D Originations: Record the ANI that was received starting with CL1. Use NOCLI value of 1.<br>4. SS7 FG-D Originations: Record the charge number, if available. If the charge number is not available, record the calling party number. Use NOCLI value of 2 or 3.<br>5. International Originations: Record the country code and national number of the calling party. Use NOCLI value of 9.<br>6. SS7 IMTs Originations: Record the following information in this order of importance: 1) charge number, 2) calling party number, 3) OSID/OTG from generic digits. Use NOCLI value of 2, 3, or 8.<br>7. SS7 Reseller Originations: The CLI field will be filled with TBCD Nulls.<br>8. SS7 Private Network Originations: The CLI field will be filled with TBCD Nulls.<br>9. PRI Originations: Record the calling party number received in the ISDN setup message.<br>The format: |

|  |  | 1–15 digit ANI/CSI (13 digit example) | OSID/OTG | Incoming Int'l |
|---|---|---|---|---|
| Word 12, bits 0–3 | CLI1 | X | TBCD-Null | X (CC) |
| Word 12, bits 4–7 | CLI2 | X | TBCD-Null | X (CC) |
| Word 12, bits 8–11 | CLI3 | X | TBCD-Null | X (CC) |
| Word 12, bits 12–15 | CLI4 | X | X (OSID) | X (NN) |
| Word 13, bits 0–3 | CLI5 | X | X (OSID) | X (NN) |
| Word 13, bits 4–7 | CLI6 | X | X (OSID) | X (NN) |
| Word 13, bits 8–11 | CLI7 | X | X (OTG) | X (NN) |

TABLE 2-continued

ECDR/EPNR Record Format:

| Word #, Bit # | Description | | | | | |
|---|---|---|---|---|---|---|
| | Word 13, bits 12–15 | CLI8 | X | | X (OTG) | X (NN) |
| | Word 14, bits 0–3 | CLI9 | X | | X (OTG) | X (NN) |
| | Word 14, bits 4–7 | CLI10 | X | | X (OTG) | X (NN) |
| | Word 14, bits 8–11 | CLI11 | X | | TBCD-Null | X (NN) |
| | Word 14, bits 12–15 | CLI12 | X | | TBCD-Null | X (NN) |
| | Word 15, bits 0–3 | CLI13 | X | | TBCD-Null | X (NN) |
| | Word 15, bits 4–7 | CLI14 | TBCD-Null | | TBCD-Null | X (NN) |
| | Word 15, bits 8–11 | CLI15 | TBCD-Null | | TBCD-Null | X (NN) |
| | CC = Customer Connect | | | | | |
| | NN = National Number | | | | | |
| | OSID = Originating Switch ID (000–999) | | | | | |
| | OTG = Originating Trunk Group (0000–8191) | | | | | |
| Word 15, bits 12–15 | Authorization Code (Auth Code): Same as CDR/PNR format | | | | | |
| Word 16, bits 0–15 | Auth Code, but represents 45 digits. | | | | | |
| Word 17, bits 0–15 | | | | | | |
| Word 18, bits 0–15 | 1. Authorization Codes: | | | | | |
| Word 19, bits 0–15 | | | | | | |
| Word 20, bits 0–15 | | | 5 digit | 6 digit | 7 digit | |
| Word 21, bits 0–15 | | | | | | |
| Word 22, bits 0–15 | Word 15, bits 12–15 | A1 | AUTH1 | AUTH1 | AUTH1 | |
| Word 23, bits 0–15 | Word 16, bits 0–3 | A2 | AUTH2 | AUTH2 | AUTH2 | |
| Word 24, bits 0–15 | Word 16, bits 4–7 | A3 | AUTH3 | AUTH3 | AUTH3 | |
| Word 25, bits 0–15 | Word 16, bits 8–11 | A4 | AUTH4 | AUTH4 | AUTH4 | |
| Word 26, bits 0–15 | Word 16, bits 12–15 | A5 | AUTH5 | AUTH5 | AUTH5 | |
| | Word 17, bits 0–3 | A6 | SEC1 | AUTH6 | AUTH6 | |
| | Word 17, bits 4–7 | A7 | SEC2 | SEC1 | AUTH7 | |
| | Word 17, bits 8–11 | A8 | SEC3 | SEC2 | SEC1 | |
| | Word 17, bits 12–15 | A9 | SEC4 | SEC3 | SEC2 | |
| | Word 18, bits 0–3 | A10 | T-Null | SEC4 | SEC3 | |
| | Word 18, bits 4–7 | A11 | SUPP1 | T-Null | SEC4 | |
| | Word 18, bits 8–11 | A12 | SUPP2 | SUPP1 | T-Null | |
| | Word 18, bits 12–15 | A13 | SUPP3 | SUPP2 | SUPP1 | |
| | Word 19, bits 0–3 | A14 | SUPP4 | SUPP3 | SUPP2 | |
| | Word 19, bits 4–7 | A15 | SUPP5 | SUPP4 | SUPP3 | |
| | Word 19, bits 8–11 | A16 | SUPP6 | SUPP5 | SUPP4 | |
| | Word 19, bits 12–15 | A17 | SUPP7 | SUPP6 | SUPP5 | |
| | Word 20, bits 0–3 | A18 | SUPP8 | SUPP7 | SUPP6 | |
| | Word 20, bits 4–7 | A19 | SUPP9 | SUPP5 | SUPP7 | |
| | Word 20, bits 8–11 | A20 | SUPP10 | SUPP9 | SUPP8 | |
| | Word 20, bits 12–15 | A21 | SUPP11 | SUPP10 | SUPP9 | |
| | Word 21, bits 0–3 | A22 | SUPP12 | SUPP11 | SUPP10 | |
| | Word 21, bits 4–7 | A23 | SUPP13 | SUPP12 | SUPP11 | |
| | Word 21, bits 8–11 | A24 | SUPP14 | SUPP13 | SUPP12 | |
| | Word 21, bits 12–15 | A25 | SUPP15 | SUPP14 | SUPP13 | |
| | Word 22, bits 0–3 | A26 | SUPP16 | SUPP15 | SUPP14 | |
| | Word 22, bits 4–7 | A27 | SUPP17 | SUPP16 | SUPP15 | |
| | Word 22, bits 8–11 | A28 | SUPP18 | SUPP17 | SUPP16 | |
| | Word 22, bits 12–15 | A29 | SUPP19 | SUPP18 | SUPP17 | |
| | Word 23, bits 0–3 | A30 | SUPP20 | SUPP19 | SUPP18 | |
| | Word 23, bits 4–7 | A31 | SUPP21 | SUPP20 | SUPP19 | |
| | Word 23, bits 8–11 | A32 | SUPP22 | SUPP21 | SUPP20 | |
| | Word 23, bits 12–15 | A33 | SUPP23 | SUPP22 | SUPP21 | |
| | Word 24, bits 0–3 | A34 | SUPP24 | SUPP23 | SUPP22 | |
| | Word 24, bits 4–7 | A35 | SUPP25 | SUPP24 | SUPP23 | |
| | Word 24, bits 8–11 | A36 | SUPP26 | SUPP25 | SUPP24 | |
| | Word 24, bits 12–15 | A37 | SUPP27 | SUPP26 | SUPP25 | |
| | Word 25, bits 0–3 | A38 | SUPP28 | SUPP27 | SUPP26 | |
| | Word 25, bits 4–7 | A39 | SUPP29 | SUPP28 | SUPP27 | |
| | Word 25, bits 8–11 | A40 | SUPP30 | SUPP29 | SUPP28 | |
| | Word 25, bits 12–15 | A41 | T-Null | SUPP30 | SUPP29 | |
| | Word 26, bits 0–3 | A42 | T-Null | T-Null | SUPP30 | |
| | Word 26, bits 4–7 | A43 | T-Null | T-Null | T-Null | |
| | Word 26, bits 8–11 | A44 | T-Null | T-Null | T-Null | |
| | Word 26, bits 12–15 | A45 | T-Null | T-Null | T-Null | |
| | T-Null = TBCD-Null | | | | | |
| | 2. Calling Station ID (CSI) | | | | | |
| | | | 7 digit | 1–10 digit | | |
| | Word 15, bits 12–15 | A1 | X | X | | |
| | Word 16, bits 0–3 | A2 | X | X | | |
| | Word 16, bits 4–7 | A3 | X | X | | |
| | Word 16, bits 8–11 | A4 | X | X | | |

TABLE 2-continued

ECDR/EPNR Record Format:

| Word #, Bit # | Description | | | |
|---|---|---|---|---|
| | Word 16, bits 12–15 | A5 | X | X |
| | Word 17, bits 0–3 | A6 | X | X |
| | Word 17, bits 4–7 | A7 | X | X |
| | Word 17, bits 8–11 | A8 | TBCD-Null | X |
| | Word 17, bits 12–15 | A9 | SUPP1 | X |
| | Word 18, bits 0–3 | A10 | SUPP2 | X |
| | Word 18, bits 4–7 | A11 | SUPP3 | TBCD-Null |
| | Word 18, bits 8–11 | A12 | SUPP4 | SUPP1 |
| | Word 18, bits 12–15 | A13 | SUPP5 | SUPP2 |
| | Word 19, bits 0–3 | A14 | SUPP6 | SUPP3 |
| | Word 19, bits 4–7 | A15 | SUPP7 | SUPP4 |
| | Word 19, bits 8–11 | A16 | SUPP8 | SUPP5 |
| | Word 19, bits 12–15 | A17 | SUPP9 | SUPP6 |
| | Word 20, bits 0–3 | A18 | SUPP10 | SUPP7 |
| | Word 20, bits 4–7 | A19 | SUPP11 | SUPP8 |
| | Word 20, bits 8–11 | A20 | SUPP12 | SUPP9 |
| | Word 20, bits 12–15 | A21 | SUPP13 | SUPP10 |
| | Word 21, bits 0–3 | A22 | SUPP14 | SUPP11 |
| | Word 21, bits 4–7 | A23 | SUPP15 | SUPP12 |
| | Word 21, bits 8–11 | A24 | SUPP16 | SUPP13 |
| | Word 21, bits 12–15 | A25 | SUPP17 | SUPP14 |
| | Word 22, bits 0–3 | A26 | SUPP18 | SUPP15 |
| | Word 22, bits 4–7 | A27 | SUPP19 | SUPP16 |
| | Word 22, bits 8–11 | A28 | SUPP20 | SUPP17 |
| | Word 22, bits 12–15 | A29 | SUPP21 | SUPP18 |
| | Word 23, bits 0–3 | A30 | SUPP22 | SUPP19 |
| | Word 23, bits 4–7 | A31 | SUPP23 | SUPP20 |
| | Word 23, bits 8–11 | A32 | SUPP24 | SUPP21 |
| | Word 23, bits 12–15 | A33 | SUPP25 | SUPP22 |
| | Word 24, bits 0–3 | A34 | SUPP26 | SUPP23 |
| | Word 24, bits 4–7 | A35 | SUPP27 | SUPP24 |
| | Word 24, bits 8–11 | A36 | SUPP28 | SUPP25 |
| | Word 24, bits 12–15 | A37 | SUPP29 | SUPP26 |
| | Word 25, bits 0–3 | A38 | SUPP30 | SUPP27 |
| | Word 25, bits 4–7 | A39 | TBCD-Null | SUPP28 |
| | Word 25, bits 8–11 | A40 | TBCD-Null | SUPP29 |
| | Word 25, bits 12–15 | A41 | TBCD-Null | SUPP30 |
| | Word 26, bits 0–3 | A42 | TBCD-Null | TBCD-Null |
| | Word 26, bits 4–7 | A43 | TBCD-Null | TBCD-Null |
| | Word 26, bits 8–11 | A44 | TBCD-Null | TBCD-Null |
| | Word 26, bits 12–15 | A45 | TBCD-Null | TBCD-Null |
| | 3. Supplemental Codes: | | | |
| | Word 15, bits 12–15 | A1 | SUPP1 | |
| | Word 16, bits 0–3 | A2 | SUPP2 | |
| | Word 16, bits 4–7 | A3 | SUPP3 | |
| | Word 16, bits 8–11 | A4 | SUPP4 | |
| | Word 16, bits 12–15 | A5 | SUPP5 | |
| | Word 17, bits 0–3 | A6 | SUPP6 | |
| | Word 17, bits 4–7 | A7 | SUPP7 | |
| | Word 17, bits 8–11 | A8 | SUPP8 | |
| | Word 17, bits 12–15 | A9 | SUPP9 | |
| | Word 18, bits 0–3 | A10 | SUPP10 | |
| | Word 18, bits 4–7 | A11 | SUPP11 | |
| | Word 18, bits 8–11 | A12 | SUPP12 | |
| | Word 18, bits 12–15 | A13 | SUPP13 | |
| | Word 19, bits 0–3 | A14 | SUPP14 | |
| | Word 19, bits 4–7 | A15 | SUPP15 | |
| | Word 19, bits 8–11 | A16 | SUPP16 | |
| | Word 19, bits 12–15 | A17 | SUPP17 | |
| | Word 20, bits 0–3 | A18 | SUPP18 | |
| | Word 20, bits 4–7 | A19 | SUPP19 | |
| | Word 20, bits 8–11 | A20 | SUPP20 | |
| | Word 20, bits 12–15 | A21 | SUPP21 | |
| | Word 21, bits 0–3 | A22 | SUPP22 | |
| | Word 21, bits 4–7 | A23 | SUPP23 | |
| | Word 21, bits 8–11 | A24 | SUPP24 | |
| | Word 21, bits 12–15 | A25 | SUPP25 | |
| | Word 22, bits 0–3 | A26 | SUPP26 | |
| | Word 22, bits 4–7 | A27 | SUPP27 | |
| | Word 22, bits 8–11 | A28 | SUPP28 | |
| | Word 22, bits 12–15 | A29 | SUPP29 | |
| | Word 23, bits 0–3 | A30 | TBCD-Null | |
| | Word 23, bits 4–7 | A31 | TBCD-Null | |
| | Word 23, bits 8–11 | A32 | TBCD-Null | |

TABLE 2-continued

ECDR/EPNR Record Format:

| Word #, Bit # | Description | | |
|---|---|---|---|
| | Word 23, bits 12–15 | A33 | TBCD-Null |
| | Word 24, bits 0–3 | A34 | TBCD-Null |
| | Word 24, bits 4–7 | A35 | TBCD-Null |
| | Word 24, bits 8–11 | A36 | TBCD-Null |
| | Word 24, bits 12–15 | A37 | TBCD-Null |
| | Word 25, bits 0–3 | A38 | TBCD-Null |
| | Word 25, bits 4–7 | A39 | TBCD-Null |
| | Word 25, bits 8–11 | A40 | TBCD-Null |
| | Word 25, bits 12–15 | A41 | TBCD-Null |
| | Word 26, bits 0–3 | A42 | TBCD-Null |
| | Word 26, bits 4–7 | A43 | TBCD-Null |
| | Word 26, bits 8–11 | A44 | TBCD-Null |
| | Word 26, bits 12–15 | A45 | TBCD-Null |
| | 4. VNet Remote Access and Calling Party Number: | | |
| | Word 15, bits 12–15 | A1 | N |
| | Word 16, bits 0–3 | A2 | X |
| | Word 16, bits 4–7 | A3 | X |
| | Word 16, bits 8–11 | A4 | N |
| | Word 16, bits 12–15 | A5 | X |
| | Word 17, bits 0–3 | A6 | X |
| | Word 17, bits 4–7 | A7 | X |
| | Word 17, bits 8–11 | A8 | X |
| | Word 17, bits 12–15 | A9 | X |
| | Word 18, bits 0–3 | A10 | X |
| | Word 18, bits 4–7 | A11 | TBCD-Null |
| | Word 18, bits 8–11 | A12 | SUPP1 |
| | Word 18, bits 12–15 | A13 | SUPP2 |
| | Word 19, bits 0–3 | A14 | SUPP3 |
| | Word 19, bits 4–7 | A15 | SUPP4 |
| | Word 19, bits 8–11 | A16 | SUPP5 |
| | Word 19, bits 12–15 | A17 | SUPP6 |
| | Word 20, bits 0–3 | A18 | SUPP7 |
| | Word 20, bits 4–7 | A19 | SUPP8 |
| | Word 20, bits 8–11 | A20 | SUPP9 |
| | Word 20, bits 12–15 | A21 | SUPP10 |
| | Word 21, bits 0–3 | A22 | SUPP11 |
| | Word 21, bits 4–7 | A23 | SUPP12 |
| | Word 21, bits 8–11 | A24 | SUPP13 |
| | Word 21, bits 12–15 | A25 | SUPP14 |
| | Word 22, bits 0–3 | A26 | SUPP15 |
| | Word 22, bits 4–7 | A27 | SUPP16 |
| | Word 22, bits 8–11 | A28 | SUPP17 |
| | Word 22, bits 12–15 | A29 | SUPP18 |
| | Word 23, bits 0–3 | A30 | SUPP19 |
| | Word 23, bits 4–7 | A31 | SUPP20 |
| | Word 23, bits 8–11 | A32 | SUPP21 |
| | Word 23, bits 12–15 | A33 | SUPP22 |
| | Word 24, bits 0–3 | A34 | SUPP23 |
| | Word 24, bits 4–7 | A35 | SUPP24 |
| | Word 24, bits 8–11 | A36 | SUPP25 |
| | Word 24, bits 12–15 | A37 | SUPP26 |
| | Word 25, bits 0–3 | A38 | SUPP27 |
| | Word 25, bits 4–7 | A39 | SUPP28 |
| | Word 25, bits 8–11 | A40 | SUPP29 |
| | Word 25, bits 12–15 | A41 | SUPP30 |
| | Word 26, bits 0–3 | A42 | TBCD-Null |
| | Word 26, bits 4–7 | A43 | TBCD-Null |
| | Word 26, bits 8–11 | A44 | TBCD-Null |
| | Word 26, bits 12–15 | A45 | TBCD-Null |
| | 5. Credit Card: | | |
| | Word 15, bits 12–15 | A1 | X |
| | Word 16, bits 0–3 | A2 | X |
| | Word 16, bits 4–7 | A3 | X |
| | Word 16, bits 8–11 | A4 | X |
| | Word 16, bits 12–15 | A5 | X |
| | Word 17, bits 0–3 | A6 | X |
| | Word 17, bits 4–7 | A7 | X |
| | Word 17, bits 8–11 | A8 | X |
| | Word 17, bits 12–15 | A9 | X |
| | Word 18, bits 0–3 | A10 | X |
| | Word 18, bits 4–7 | A11 | X |
| | Word 18, bits 8–11 | A12 | X |
| | Word 18, bits 12–15 | A13 | X |

TABLE 2-continued

ECDR/EPNR Record Format:

| Word #, Bit # | Description | | |
|---|---|---|---|
| | Word 19, bits 0–3 | A14 | X |
| | Word 19, bits 4–7 | A15 | X |
| | Word 19, bits 8–11 | A16 | X |
| | Word 19, bits 12–15 | A17 | X |
| | Word 20, bits 0–3 | A18 | X |
| | Word 20, bits 4–7 | A19 | X |
| | Word 20, bits 8–11 | A20 | TBCD-Null |
| | Word 20, bits 12–15 | A21 | SUPP1 |
| | Word 21, bits 0–3 | A22 | SUPP2 |
| | Word 21, bits 4–7 | A23 | SUPP3 |
| | Word 21, bits 8–11 | A24 | SUPP4 |
| | Word 21, bits 12–15 | A25 | SUPP5 |
| | Word 22, bits 0–3 | A26 | SUPP6 |
| | Word 22, bits 4–7 | A27 | SUPP7 |
| | Word 22, bits 8–11 | A28 | SUPP8 |
| | Word 22, bits 12–15 | A29 | SUPP9 |
| | Word 23, bits 0–3 | A30 | SUPP10 |
| | Word 23, bits 4–7 | A31 | SUPP11 |
| | Word 23, bits 8–11 | A32 | SUPP12 |
| | Word 23, bits 12–15 | A33 | SUPP13 |
| | Word 24, bits 0–3 | A34 | SUPP14 |
| | Word 24, bits 4–7 | A35 | SUPP15 |
| | Word 24, bits 8–11 | A36 | SUPP16 |
| | Word 24, bits 12–15 | A37 | SUPP17 |
| | Word 25, bits 0–3 | A38 | SUPP18 |
| | Word 25, bits 4–7 | A39 | SUPP19 |
| | Word 25, bits 8–11 | A40 | SUPP20 |
| | Word 25, bits 12–15 | A41 | SUPP21 |
| | Word 26, bits 0–3 | A42 | SUPP22 |
| | Word 26, bits 4–7 | A43 | SUPP23 |
| | Word 26, bits 8–11 | A44 | SUPP24 |
| | Word 26, bits 12–15 | A45 | SUPP25 |
| | 6. 14 Digit MCI/VNet Calling Card: | | |
| | Word 15, bits 12–15 | A1 | X |
| | Word 16, bits 0–3 | A2 | X |
| | Word 16, bits 4–7 | A3 | X |
| | Word 16, bits 8–11 | A4 | X |
| | Word 16, bits 12–15 | A5 | X |
| | Word 17, bits 0–3 | A6 | X |
| | Word 17, bits 4–7 | A7 | X |
| | Word 17, bits 8–11 | A8 | X |
| | Word 17, bits 12–15 | A9 | X |
| | Word 18, bits 0–3 | A10 | X |
| | Word 18, bits 4–7 | A11 | TBCD-A |
| | Word 18, bits 8–11 | A12 | TBCD-A |
| | Word 18, bits 12–15 | A13 | TBCD-A |
| | Word 19, bits 0–3 | A14 | TBCD-A |
| | Word 19, bits 4–7 | A15 | TBCD-Null |
| | Word 19, bits 8–11 | A16 | SUPP1 |
| | Word 19, bits 12–15 | A17 | SUPP2 |
| | Word 20, bits 0–3 | A18 | SUPP3 |
| | Word 20, bits 4–7 | A19 | SUPP4 |
| | Word 20, bits 8–11 | A20 | SUPP5 |
| | Word 20, bits 12–15 | A21 | SUPP6 |
| | Word 21, bits 0–3 | A22 | SUPP7 |
| | Word 21, bits 4–7 | A23 | SUPP8 |
| | Word 21, bits 8–11 | A24 | SUPP9 |
| | Word 21, bits 12–15 | A25 | SUPP10 |
| | Word 22, bits 0–3 | A26 | SUPP11 |
| | Word 22, bits 4–7 | A27 | SUPP12 |
| | Word 22, bits 8–11 | A28 | SUPP13 |
| | Word 22, bits 12–15 | A29 | SUPP14 |
| | Word 23, bits 0–3 | A30 | SUPP15 |
| | Word 23, bits 4–7 | A31 | SUPP16 |
| | Word 23, bits 8–11 | A32 | SUPP17 |
| | Word 23, bits 12–15 | A33 | SUPP18 |
| | Word 24, bits 0–3 | A34 | SUPP19 |
| | Word 24, bits 4–7 | A35 | SUPP20 |
| | Word 24, bits 8–11 | A36 | SUPP21 |
| | Word 24, bits 12–15 | A37 | SUPP22 |
| | Word 25, bits 0–3 | A38 | SUPP23 |
| | Word 25, bits 4–7 | A39 | SUPP24 |
| | Word 25, bits 8–11 | A40 | SUPP25 |
| | Word 25, bits 12–15 | A41 | SUPP26 |

TABLE 2-continued

ECDR/EPNR Record Format:

| Word #, Bit # | Description | | |
|---|---|---|---|
| | Word 26, bits 0–3 | A42 | SUPP27 |
| | Word 26, bits 4–7 | A43 | SUPP28 |
| | Word 26, bits 8–11 | A44 | SUPP29 |
| | Word 26, bits 12–15 | A45 | SUPP30 |

7. OSID/OTG:

| Word 15, bits 12–15 | A1 | X (OSID) |
|---|---|---|
| Word 16, bits 0–3 | A2 | X (OSID) |
| Word 16, bits 4–7 | A3 | X (OSID) |
| Word 16, bits 8–11 | A4 | X (OTG) |
| Word 16, bits 12–15 | A5 | X (OTG) |
| Word 17, bits 0–3 | A6 | X (OTG) |
| Word 17, bits 4–7 | A7 | X (OTG) |
| Word 17, bits 8–11 | A8 | TBCD-Null |
| Word 17, bits 12–15 | A9 | TBCD-Null |
| Word 18, bits 0–3 | A10 | TBCD-Null |
| Word 18, bits 4–7 | A11 | TBCD-Null |
| Word 18, bits 8–11 | A12 | TBCD-Null |
| Word 18, bits 12–15 | A13 | TBCD-Null |
| Word 19, bits 0–3 | A14 | TBCD-Null |
| Word 19, bits 4–7 | A15 | TBCD-Null |
| Word 19, bits 8–11 | A16 | TBCD-Null |
| Word 19, bits 12–15 | A17 | TBCD-Null |
| Word 20, bits 0–3 | A18 | TBCD-Null |
| Word 20, bits 4–7 | A19 | TBCD-Null |
| Word 20, bits 8–11 | A20 | TBCD-Null |
| Word 20, bits 12–15 | A21 | TBCD-Null |
| Word 21, bits 0–3 | A22 | TBCD-Null |
| Word 21, bits 4–7 | A23 | TBCD-Null |
| Word 21, bits 8–11 | A24 | TBCD-Null |
| Word 21, bits 12–15 | A25 | TBCD-Null |
| Word 22, bits 0–3 | A26 | TBCD-Null |
| Word 22, bits 4–7 | A27 | TBCD-Null |
| Word 22, bits 8–11 | A28 | TBCD-Null |
| Word 22, bits 12–15 | A29 | TBCD-Null |
| Word 23, bits 0–3 | A30 | TBCD-Null |
| Word 23, bits 4–7 | A31 | TBCD-Null |
| Word 23, bits 8–11 | A32 | TBCD-Null |
| Word 23, bits 12–15 | A33 | TBCD-Null |
| Word 24, bits 0–3 | A34 | TBCD-Null |
| Word 24, bits 4–7 | A35 | TBCD-Null |
| Word 24, bits 8–11 | A36 | TBCD-Null |
| Word 24, bits 12–15 | A37 | TBCD-Null |
| Word 25, bits 0–3 | A38 | TBCD-Null |
| Word 25, bits 4–7 | A39 | TBCD-Null |
| Word 25, bits 8–11 | A40 | TBCD-Null |
| Word 25, bits 12–15 | A41 | TBCD-Null |
| Word 26, bits 0–3 | A42 | TBCD-Null |
| Word 26, bits 4–7 | A43 | TBCD-Null |
| Word 26, bits 8–11 | A44 | TBCD-Null |
| Word 26, bits 12–15 | A45 | TBCD-Null |

OSID = Originating Switch ID
OTG = Originating Trunk ID

8. Telecommunication/PTT Cards:

| Word 15, bits 12–15 | A1 | X |
|---|---|---|
| Word 16, bits 0–3 | A2 | X |
| Word 16, bits 4–7 | A3 | X |
| Word 16, bits 8–11 | A4 | X |
| Word 16, bits 12–15 | A5 | X |
| Word 17, bits 0–3 | A6 | X |
| Word 17, bits 4–7 | A7 | X |
| Word 17, bits 8–11 | A8 | X |
| Word 17, bits 12–15 | A9 | X |
| Word 18, bits 0–3 | A10 | X |
| Word 18, bits 4–7 | A11 | X |
| Word 18, bits 8–11 | A12 | X |
| Word 18, bits 12–15 | A13 | X |
| Word 19, bits 0–3 | A14 | X |
| Word 19, bits 4–7 | A15 | X |
| Word 19, bits 8–11 | A16 | X |
| Word 19, bits 12–15 | A17 | X |
| Word 20, bits 0–3 | A18 | X |
| Word 20, bits 4–7 | A19 | X |
| Word 20, bits 8–11 | A20 | X |

TABLE 2-continued

ECDR/EPNR Record Format:

| Word #, Bit # | Description | | |
|---|---|---|---|
| | Word 20, bits 12–15 | A21 | X |
| | Word 21, bits 0–3 | A22 | X |
| | Word 21, bits 4–7 | A23 | X |
| | Word 21, bits 8–11 | A24 | TBCD-Null |
| | Word 21, bits 12–15 | A25 | SUPP1 |
| | Word 22, bits 0–3 | A26 | SUPP2 |
| | Word 22, bits 4–7 | A27 | SUPP3 |
| | Word 22, bits 8–11 | A28 | SUPP4 |
| | Word 22, bits 12–15 | A29 | SUPP5 |
| | Word 23, bits 0–3 | A30 | SUPP6 |
| | Word 23, bits 4–7 | A31 | SUPP7 |
| | Word 23, bits 8–11 | A32 | SUPP8 |
| | Word 23, bits 12–15 | A33 | SUPP9 |
| | Word 24, bits 0–3 | A34 | SUPP10 |
| | Word 24, bits 4–7 | A35 | SUPP11 |
| | Word 24, bits 8–11 | A36 | SUPP12 |
| | Word 24, bits 12–15 | A37 | SUPP13 |
| | Word 25, bits 0–3 | A38 | SUPP14 |
| | Word 25, bits 4–7 | A39 | SUPP15 |
| | Word 25, bits 8–11 | A40 | SUPP16 |
| | Word 25, bits 12–15 | A41 | SUPP17 |
| | Word 26, bits 0–3 | A42 | SUPP18 |
| | Word 26, bits 4–7 | A43 | SUPP19 |
| | Word 26, bits 8–11 | A44 | SUPP20 |
| | Word 26, bits 12–15 | A45 | SUPP21 |
| | 9. Business Group ID: | | |
| | Word 15, bits 12–15 | A1 | X |
| | Word 16, bits 0–3 | A2 | X |
| | Word 16, bits 4–7 | A3 | X |
| | Word 16, bits 8–11 | A4 | X |
| | Word 16, bits 12–15 | A5 | X |
| | Word 17, bits 0–3 | A6 | X |
| | Word 17, bits 4–7 | A7 | TBCD-Null |
| | Word 17, bits 8–11 | A8 | SUPP1 |
| | Word 17, bits 12–15 | A9 | SUPP2 |
| | Word 18, bits 0–3 | A10 | SUPP3 |
| | Word 18, bits 4–7 | A11 | SUPP4 |
| | Word 18, bits 8–11 | A12 | SUPP5 |
| | Word 18, bits 12–15 | A13 | SUPP6 |
| | Word 19, bits 0–3 | A14 | SUPP7 |
| | Word 19, bits 4–7 | A15 | SUPP8 |
| | Word 19, bits 8–11 | A16 | SUPP9 |
| | Word 19, bits 12–15 | A17 | SUPP10 |
| | Word 20, bits 0–3 | A18 | SUPP11 |
| | Word 20, bits 4–7 | A19 | SUPP12 |
| | Word 20, bits 8–11 | A20 | SUPP13 |
| | Word 20, bits 12–15 | A21 | SUPP14 |
| | Word 21, bits 0–3 | A22 | SUPP15 |
| | Word 21, bits 4–7 | A23 | SUPP16 |
| | Word 21, bits 8–11 | A24 | SUPP17 |
| | Word 21, bits 12–15 | A25 | SUPP18 |
| | Word 22, bits 0–3 | A26 | SUPP19 |
| | Word 22, bits 4–7 | A27 | SUPP20 |
| | Word 22, bits 8–11 | A28 | SUPP21 |
| | Word 22, bits 12–15 | A29 | SUPP22 |
| | Word 23, bits 0–3 | A30 | SUPP23 |
| | Word 23, bits 4–7 | A31 | SUPP24 |
| | Word 23, bits 8–11 | A32 | SUPP25 |
| | Word 23, bits 12–15 | A33 | SUPP26 |
| | Word 24, bits 0–3 | A34 | SUPP27 |
| | Word 24, bits 4–7 | A35 | SUPP28 |
| | Word 24, bits 8–11 | A36 | SUPP29 |
| | Word 24, bits 12–15 | A37 | SUPP30 |
| | Word 25, bits 0–3 | A38 | TBCD-Null |
| | Word 25, bits 4–7 | A39 | TBCD-Null |
| | Word 25, bits 8–11 | A40 | TBCD-Null |
| | Word 25, bits 12–15 | A41 | TBCD-Null |
| | Word 26, bits 0–3 | A42 | TBCD-Null |
| | Word 26, bits 4–7 | A43 | TBCD-Null |
| | Word 26, bits 8–11 | A44 | TBCD-Null |
| | Word 26, bits 12–15 | A45 | TBCD-Null |
| | 11. Network Information: | | |
| | Word 15, bits 12–15 | A1 | X |

TABLE 2-continued

ECDR/EPNR Record Format:

| Word #, Bit # | Description |
|---|---|
| | Word 16, bits 0–3　　A2　　X |
| | Word 16, bits 4–7　　A3　　X |
| | Word 16, bits 8–11　 A4　　X |
| | Word 16, bits 12–15 A5　　TBCD-Null |
| | Word 17, bits 0–3　　A6　　SUPP1 |
| | Word 17, bits 4–7　　A7　　SUPP2 |
| | Word 17, bits 8–11　 A8　　SUPP3 |
| | Word 17, bits 12–15 A9　　SUPP4 |
| | Word 18, bits 0–3　　A10　 SUPP5 |
| | Word 18, bits 4–7　　A11　 SUPP6 |
| | Word 18, bits 8–11　 A12　 SUPP7 |
| | Word 18, bits 12–15 A13　 SUPP8 |
| | Word 19, bits 0–3　　A14　 SUPP9 |
| | Word 19, bits 4–7　　A15　 SUPP10 |
| | Word 19, bits 8–11　 A16　 SUPP11 |
| | Word 19, bits 12–15 A17　 SUPP12 |
| | Word 20, bits 0–3　　A18　 SUPP13 |
| | Word 20, bits 4–7　　A19　 SUPP14 |
| | Word 20, bits 8–11　 A20　 SUPP15 |
| | Word 20, bits 12–15 A21　 SUPP16 |
| | Word 21, bits 0–3　　A22　 SUPP17 |
| | Word 21, bits 4–7　　A23　 SUPP18 |
| | Word 21, bits 8–11　 A24　 SUPP19 |
| | Word 21, bits 12–15 A25　 SUPP20 |
| | Word 22, bits 0–3　　A26　 SUPP21 |
| | Word 22, bits 4–7　　A27　 SUPP22 |
| | Word 22, bits 8–11　 A28　 SUPP23 |
| | Word 22, bits 12–15 A29　 SUPP24 |
| | Word 23, bits 0–3　　A30　 SUPP25 |
| | Word 23, bits 4–7　　A31　 SUPP26 |
| | Word 23, bits 8–11　 A32　 SUPP27 |
| | Word 23, bits 12–15 A33　 SUPP28 |
| | Word 24, bits 0–3　　A34　 SUPP29 |
| | Word 24, bits 4–7　　A35　 SUPP30 |
| | Word 24, bits 8–11　 A36　 TBCD-Null |
| | Word 24, bits 12–15 A27　 TBCD-Null |
| | Word 25, bits 0–3　　A38　 TBCD-Null |
| | Word 25, bits 4–7　　A39　 TBCD-Null |
| | Word 25, bits 8–11　 A40　 TBCD-Null |
| | Word 25, bits 12–15 A41　 TBCD-Null |
| | Word 26, bits 0–3　　A42　 TBCD-Null |
| | Word 26, bits 4–7　　A43　 TBCD-Null |
| | Word 26, bits 8–11　 A44　 TBCD-Null |
| | Word 26, bits 12–15 A45　 TBCD-Null |
| | 12. Network Call Identifier (NCID) - If the NCID is recorded in the "A" field, it will be recorded in binary beginning with A1. The Entry Code field will be indicative of the call processing associated with the particular call or "0". If the NCID is recorded in the NCID field of a 64 word call record, the Entry Code will also be indicative of the call processing associated with the particular call or "0". The NCID is comprised of the following:<br>Originating Switch ID<br>Originating Trunk Group<br>Originating Port Number<br>Timepoint One<br>NCID Sequence Number |
| Word 27, bits 0–3 | Feature Code (FC): Same as CDR/PNR format. |
| Word 27, bits 4–7 | Terminating Network Code (TNC): Same as CDR/PNR format. |
| Word 27, bits 8–11 | Network Access Type (NAT): Same as CDR/PNR format. |
| Word 27, bits 12–15 | Timepoint 7 Qualifier (TP&Q): Same as CDR/PNR format. |
| Word 28, bits 0–6 | Entry Code (EC): Same as CDR/PNR format. |
| Word 28, bits 7–9 | Prefix Digits (PD): Same as CDR/PNR format. |
| Word 28, bits 10–12 | NCS/DAP ID (NDID): Same as CDR/PNR format. |
| Word 28, bits 13–15 | Division ID (DIVID): Same as CDR/PNR format. |
| Word 29, bit 0 | Distant Overflow (DO): Same as CDR/PNR format. |
| Word 29, bit 1 | MCI Network Overflow (MNO): This bit indicates whether or not the Cause parameter that initiated overflow was generated due to MCI network detected conditions versus Reseller or Customer Location detected circumstances. This bit is set to 1 if the MNO subfield of the MBCSI parameter is set to 1 which indicates that the cause parameter that initiated overflow was generated due to MCI network detected conditions. This bit is set to 0 if the MNO subfield of the MBCSI parameter is set to 0 which indicates that the cause parameter that initiated overflow was generated due to a LEC, BOC, or Reseller condition. |

TABLE 2-continued

ECDR/EPNR Record Format:

| Word #, Bit # | Description |
|---|---|
| Word 29, bit 2 | Customer Connect (CC): Same as CDR/PNR format. |
| Word 29, bit 3 | Inter-Network (IN): Same as CDR/PNR format. |
| Word 29, bit 4 | Reported Overflow (RO): Same as CDR/PNR format. |
| Word 29, bit 5 | Not Used. |
| Word 29, bit 6 | Call Direction (CD): Same as CDR/PNR format. |
| Word 29, bit 7 | Destination (DE): Same as CDR/PNR format. |
| Word 29, bit 8 | Dedicated Termination (DT): Same as CDR/PNR format. |
| Word 29, bits 9–10 | Not Used. |
| Word 29, bit 11 | Satellite (SA): Same as CDR/PNR format. |
| Word 29, bits 12–15 | Nature of Calling Location ID (NOCLI): Same as CDR/PNR format. |
| Word 30, bits 0–15 | Carrier Number (CN): Same as CDR/PNR format. |
| Word 31, bits 0–3 | Authorization Code ID (ACIF): Same as CDR/PNR format. |
| Word 31, bits 4–10 | Release Code (RC): Same as CDR/PNR format. |
| Word 31, bits 11–13 | NCID Sequence Number: Same as CDR/PNR format. |
| Word 31, bit 14 | NCID Location (NCIDLOC): Same as CDR/PNR format. |
| Word 31, bit 15 | Remote ANI Screened (RS): Same as CDR/PNR format. |
| Word 32, bits 0–15 | Not Used. |
| Word 33, bits 0–15 | |
| Word 34, bits 0–15 | Destination Address (DA): Records up to 25 digits of the |
| Word 35, bits 0–15 | destination address in TBCD format in the sequence that they are |
| Word 36, bits 0–15 | received or translated to, starting with D1. Unused bytes contain |
| Word 37, bits 0–15 | TBCD-Null. |
| Word 38, bits 0–15 | |
| Word 39, bits 0–15 | |
| Word 40, bits 0–3 | |

|  |  | 7-digit | 10-digit | DDD | IDDD |
|---|---|---|---|---|---|
| Word 34, bits 0–3 | D1 | N | N | N | CC |
| Word 34, bits 4–7 | D2 | X | X | X | CC |
| Word 34, bits 8–11 | D3 | X | X | X | CC |
| Word 34, bits 12–15 | D4 | X | N | N | NN |
| Word 35, bits 0–3 | D5 | X | X | X | NN |
| Word 35, bits 4–7 | D6 | X | X | X | NN |
| Word 35, bits 8–11 | D7 | X | X | X | NN |
| Word 35, bits 12–15 | D8 | X (TSID) | X | X | NN |
| Word 36, bits 0–3 | D9 | X (TSID) | X | X | NN |
| Word 36, bits 4–7 | D10 | X (TSID) | X | X | NN |
| Word 36, bits 8–11 | D11 | X (TTG) | X (TSID) | T-Null | NN |
| Word 36, bits 12–15 | D12 | X (TTG) | X (TSID) | T-Null | NN |
| Word 37, bits 0–3 | D13 | X (TTG) | X (TSID) | T-Null | NN |
| Word 37, bits 4–7 | D14 | X (TTG) | X (TTG) | T-Null | NN |
| Word 37, bits 8–11 | D15 | T-Null | X (TTG) | T-Null | NN |
| Word 37, bits 12–15 | D16 | T-Null | X (TTG) | T-Null | T-Null |
| Word 38, bits 0–3 | D17 | T-Null | X (TTG) | T-Null | T-Null |
| Word 38, bits 4–7 | D18 | T-Null | T-Null | T-Null | T-Null |
| Word 38, bits 8–11 | D19 | T-Null | T-Null | T-Null | T-Null |
| Word 38, bits 12–15 | D20 | T-Null | T-Null | T-Null | T-Null |
| Word 39, bits 0–3 | D21 | T-Null | T-Null | T-Null | T-Null |
| Word 39, bits 4–7 | D22 | T-Null | T-Null | T-Null | T-Null |
| Word 39, bits 8–11 | D23 | T-Null | T-Null | T-Null | T-Null |
| Word 39, bits 12–15 | D24 | T-Null | T-Null | T-Null | T-Null |
| Word 40, bits 0–3 | D25 | T-Null | T-Null | T-Null | T-Null |

CC = Customer Connect
NN = National Number
TSID = Terminating Switch ID
TTG = Terminating Trunk ID
T-Null = TBCD-Null

|  |  | 18-digit |
|---|---|---|
| Word 34, bits 0–3 | D1 | N |
| Word 34, bits 4–7 | D2 | N |
| Word 34, bits 8–11 | D3 | N |
| Word 34, bits 12–15 | D4 | N |
| Word 35, bits 0–3 | D5 | N |
| Word 35, bits 4–7 | D6 | N |
| Word 35, bits 8–11 | D7 | N |
| Word 35, bits 12–15 | D8 | N |
| Word 36, bits 0–3 | D9 | N |
| Word 36, bits 4–7 | D10 | N |
| Word 36, bits 8–11 | D11 | N |
| Word 36, bits 12–15 | D12 | N |
| Word 37, bits 0–3 | D13 | N |
| Word 37, bits 4–7 | D14 | N |
| Word 37, bits 8–11 | D15 | N |

TABLE 2-continued

ECDR/EPNR Record Format:

| Word #, Bit # | Description |
|---|---|
| | Word 37, bits 12–15 D16 N |
| | Word 38, bits 0–3 D17 N |
| | Word 38, bits 4–7 D18 N |
| | Word 38, bits 8–11 D19 X (TSID) |
| | Word 38, bits 12–15 D20 X (TSID) |
| | Word 39, bits 0–3 D21 X (TSID) |
| | Word 39, bits 4–7 D22 X (TTG) |
| | Word 39, bits 8–11 D23 X (TTG) |
| | Word 39, bits 12–15 D24 X (TTG) |
| | Word 40, bits 0–3 D25 X CPIG) |
| | TSID = Terminating Switch ID |
| | TTG = Terminating Trunk ID |
| Word 40, bits 4–15<br>Word 41, bits 0–15<br>Word 42, bits 0–15<br>Word 43, bits 0–15 | Pretranslated Digits (PTD): Represents up to 15 digits of a number that is the translation of a number dialed by the caller. |

| | | 10 digit VNet, SAC DNIS, or Hotline | 00Y SAC Code | 7 digit VNet or SNS | VNet/ IDDD 15 digit (example) |
|---|---|---|---|---|---|
| Word 40, bits 4–7 | PTD1 | N | 0 | N | N |
| Word 40, bits 8–11 | PTD2 | X | 0 | X | N |
| Word 40, bits 12–15 | PTD3 | X | Y | X | N |
| Word 41, bits 0–3 | PTD4 | N | N | X | N |
| Word 41, bits 4–7 | PTD5 | X | X | X | N |
| Word 41, bits 8–11 | PTD6 | X | X | X | N |
| Word 41, bits 12–15 | PTD7 | X | X | X | N |
| Word 42, bits 0–3 | PTD8 | X | X | T-Null | N |
| Word 42, bits 4–7 | PTD9 | X | X | T-Null | N |
| Word 42, bits 8–11 | PTD10 | X | X | T-Null | N |
| Word 42, bits 12–15 | PTD11 | T-Null | T-Null | T-Null | N |
| Word 43, bits 0–3 | PTD12 | T-Null | T-Null | T-Null | N |
| Word 43, bits 4–7 | PTD13 | T-Null | T-Null | T-Null | N |
| Word 43, bits 8–11 | PTD14 | T-Null | T-Null | T-Null | N |
| Word 43, bits 12–15 | PTD15 | T-Null | T-Null | T-Null | N |

| Word #, Bit # | Description |
|---|---|
| | T-Null = TBCD-Null |
| Word 44, bits 0–7 | Enhanced International Routing (EIR) Call Type: Contains the EIR call type ID as received from the DAP in the NCS billing information parameter or from the operator in the NCS billing information ISUP RLT parameter. Recorded in binary. |
| Word 44, bits 8–14 | Overflow Cause Value (OVFVAL): This field is the binary equivalent of the first cause value received or formatted in-switch. This value is taken from the cause value subfield in the cause parameter that initiated overflow. |
| Word 44, bit 15 | Counts As Bid (CB): This field is used with the EIR feature. The bit is set to '1' or '0' as per the information received from the DAP in the CB field of the NCS billing information parameter or from the operator in the NCS billing information ISUP RLT parameter.<br>0 = Does not count as bid (default)<br>1 = Counts as bid |
| Word 45, bits 0–3 | Overflow Cause Location (OVFCL): This field is the binary equivalent of the value recorded from the first cause location received or formatted in-switch. This information is taken from the cause location subfield in the cause parameter that initiated overflow. |
| Word 45, bits 4–15<br>Word 46, bits 0–15<br>Word 47, bits 0–15<br>Word 48, bits 0–15 | Desired Terminating Address (DTA): These 15 bytes contain the originally intended or "desired" termination before overflow was triggered. They contain either: 1) the desired terminating switch id and trunk group for calls that were sent to a DTC termination, 2) a national number, or 3) intentional number based on what the action code returned from the DAP for the desired termination. |

| | | DTC DTSID + DTTG | DDD |
|---|---|---|---|
| Word 45, bits 4–7 | DTA1 | 0 | N |
| Word 45, bits 8–11 | DTA2 | X (DTSID1) | X |
| Word 45, bits 12–15 | DTA3 | X (DTSID2) | X |
| Word 46, bits 0–3 | DTA4 | X (DTSID3) | N |
| Word 46, bits 4–7 | DTA5 | 0 | X |
| Word 46, bits 8–11 | DTA6 | X (DTTG1) | X |
| Word 46, bits 12–15 | DTA7 | X (DTTG2) | X |
| Word 47, bits 0–3 | DTA8 | X (DTTG3) | X |
| Word 47, bits 4–7 | DTA9 | X (DTTG4) | X |
| Word 47, bits 8–11 | DTA10 | TBCD-Null | X |

TABLE 2-continued

ECDR/EPNR Record Format:

| Word #, Bit # | Description |
|---|---|

|  | Word 47, bits 12–15 | DTA11 | TBCD-Null | TBCD-Null |
|---|---|---|---|---|
|  | Word 48, bits 0–3 | DTA12 | TBCD-Null | TBCD-Null |
|  | Word 48, bits 4–7 | DTA13 | TBCD-Null | TBCD-Null |
|  | Word 48, bits 8–11 | DTA14 | TBCD-Null | TBCD-Null |
|  | Word 48, bits 12–15 | DTA15 | TBCD-Null | TBCD-Null |

DTSID = Desired Termination Switch ID
DTTG = Desired Termination Trunk Group

|  |  | IDDD (example) | DTC (future) |
|---|---|---|---|
| Word 45, bits 4–7 | DTA1 | CC | X (DTSID1) |
| Word 45, bits 8–11 | DTA2 | CC | X (DTSID2) |
| Word 45, bits 12–15 | DTA3 | CC | X (DTSID3) |
| Word 46, bits 0–3 | DTA4 | NN | X (DTSID4) |
| Word 46, bits 4–7 | DTA5 | NN | X (DTTG1) |
| Word 46, bits 8–11 | DTA6 | NN | X (DTTG2) |
| Word 46, bits 12–15 | DTA7 | NN | X (DTTG3) |
| Word 47, bits 0–3 | DTA8 | NN | X (DTTG4) |
| Word 47, bits 4–7 | DTA9 | NN | X (DTTG5) |
| Word 47, bits 8–11 | DTA10 | NN | TBCD-Null |
| Word 47, bits 12–15 | DTA11 | NN | TBCD-Null |
| Word 48, bits 0–3 | DTA12 | NN | TBCD-Null |
| Word 48, bits 4–7 | DTA13 | NN | TBCD-Null |
| Word 48, bits 8–11 | DTA14 | NN | TBCD-Null |
| Word 48, bits 12–15 | DTA15 | TBCD-Null | TBCD-Null |

CC = Customer Connect
DTSID = Desired Termination Switch ID
DTTG = Desired Termination Trunk Group
NN = National Number

| Word #, Bit # | Description |
|---|---|
| Word 49, bits 0–6 | Overflow Count (OVFC): Indicates the total number of intermediate overflow attempts before successful termination was achieved. This value is incremented each time the DAP is accessed for overflow information. |
| Word 49, bits 7–12 | Desired Termination Action Code (DTAC): This field represents the action code which was received from the DAP in the first response. This information is used to identify the type of information which is recorded in the DTA field. |
| Word 49, bit 13 | Not Used. |
| Word 49, bits 14–15<br>Words 50–54, bits 0–15 | Network Call Identifier (NCID): Contains the binary representation of the NCID. The NCID is recorded here at intermediate and terminating switches if the Authcode field is being used to record other information. The NCID is created at the originating switch and is passed to intermediate and terminating switches. The format of the NCID is:<br>Originating Switch ID (OSID)<br>Originating Trunk Group (OTG)<br>Originating Port (OP)<br>Timepoint 1 (TP1)<br>NCID Sequence Number |
| Words 55–58, bits 0–15<br>Word 59, bits 0–10 | Not Used. |
| Word 59, bits 11–13 | User to User Type (UUS Type): Contains a binary representation used to identify the type of User to User service being utilized. If this field is set to '0' and the UUIE Count field is set to a value other than '0', then non-call associated User to User information is being transferred.<br>0 = No message or call associated UUS invoked (default)<br>1 = MA-UUI only<br>2 = CA-TSC at call setup only<br>3 = CA-TSC after call setup only<br>4 = CA-TSC at call setup and CA-TSC after call setup<br>5 = MA-UUI and CA-TSC at call setup<br>6 = MA-UUI and CA-TSC after call setup<br>7 = MA-UUI and CA-TSC at call setup and CA-TSC after call setup |
| Word 59, bits 14–15<br>Word 60, bits 0–13 | User to User Information Element Count (UUIE Count): Contains the binary count of UUIE delivered in either direction per TSC. Both the originating and terminating switches shall maintain a counter to count the number of UUIE delivered on a per call basis. Each switch shall count all UUIE in either direction whether delivered or not. The billed party shall be responsible for paying for the UUIE transport. If the count reaches the maximum value of 65535, it will hold at this value until a new call record is created. The beared channel will be disconnected one the maximum count is reached. |

TABLE 2-continued

ECDR/EPNR Record Format:

| Word #, Bit # | Description |
|---|---|
| Word 60, bits 14–15 | Overflow Case Codeing Standard (OVFCS): Contains the binary equivalent of the first coding standard received or formatted in-switch. This value is taken from the coding standard subfield in the cause parameter that initiated overflow. It will not be overwritten by subsequent coding standards received or in-switch formatted values. This field is used for enhanced overflow calls only. |
| Word 61, bits 0–15<br>Word 62, bits 0–7 | Originating NX64 Bitmap: Records the port number that corresponds with the originating control channel of the call in the originating port in the CDR/PNR. This bitmap is used to identify the subsequent channels in the same T1 timespan that are used in the call. A particular bit is set to indicate if this channel was used on the call. The number of bits that are set is used to identify the number N in an NX64 call. |
| Word 62, bits 8–15<br>Word 63, bits 0–15 | Terminating NX64 Bitmap: Record the port number that corresponds to the terminating control channel of the call in the terminating port in the CDR/PNR. This bitmap will be used to identify the subsequent channels in the same T1 span that are used in the call. A particular bit is set to indicate if this channel was used on the call. The number of bits that are set is used to identify the number N in an NX64 call. In general, each channel transmits at 64 Kbits/second, and if a customer needs more than one channel, this bitmap indicates which channels are used in the call. |

TABLE 3

OSR/POSR Record Format:

| Word #, Bit # | Description |
|---|---|
| Word 0, bits 0–3 | Call Record Id (CRID): Identifies the record type.<br>0 = Default<br>1 = CDR<br>2 = SER<br>3 = PNR<br>4 = OSR<br>5 = POSR<br>6 = ECDR<br>7 = EPOSR<br>8 = EOSR<br>9 = EPOSR<br>10–15 = Not Used |
| Word 0, bits 4–15 | Call Disconnect ID (CDID): Identifies the call record. Each call record has a unique ID number. These 12 bits contain the 12, least significant bits of the CDID. |
| Word 1, bits 0–15<br>Word 2, bits 0–15 | Timepoint 1 (TP1): A binary count of the number of seconds that occurred between midnight (UTC) on January 1, 1976, and the time that the incoming call was detected by the switch. |
| Word 3, bits 0–12 | Timepoint 4 (TP4): A binary count of the number of seconds between Timepoint 1 and the time the operator position was seized by the switch. |
| Word 3, bits 13–15<br>Word 4, bits 0–9 | Timepoint 6 (TP6): A binary count of the number of seconds between timepoint 1 and the time Answer Supervision was detected or received. This is the time that it took for the call to be answered by the person or audio system being called. |
| Word 4, bits 10–15<br>Word 5, bits 0–15 | Timepoint 7 (TP7): A binary count of the number of seconds between timepoint 1 and the time that the originating or terminating party disconnected whichever is first. |
| Word 6, bits 0–15<br>Word 7, bit 1 | Originating Port (OP): The absolute port number of the originating truck. Originating truck is the line on which the call came to the switch. |
| Word 7, bits 2–15<br>Word 8, bits 0–1 | Terminating Port (TP): The absolute port number of the last terminating trunk seized for an outgoing call attempt. The terminating trunk is the last line on which the call is transmitted. |
| Word 8, bits 2–14 | Originating Trunk Group (OTG): A binary number expressing the Originating Trunk Group number of the originating trunk. An originating trunk group is a group of ports coming from the same location. |
| Word 8, bit 15<br>Word 9, bits 0–11 | Terminating Trunk Group (TTG): A binary number expressing the Terminating Trunk Group number of the Terminating trunk. A terminating trunk group is a group of ports going to the same location. If a call fails because no trunks are available, record the |

TABLE 3-continued

OSR/POSR Record Format:

| Word #, Bit # | Description |
| --- | --- |
| | last trunk group number that was attempted. |
| Word 9, bits 12–15 | Timepoint 3 qualifier. (TP3Q): Contains the outpulsed call disposition qualifier which provides the telephone number of the person making the call to the person being called. The person being called needs to have signed up for the "ANI Delivery" service and have a display device for displaying the caller's telephone number.<br>0 = Default<br>1 = ANI/CSI was delivered<br>2 = DNIS was delivered<br>3 = ANI/CSI and DNIS were delivered<br>4–5 = Not Used<br>6 = NCT<br>7 = NCT, ANI/CSI was delivered<br>8 = NCT, DNIS was delivered<br>9 = NCT, ANI/CSI and DINS was delivered<br>10 = NCT Tandem<br>11–15 = Not Used |
| Word 10, bits 0–1 | Timepoint 6 qualifier (TP6Q): Contains the answer supervision qualifier indicating the way in which the telephone call was answered.<br>0 = Hardware detected an Answer<br>1 = Software detected Voice<br>2 = Not Used<br>3 = Operator/NARS detected an Answer |
| Word 10, bits 2–7 | Action Code (AC): The switch provides an action code which indicates the type of destination address, or what type of telephone number was called, or an error code.<br>0 = Default<br>1 = 7-digit number without overflow<br>2 = 7-digit number with overflow<br>3 = DDD number<br>4 = IDDD number<br>5 = Switch generated Action Code<br>6 = Incoming exclusion failure<br>7 = ID code failure<br>8 = Unexpected error occurs in the NCS/DAP<br>9 = Misdialed number and the NCS/DAP is unable to translate the dialed number<br>10 = 10-digit number without overflow<br>11 = 10-digit number with overflow<br>12 = National with overflow<br>13 = International with overflow<br>14 = ANI not found<br>15 = NPA-NXXX not found<br>16 = Pilot number not found<br>17 = Associated partition not found<br>18 = ADF format error<br>19 = Switch ID not found<br>20 = 800 number not found<br>21 = 800 number out of band<br>22 = Not Used<br>23 = Invalid ID code<br>24 = Range privilege<br>25 = 7-digit number not in database<br>26 = 10-digit exclusion feature<br>27 = 900 number not found<br>28 = 900 number out of band<br>29 = Not Used<br>30 = NCS network management blocked<br>31 = NCS Gate Denial<br>32 = FlexSTC, Overflow Not Allowed<br>33 = FlexSTC, Overflow Allowed<br>34 = SAC Number Not Found<br>35 = SAC Number Out of Band<br>36 = 700 Number Not Found<br>37 = 700 Number Out of Band<br>38 = ICR designated Out of Band<br>39 = NCT - Reversed call direction<br>40–48 = Not Used<br>49 = Information Call<br>50 = Flexible Direct Termination Call without overflow<br>51 = Flexible Direct Termination Call with overflow<br>52 = Outbound IVNet without overflow<br>53 = Outbound IVNet with overflow |

TABLE 3-continued

OSR/POSR Record Format:

| Word #, Bit # | Description |
|---|---|
| | 54 = Global Switch Profile not found |
| | 55 = ANI Index Provided by DAP |
| | 56–62 = Not Used |
| | 63 = International Inbound APP |
| Word 10, bits 8–11 | Originating Trunk Class (OTC): Indicates what type of originating trunk was accessed. |
| | 0 = ONAL (FG-A) |
| | 1 = ONAT (FG-B, FG-C, FG-D, CAMA, LAMA) |
| | 2 = DAL, VNET CAMA, FGS-DAL) |
| | 3 = IMT (Inband or SS7) |
| | 4 = Internation Circuit (R1, R2, #5, #6, #7) |
| | 5 = ISDN PRI |
| | 6 = OST |
| | 7–15 = Not Used |
| Word 10, bits 12–15 | Terminating Trunk Class (TTC): Indicates what type of terminating trunk was accessed. |
| | 0 = ONAL (FG-A) |
| | 1 = ONAT (FG-B, FG-C, FG-D, CAMA, LAMA) |
| | 2 = DAL, VNET CAMA, FGS-DAL) |
| | 3 = IMT (Inband or SS7) |
| | 4 = Internation Circuit (R1, R2, #5, #6, #7) |
| | 5 = ISDN PRI |
| | 6 = OST |
| | 7–15 = Not Used |
| | FG = Feature Group |
| Word 11, bits 0–7 | Information Digits (ID): The switch receives these digits from the originating trunk group indicating the type of telephone on which the telephone call originated, such as a home telephone, pay telephone, or prison telephone. |

|  | FG-B Direct, CAMA | FG-D | MCI IMT | #5 | #6 |
|---|---|---|---|---|---|
| bits 0–3: | TBCD Null | X | X | TBCD Null | X |
| bits 4–7: | X | X | X | X | X |

| Word #, Bit # | Description |
|---|---|
| Word 11, bits 8–11 | Originating NACC (ONACC): This field contains the North American Coding Convention code which is received in the incoming digit stream to the operator switch. This code identifies the type of assistance required for inbound international calls. |
| | 0 = default |
| | 1 = 121 (Assistance without call completion) |
| | 2 = 131 (Directory assistance) |
| | 3 = 151 (Assistance with call completion) |
| | 4 = 160 (Manual transit) |
| | 5 = 191 (Call USA) |
| | 6–15 = Not Used |
| Word 11, bits 12–15 | Terminating NACC (TNACC): This field contains the North American Coding Convention code which is transmitted in the incoming digit stream to another operator switch. This code identifies the type of assistance required at the next operator switch. |
| | 0 = default |
| | 1 = 121 (Assistance without call completion) |
| | 2 = 131 (Directory assistance) |
| | 3 = 151 (Assistance with call completion) |
| | 4 = 160 (Manual transit) |
| | 5 = 191 (Call USA) |
| | 6–15 = Not Used |
| Word 12, bits 0–15<br>Word 13, bits 0–15<br>Word 14, bits 0–7 | Call Location ID (CLI): Represents the 10 digits from where the call came. If switch receives more than 10 digits, record them in the ECDR/EPOSR.<br>1. VNet CAMA DAL originations: If CSI is available, prefix the CSI with filed HNPA and HNXX information, if available, and record. Use NOCLI value of 7.<br>2. FG-C originations: If ANI or CSI information is not available and the number is in the 00Y+NXX+XXXX format, record the 00Y in CLI1–3, and record the OSID/OTG in CLI4–10. Use NOCLI value of 8.<br>3. Inband FG-D Originations: Record the ANI that was received starting with CLI1. Use NOCLI value of 1.<br>4. SS7 FG-D Originations: Record the charge number, if available. If not available, record the calling party number. Use NOCLI value of 2 or 3.<br>5. International originations: Record the country code and the national number of the calling party. Use NOCLI of 9.<br>6. SS7 IMTs Originations: Record the following information in |

TABLE 3-continued

OSR/POSR Record Format:

| Word #, Bit # | Description |
|---|---|

| | this order of importance: 1) charge number, 2) calling party number, 3) OSID/OTG from generic digits. Use NOCLI of 2, 3, or 8.<br>7. SS7 Reseller Originations: The CLI field is filled with TBCD-Nulls.<br>8. SS7 Private Network Originations: The CLI field is filled with TBCD-Nulls.<br>9. PRI Organizations: Record the calling party number received in the ISDN setup message.<br>The format: |

|  | 1–10 digit ANI | OSID/OTG | Incoming Int'l |
|---|---|---|---|
| Word 12, bits 0–3   CLI1  | TBCD Null | X(CC) |
| Word 12, bits 4–7   CLI2  | TBCD Null | X(CC) |
| Word 12, bits 8–11  CLI3  | TBCD Null | X(CC) |
| Word 12, bits 12–15 CLI4  | X(OSID)   | X(NN) |
| Word 13, bits 0–3   CLI5  | X(OSID)   | X(NN) |
| Word 13, bits 4–7   CLI6  | X(OSID)   | X(NN) |
| Word 13, bits 8–11  CLI7  | X(OTG)    | X(NN) |
| Word 13, bits 12–15 CLI8  | X(OTG)    | X(NN) |
| Word 14, bits 0–3   CLI9  | X(OTG)    | X(NN) |
| Word 14, bits 4–7   CLI10 | X(OTG)    |       |

CC = Customer Connect
NN = National Number
OSID = Originating Switch NSC ID (000–999)
OTG = Originating Trunk Group (0000–8191)

| Word #, Bit # | Description |
|---|---|
| Word 14, bits 8–15<br>Word 15, bits 0–15<br>Word 16, bits 0–15<br>Word 17, bits 0–15<br>Word 18, bits 0–15<br>Word 19, bits 0–15 | Authorization Codes: Represents 22 digits of who gets billed for the call which includes one or more of the following and/or an optional Supplementary Code:<br>1. Authorization Code - Contains the authorization code digits. AUTH1–AUTH5 records the dialed or filed authorization codes, afterwhich is recorded an optional variable 1–4 digit security code, SEC1–SEC4, comprised of TBCD digits 0–9 and A–D. After the last digit, record a TBCD-Null, afterwhich record any supplementary code digits, SUPP1–SUPP12. Record TBCD-Null in any unused byte. Authorization Code format: |

|  |  | 5 digit Auth Code | 6 digit Auth Code | 7 digit Auth Code |
|---|---|---|---|---|
| Word 14, bits 8-11   | A1  | AUTH1     | AUTH1     | AUTH1     |
| Word 14, bits 12–15  | A2  | AUTH2     | AUTH2     | AUTH2     |
| Word 15, bits 0–3    | A3  | AUTH3     | AUTH3     | AUTH3     |
| Word 15, bits 4–7    | A4  | AUTH4     | AUTH4     | AUTH4     |
| Word 15, bits 8–11   | A5  | AUTH5     | AUTH5     | AUTH5     |
| Word 15, bits 12–15  | A6  | SEC1      | AUTH6     | AUTH6     |
| Word 16, bits 0–3    | A7  | SEC2      | SEC1      | AUTH7     |
| Word 16, bits 4–7    | A8  | SEC3      | SEC2      | SEC1      |
| Word 16, bits 8–11   | A9  | SEC4      | SEC3      | SEC2      |
| Word 16, bits 12–15  | A10 | TBCD-Null | SEC4      | SEC3      |
| Word 17, bits 0–3    | A11 | SUPP1     | TBCD-Null | SEC4      |
| Word 17, bits 4–7    | A12 | SUPP2     | SUPP1     | TBCD-Null |
| Word 17, bits 8–11   | A13 | SUPP3     | SUPP2     | SUPP1     |
| Word 17, bits 12–15  | A14 | SUPP4     | SUPP3     | SUPP2     |
| Word 18, bits 0–3    | A15 | SUPP5     | SUPP4     | SUPP3     |
| Word 18, bits 4–7    | A16 | SUPP6     | SUPP5     | SUPP4     |
| Word 18, bits 8–11   | A17 | SUPP7     | SUPP6     | SUPP5     |
| Word 18, bits 12–15  | A18 | SUPP8     | SUPP7     | SUPP6     |
| Word 19, bits 0–3    | A19 | SUPP9     | SUPP8     | SUPP7     |
| Word 19, bits 4–7    | A20 | SUPP10    | SUPP9     | SUPP8     |
| Word 19, bits 8–11   | A21 | SUPP11    | SUPP10    | SUPP9     |
| Word 19, bits 12–15  | A22 | SUPP12    | SUPP11    | SUPP10    |

2. Calling Station ID (CSI) - Contains the digits of the calling station identifier. The CSI digits will be recorded starting at A1. A TBCD-Null is recorded after the last CSI digit, followed by Supplemental Code digits. Unused bytes contain a TBCD-Null. Calling Station ID format:

|  |  | 7 digit CSI | 10 digit CSI |
|---|---|---|---|
| Word 14, bits 8–11  | A1 | X | X |
| Word 14, bits 12–15 | A2 | X | X |
| Word 15, bits 0–3   | A3 | X | X |
| Word 15, bits 4–7   | A4 | X | X |
| Word 15, bits 8–11  | A5 | X | X |

TABLE 3-continued

OSR/POSR Record Format:

| Word #, Bit # | Description | | | |
|---|---|---|---|---|
| | Word 15, bits 12–15 | A6 | X | X |
| | Word 16, bits 0–3 | A7 | X | X |
| | Word 16, bits 4–7 | A8 | TBCD-Null | X |
| | Word 16, bits 8–11 | A9 | SUPP1 | X |
| | Word 16, bits 12–15 | A10 | SUPP2 | X |
| | Word 17, bits 0–3 | A11 | SUPP3 | TBCD-Null |
| | Word 17, bits 4–7 | A12 | SUPP4 | SUPP1 |
| | Word 17, bits 8–11 | A13 | SUPP5 | SUPP2 |
| | Word 17, bits 12–15 | A14 | SUPP6 | SUPP3 |
| | Word 18, bits 0–3 | A15 | SUPP7 | SUPP4 |
| | Word 18, bits 4–7 | A16 | SUPP8 | SUPP5 |
| | Word 18, bits 8–11 | A17 | SUPP9 | SUPP6 |
| | Word 18, bits 12–15 | A18 | SUPP10 | SUPP7 |
| | Word 19, bits 0–3 | A19 | SUPP11 | SUPP8 |
| | Word 19, bits 4–7 | A20 | SUPP12 | SUPP9 |
| | Word 19, bits 8–11 | A21 | SUPP13 | SUPP10 |
| | Word 19, bits 12–15 | A22 | SUPP14 | SUPP11 |

3. Supplementary Codes - Supplemental Codes are recorded starting in A1. Unused bytes contain TBCD-Null. Supplementary Code format:

|  |  | 800/900 VNet Supp. Codes |
|---|---|---|
| Word 14, bits 8–11 | A1 | SUPP1 |
| Word 14, bits 12–15 | A2 | SUPP2 |
| Word 15, bits 0–3 | A3 | SUPP3 |
| Word 15, bits 4–7 | A4 | SUPP4 |
| Word 15, bits 8–11 | A5 | SUPP5 |
| Word 15, bits 12–15 | A6 | SUPP6 |
| Word 16, bits 0–3 | A7 | SUPP7 |
| Word 16, bits 4–7 | A8 | SUPP8 |
| Word 16, bits 8–11 | A9 | SUPP9 |
| Word 16, bits 12–15 | A10 | SUPP10 |
| Word 17, bits 0–3 | A11 | SUPP11 |
| Word 17, bits 4–7 | A12 | SUPP12 |
| Word 17, bits 8–11 | A13 | SUPP13 |
| Word 17, bits 12–15 | A14 | SUPP14 |
| Word 18, bits 0–3 | A15 | SUPP15 |
| Word 18, bits 4–7 | A16 | SUPP16 |
| Word 18, bits 8–11 | A17 | SUPP17 |
| Word 18, bits 12–15 | A18 | SUPP18 |
| Word 19, bits 0–3 | A19 | SUPP19 |
| Word 19, bits 4–7 | A20 | SUPP20 |
| Word 19, bits 8–11 | A21 | SUPP21 |
| Word 19, bits 12–15 | A22 | SUPP22 |

4. VNet Remote Access - If the caller accesses VNet services through the Remote Access Service, the access number is recorded starting at A1. A TBCD-Null is recorded after the last digit followed by any Supplemental Codes. Unused bytes contain TBCD-Null. VNet Remote Access format:

| Word 14, bits 8–11 | A1 | N |
| Word 14, bits 12–15 | A2 | X |
| Word 15, bits 0–3 | A3 | X |
| Word 15, bits 4–7 | A4 | N |
| Word 15, bits 8–11 | A5 | X |
| Word 15, bits 12–15 | A6 | X |
| Word 16, bits 0–3 | A7 | X |
| Word 16, bits 4–7 | A8 | X |
| Word 16, bits 8–11 | A9 | X |
| Word 16, bits 12–15 | A10 | X |
| Word 17, bits 0–3 | A11 | TBCD-Null |
| Word 17, bits 4–7 | A12 | SUPP1 |
| Word 17, bits 8–11 | A13 | SUPP2 |
| Word 17, bits 12–15 | A14 | SUPP3 |
| Word 18, bits 0–3 | A15 | SUPP4 |
| Word 18, bits 4–7 | A16 | SUPP5 |
| Word 18, bits 8–11 | A17 | SUPP6 |
| Word 18, bits 12–15 | A18 | SUPP7 |
| Word 19, bits 0–3 | A19 | SUPP8 |
| Word 19, bits 4–7 | A20 | SUPP9 |
| Word 19, bits 8–11 | A21 | SUPP10 |
| Word 19, bits 12–15 | A22 | SUPP11 |

5. Calling Party Number - The calling party number is recorded for SS7 FGD call originations received with a charge number and a calling party number. Record the SS7 calling party number in TABLE 3-continued OSR/POSR Record Format:

| Word #, Bit # | Description |
|---|---|

A1–10. A TBCD-Null is recorded after the last digit, followed by supplementary codes. Unused bytes contain TBCD-Null. Calling party number format:

| | | |
|---|---|---|
| Word 14, bits 8–11 | A1 | N |
| Word 14, bits 12–15 | A2 | X |
| Word 15, bits 0–3 | A3 | X |
| Word 15, bits 4–7 | A4 | N |
| Word 15, bits 8–11 | A5 | X |
| Word 15, bits 12–15 | A6 | X |
| Word 16, bits 0–3 | A7 | X |
| Word 16, bits 4–7 | A8 | X |
| Word 16, bits 8–11 | A9 | X |
| Word 16, bits 12–15 | A10 | X |
| Word 17, bits 0–3 | A11 | TBCD-Null |
| Word 17, bits 4–7 | A12 | SUPP1 |
| Word 17, bits 8–11 | A13 | SUPP2 |
| Word 17, bits 12–15 | A14 | SUPP3 |
| Word 18, bits 0–3 | A15 | SUPP4 |
| Word 18, bits 4–7 | A16 | SUPP5 |
| Word 18, bits 8–11 | A17 | SUPP6 |
| Word 18, bits 12–15 | A18 | SUPP7 |
| Word 19, bits 0–3 | A19 | SUPP8 |
| Word 19, bits 4–7 | A20 | SUPP9 |
| Word 19, bits 8–11 | A21 | SUPP10 |
| Word 19, bits 12–15 | A22 | SUPP11 |

6. Credit Card Number - Record the commercial credit card or presubscribed credit card number starting in A1. The PIN digits of a valid presubscribed credit card number are masked out by writing TBCD-A over the 4 PIN digits. A TBCD-Null is recorded after the last digit, followed by supplementary codes. Unused bytes contain TBCD-Null. Credit card number format:

| | | |
|---|---|---|
| Word 14, bits 8–11 | A1 | X |
| Word 14, bits 12–15 | A2 | X |
| Word 15, bits 0–3 | A3 | X |
| Word 15, bits 4–7 | A4 | X |
| Word 15, bits 8–11 | A5 | X |
| Word 15, bits 12–15 | A6 | X |
| Word 16, bits 0–3 | A7 | X |
| Word 16, bits 4–7 | A8 | X |
| Word 16, bits 8–11 | A9 | X |
| Word 16, bits 12–15 | A10 | X |
| Word 17, bits 0–3 | A11 | X |
| Word 17, bits 4–7 | A12 | X |
| Word 17, bits 8–11 | A13 | X |
| Word 17, bits 12–15 | A14 | X |
| Word 18, bits 0–3 | A15 | X |
| Word 18, bits 4–7 | A16 | X |
| Word 18, bits 8–11 | A17 | X |
| Word 18, bits 12–15 | A18 | X |
| Word 19, bits 0–3 | A19 | X |
| Word 19, bits 4–7 | A20 | TBCD-Null |
| Word 19, bits 8–11 | A21 | SUPP1 |
| Word 19, bits 12–15 | A22 | SUPP2 |

7. 14 Digit MCI/VNet Cards - The 14 digit calling card/VNet card number is recorded starting in A1 with the last 4 PIN digits masked out by writing TBCD-A for those digits. A TBCD-Null is written after the last digit, followed by supplemental codes. Unused bytes contain TBCD-Null. Calling card/VNet card format:

| | | |
|---|---|---|
| Word 14, bits 8–11 | A1 | X |
| Word 14, bits 12–15 | A2 | X |
| Word 15, bits 0–3 | A3 | X |
| Word 15, bits 4–7 | A4 | X |
| Word 15, bits 8–11 | A5 | X |
| Word 15, bits 12–15 | A6 | X |
| Word 16, bits 0–3 | A7 | X |
| Word 16, bits 4–7 | A8 | X |
| Word 16, bits 8–11 | A9 | X |
| Word 16, bits 12–15 | A10 | X |
| Word 17, bits 0–3 | A11 | TBCD-A |
| Word 17, bits 4–7 | A12 | TBCD-A |
| Word 17, bits 8–11 | A13 | TBCD-A |
| Word 17, bits 12–15 | A14 | TBCD-A |
| Word 18, bits 0–3 | A15 | TBCD-Null |
| Word 18, bits 4–7 | A16 | SUPP1 |

TABLE 3-continued

OSR/POSR Record Format:

| Word #, Bit # | Description |
|---|---|

Word 18, bits 8–11   A17   SUPP2
Word 18, bits 12–15  A18   SUPP3
Word 19, bits 0–3    A19   SUPP4
Word 19, bits 4–7    A20   SUPP5
Word 19, bits 8–11   A21   SUPP6
Word 19, bits 12–15  A22   SUPP7

8. Telecommunications/PTT Cards - The 23 digits, or less, of the telecommunications card is recorded starting in A1. A TBCD-Null is recorded after the last digit, followed by supplemental codes. Unused bytes contain TBCD-Null. Telecommunications card format:

Word 14, bits 8–11   A1    X
Word 14, bits 12–15  A2    X
Word 15, bits 0–3    A3    X
Word 15, bits 4–7    A4    X
Word 15, bits 8–11   A5    X
Word 15, bits 12–15  A6    X
Word 16, bits 0–3    A7    X
Word 16, bits 4–7    A8    X
Word 16, bits 8–11   A9    X
Word 16, bits 12–15  A10   X
Word 17, bits 0–3    A11   X
Word 17, bits 4–7    A12   X
Word 17, bits 8–11   A13   X
Word 17, bits 12–15  A14   X
Word 18, bits 0–3    A15   X
Word 18, bits 4–7    A16   X
Word 18, bits 8–11   A17   X
Word 18, bits 12–15  A18   X
Word 19, bits 0–3    A19   X
Word 19, bits 4–7    A20   X
Wdrd 19, bits 8–11   A21   X
Word 19, bits 12–15  A22   X 9. OSID and OTG - For international inbound VNet or SAC calls, the OSID and OTG are recorded as received from the SS7 Generic Digits parameter. After the parameters are recorded, the remaining bytes contain TBCD-Null. OSID and OTG format:

Word 14, bits 8–11   A1    X(OSID)
Word 14, bits 12–15  A2    X(OSID)
Word 15, bits 0–3    A3    X(OSID)
Word 15, bits 4–7    A4    X(OTG)
Word 15, bits 8–11   A5    X(OTG)
Word 15, bits 12–15  A6    X(OTG)
Word 16, bits 0–3    A7    X(OTG)
Word 16, bits 4–7    A8    TBCD-Null
Word 16, bits 8–11   A9    TBCD-Null
Word 16, bits 12–15  A10   TBCD-Null
Word 17, bits 0–3    A11   TBCD-Null
Word 17, bits 4–7    A12   TBCD-Null
Word 17, bits 8–11   A13   TBCD-Null
Word 17, bits 12–15  A14   TBCD-Null
Word 18, bits 0–3    A1S   TBCD-Null
Word 18, bits 4–7    A16   TBCD-Null
Word 18, bits 8–11   A17   TBCD-Null
Word 18, bits 12–15  A18   TBCD-Null
Word 19, bits 0–3    A19   TBCD-Null
Word 19, bits 4–7    A20   TBCD-Null
Word 19, bits 8–11   A21   TBCD-Null
Word 19, bits 12–15  A22   TBCD-Null OSID = Originating Switch Group (000–999)
OTG = Originating Trunk Group (0000–8191)

10. Business Group ID - For some SS7 trunk groups, a business group ID is received in a SS7 parameter and is recorded in A1–A6. After the last digit, a TBCD-Null is recorded followed by any supplemental codes. Unused bytes contain TBCD-Null.

Word 14, bits 8–11   A1    X
Word 14, bits 12–15  A2    X
Word 15, bits 0–3    A3    X
Word 15, bits 4–7    A4    X
Word 15, bits 8–11   A5    X
Word 15, bits 12–15  A6    X
Word 16, bits 0–3    A7    TBCD-Null
Word 16, bits 4–7    A8    SUPP1
Word 16, bits 8–11   A9    SUPP2
Word 16, bits 12–15  A10   SUPP3

TABLE 3-continued

OSR/POSR Record Format:

| Word #, Bit # | Description |
|---|---|

Word 17, bits 0–3   A11   SUPP4
Word 17, bits 4–7   A12   SUPP5
Word 17, bits 8–11  A13   SUPP6
Word 17, bits 12–15 A14   SUPP7
Word 18, bits 0–3   A1S   SUPP8
Word 18, bits 4–7   A16   SUPP9
Word 18, bits 8–11  A17   SUPP10
Word 18, bits 12–15 A18   SUPP11
Word 19, bits 0–3   A19   SUPP12
Word 19, bits 4–7   A20   SUPP13
Word 19, bits 8–11  A21   SUPP14
Word 19, bits 12–15 A22   SUPP15

11. Network Information - For some SS7 trunk groups, a network information ID is received in a SS7 parameter and is recorded in A1–A4. After the last digit, a TBCD-Null is recorded followed by any supplemental codes. Unused bytes contain TBCD-Null.

Word 14, bits 8–11   A1   N
Word 14, bits 12–15  A2   X
Word 15, bits 0–3    A3   X
Word 15, bits 4–7    A4   N
Word 15, bits 8–11   A5   TBCD-Null
Word 15, bits 12–15  A6   SUPP1
Word 16, bits 0–3    A7   SUPP2
Word 16, bits 4–7    A8   SUPP3
Word 16, bits 8–11   A9   SUPP4
Word 16, bits 12–15  A10  SUPP5
Word 17, bits 0–3    A11  SUPP6
Word 17, bits 4–7    A12  SUPP7
Word 17, bits 8–11   A13  SUPP8
Word 17, bits 12–15  A14  SUPP9
Word 18, bits 0–3    A15  SUPP10
Word 18, bits 4–7    A16  SUPP11
Word 18, bits 8–11   A17  SUPP12
Word 18, bits 12–15  A18  SUPP13
Word 19, bits 0–3    A19  SUPP14
Word 19, bits 4–7    A20  SUPP15
Word 19, bits 8–11   A21  SUPP16
Word 19, bits 12–15  A22  SUPP17

12. BOC Card: The BOC/LEC Card Number is recorded in A1–A10 with time remaining bytes containing TBCD-Null.

Word 14, bits 8–11   A1   N
Word 14, bits 12–15  A2   X
Word 15, bits 0–3    A3   X
Word 15, bits 4–7    A4   N
Word 15, bits 8–11   A5   X
Word 15, bits 12–15  A6   X
Word 16, bits 0–3    A7   X
Word 16, bits 4–7    A8   X
Word 16, bits 8–11   A9   X
Word 16, bits 12–15  A10  X
Word 17, bits 0–3    A11  TBCD-Null
Word 17, bits 4–7    A12  TBCD-Null
Word 17, bits 8–11   A13  TBCD-Null
Word 17, bits 12–15  A14  TBCD-Null
Word 18, bits 0–3    A15  TBCD-Null
Word 18, bits 4–7    A16  TBCD-Null
Word 18, bits 8–11   A17  TBCD-Null
Word 18, bits 12–15  A18  TBCD-Null
Word 19, bits 0–3    A19  TBCD-Null
Word 19, bits 4–7    A20  TBCD-Null
Word 19, bits 8–11   A21  TBCD-Null
Word 19, bits 12–15  A22  TBCD-Null 13. Third Party Numbers: If a call is billed to a third party NANP number, record the number in A1–A10 with the remaining bytes containing TBCD-Null.

Word 14, bits 8–11   A1   N
Word 14, bits 12–15  A2   X
Word 15, bits 0–3    A3   X
Word 15, bits 4–7    A4   N
Word 15, bits 8–11   A5   X
Word 15, bits 12–15  A6   X
Word 16, bits 0–3    A7   X
Word 16, bits 4–7    A8   X
Word 16, bits 8–11   A9   X
Word 16, bits 12–15  A10  X TABLE 3-continued OSR/POSR Record Format:

| Word #, Bit # | Description |
|---|---|

Word 17, bits 0–3   A11   TBCD-Null
Word 17, bits 4–7   A12   TBCD-Null
Word 17, bits 8–11   A13   TBCD-Null
Word 17, bits 12–15   A14   TBCD-Null
Word 18, bits 0–3   A15   TBCD-Null
Word 18, bits 4–7   A16   TBCD-Null
Word 18, bits 8–11   A17   TBCD-Null
Word 18, bits 12–15   A18   TBCD-Null
Word 19, bits 0–3   A19   TBCD-Null
Word 19, bits 4–7   A20   TBCD-Null
Word 19, bits 8–11   A21   TBCD-Null
Word 19, bits 12–15   A22   TBCD-Null 14. International Numbers: If a call is billed to an international number, record the starting number in A1. Unused bytes contain TBCD-Null.

Word 14, bits 8–11   A1   X(CC)
Word 14, bits 12–15   A2   X(CC)
Word 15, bits 0–3   A3   X(CC)
Word 15, bits 4–7   A4   X(NN)
Word 15, bits 8–11   A5   X(NN)
Word 15, bits 12–15   A6   X(NN)
Word 16, bits 0–3   A7   X(NN)
Word 16, bits 4–7   A8   X(NN)
Word 16, bits 8–11   A9   X(NN)
Word 16, bits 12–15   A10   X(NN)
Word 17, bits 0–3   A11   X(NN)
Word 17, bits 4–7   A12   X(NN)
Word 17, bits 8–11   A13   X(NN)
Word 17, bits 12–15   A14   X(NN)
Word 18, bits 0–3   A15   X(NN)
Word 18, bits 4–7   A16   TBCD-Null
Word 18, bits 8–11   A17   TBCD-Null
Word 18, bits 12–15   A18   TBCD-Null
Word 19, bits 0–3   A19   TBCD-Null
Word 19, bits 4–7   A20   TBCD-Null
Word 19, bits 8–11   A21   TBCD-Null
Word 19, bits 12–15   A22   TBCD-Null CC = Customer Connect
NN = National Number 15. LAN Sequence Numbers: If a call is handled by a LAN, and billable information cannot be transported back to the billing switch, then the LAN records all of the billable information in a Billing Detail Record (BDR) and sends back a LAN sequence number to the switch. The LAN sequence number is recorded in A1–A16 with the remaining bytes containing TBCD-Null.

Word 14, bits 8–11   A1   X
Word 14, bits 12–15   A2   X
Word 15, bits 0–3   A3   X
Word 15, bits 4–7   A4   X
Word 15, bits 8–11   A5   X
Word 15, bits 12–15   A6   X
Word 16, bits 0–3   A7   X
Word 16, bits 4–7   A8   X
Word 16, bits 8–11   A9   X
Word 16, bits 12–15   A10   X
Word 17, bits 0–3   A11   X
Word 17, bits 4–7   A12   X
Word 17, bits 8–11   A13   X
Word 17, bits 12–15   A14   X
Word 18, bits 0–3   A15   X
Word 18, bits 4–7   A16   X
Word 18, bits 8–11   A17   TBCD-Null
Word 18, bits 12–15   A18   TBCD-Null
Word 19, bits 0–3   A19   TBCD-Null
Word 19, bits 4–7   A20   TBCD-Null
Word 19, bits 8–11   A21   TBCD-Null
Word 19, bits 12–15   A22   TBCD-Null 16. DNIS: The DNIS may be recorded as received from the SS7 generic address parameter, such as with EVS/NARS processed calls.

Word 14, bits 8–11   A1   N
Word 14, bits 12–15   A2   X
Word 15, bits 0–3   A3   X
Word 15, bits 4–7   A4   N
Word 15, bits 8–11   A5   X

TABLE 3-continued

OSR/POSR Record Format:

| Word #, Bit # | Description |
|---|---|
| | Word 15, bits 12–15  A6   X |
| | Word 16, bits 0–3    A7   X |
| | Word 16, bits 4–7    A8   X |
| | Word 16, bits 8–11   A9   X |
| | Word 16, bits 12–15  A10  X |
| | Word 17, bits 0–3    A11  TBCD-Null |
| | Word 17, bits 4–7    A12  TBCD-Null |
| | Word 17, bits 8–11   A13  TBCD-Null |
| | Word 17, bits 12–15  A14  TBCD-Null |
| | Word 18, bits 0–3    A15  TBCD-Null |
| | Word 18, bits 4–7    A16  TBCD-Null |
| | Word 18, bits 8–11   A17  TBCD-Null |
| | Word 18, bits 12–15  A18  TBCD-Null |
| | Word 19, bits 0–3    A19  TBCD-Null |
| | Word 19, bits 4–7    A20  TBCD-Null |
| | Word 19, bits 8–11   A21  TBCD-Null |
| | Word 19, bits 12–15  A22  TBCD-Null |
| | 17. Network Call Identifier (NCID): If the NCID is recorded in the "A" field, it is recorded in binary beginning with A1. The entry code will indicate the call processing associated with the particular call or '0.' If the NCID is recorded in the NCID field of a 64-word call record, the entry code will also indicate the call processing associated with the particular call or '0.' The NCID comprises the following:<br>Originating Switch ID<br>Originating Trunk Group<br>Originating Port Number<br>Timepoint 1<br>NCID Sequence Number |
| Word 20, bits 0–15<br>Word 21, bits 0–15<br>Word 22, bits 0–15<br>Word 23, bits 0–15<br>Word 24, bits 0–3 | Destination Address: This is the seventeen digits of the destination address which is the domestic or international number being called, or an operator number format. In the POSR, if the dialed number was translated by the NCS/DAP or LAN, the translated number will be recorded. If more than 17 digits is required, use EOSR/EPOSR format. Unused bytes contain TBCD-Null. |

| | | 7-digit | 10-digit | DDD | IDDD |
|---|---|---|---|---|---|
| Word 20, bits 0–3   | D1  | N        | N        | N      | CC     |
| Word 20, bits 4–7   | D2  | X        | X        | X      | CC     |
| Word 20, bits 8–11  | D3  | X        | X        | X      | CC     |
| Word 20, bits 12–15 | D4  | X        | N        | N      | NN     |
| Word 21, bits 0–3   | D5  | X        | X        | X      | NN     |
| Word 21, bits 4–7   | D6  | X        | X        | X      | NN     |
| Word 21, bits 8–11  | D7  | X        | X        | X      | NN     |
| Word 21, bits 12–15 | D8  | X(TSID)  | X        | X      | NN     |
| Word 22, bits 0–3   | D9  | X(TSID)  | X        | X      | NN     |
| Word 22, bits 4–7   | D10 | X(TSID)  | X        | X      | NN     |
| Word 22, bits 8–11  | D11 | X(TTG)   | X(TSID)  | T-Null | NN     |
| Word 22, bits 12–15 | D12 | X(TTG)   | X(TSID)  | T-Null | NN     |
| Word 23, bits 0–3   | D13 | X(TTG)   | X(TSID)  | T-Null | NN     |
| Word 23, bits 4–7   | D14 | X(TTG)   | X(TTG)   | T-Null | NN     |
| Word 23, bits 8–11  | D15 | T-Null   | X(TTG)   | T-Null | NN     |
| Word 23, bits 12–15 | D16 | T-Null   | X(TTG)   | T-Null | T-Null |
| Word 24, bits 0–3   | D17 | T-Null   | X(TTG)   | T-Null | T-Null |

CC = Customer Conntect
NN = National Number
TSID = Terminating Switch ID
TTG = Terrninating Trunk Group

| | | BOC Inward Dialing | Op-to-Op Domestic/ Int'l | Op-to-Op Manual Transit |
|---|---|---|---|---|
| Word 20, bits 0–3   | D1  | N         | X(CC)     | X(CC)     |
| Word 20, bits 4–7   | D2  | 0/1       | X(CC)     | X(CC)     |
| Word 20, bits 8–11  | D3  | X         | X(CC)     | X(CC)     |
| Word 20, bits 12–15 | D4  | X(ATC)    | TBCD-Null | 1         |
| Word 21, bits 0–3   | D5  | X(ATC)    | TBCD-Null | 6         |
| Word 21, bits 4–7   | D6  | X(ATC)    | TBCD-Null | 0         |
| Word 21, bits 8–11  | D7  | X(SI1)    | TBCD-Null | TBCD-Null |
| Word 21, bits 12–15 | D8  | X(SI2)    | TBCD-Null | TBCD-Null |
| Word 22, bits 0–3   | D9  | X(SI3)    | TBCD-Null | TBCD-Null |
| Word 22, bits 4–7   | D10 | X(SI4)    | TBCD-Null | TBCD-Null |
| Word 22, bits 8–11  | D11 | X(SI5)    | TBCD-Null | TBCD-Null |
| Word 22, bits 12–15 | D12 | TBCD-Null | TBCD-Null | TBCD-Null |

TABLE 3-continued

OSR/POSR Record Format:

| Word #, Bit # | Description |
|---|---|
| | Word 23, bits 0–3    D13    TBCD-Null    TBCD-Null    TBCD-Null |
| | Word 23, bits 4–7    D14    TBCD-Null    TBCD-Null    TBCD-Null |
| | Word 23, bits 8–11    D15    TBCD-Null    TBCD-Null    TBCD-Null |
| | Word 23, bits 12–15 D16    TBCD-Null    TBCD-Null    TBCD-Null |
| | Word 24, bits 0–3    D17    TBCD-Null    TBCD-Null    TBCD-Null |
| Word 24, bits 4–15<br>Word 25, bits 0–1 | Operator ID Number (OPIN): Contains the operator id number of the operator that handled the call. |
| Word 25, bit 2 | Not Used. |
| Word 25, bits 3–15 | Timepoint 5 (TP5): A binary count of the number of seconds between the time TP1 occurred and the time that the operator stopped handling the call and releases the position. If the call is transfered to other operators, the value contained in this field shall express the release time of the last operator providing the service. |
| Word 26, bits 0–15 | Room Number (RN): Contains the last four digits of the Calling Station ID (CSI) when a call originates from a hotel, a university, or any other communicty identified by only a main telephone number. The CSI shall be obtained from the originating signalling information, or verbally by the operator who enters the information manually into the OSR. |
| Word 27, bits 0–3 | Feature Code (FC): The switch determines a feature code for the call which indicates whether a specific type of data line is required for the call such as a higher quality line for facsimile transmissions.<br>0 = Default<br>1 = FAX<br>2 = NARS<br>3 = Data Call<br>4 = Switched DS1 (HSCS)<br>5 = Switched DS3 (HSCS)<br>6–8 = Not Used<br>9 = NX64<br>10 = Offnet Routing<br>11 = AAP Call (Used in Gateway Toll Ticket Conversion)<br>12 = Card Gate Denial<br>13 = Forum Dial out audio/video conference<br>14 = Concert Freephone<br>15 = Not Used |
| Word 27, bits 4–7 | Terminating Network Code (TNC): Indicates the terminating facilities to be used for the remainder of the path of the call. For example, an indicator for no satellite transmission.<br>0 = Default<br>1 = No Routing Restrictions<br>2 = Avoid Satellite<br>3 = Route via DS1<br>4 = Route via DS1 and avoid satellite<br>5 = Route via Protected Facilities Required<br>6 = Route via Protected Facilities Preferred<br>7–15 = Not Used |
| Word 27, bits 8–11 | Network Access Type (NAT): Indicates which type of network access was used as defined at the originating switch on the network; that is, how the caller gained access to the network. The types of access are:<br>0 = Default<br>1 = 800 call<br>2 = Credit Card Access<br>3 = Operator Assistance Access<br>4 = VNET Remote Access<br>5 = Billed party preference (BPP) Access<br>6 = FGD Cut-Through Access<br>7–15 = Not Used |
| Word 27, bits 12–15 | Timepoint 7 Qualifier (TP7Q): Contains the call's first disconnect qualifier; that is, how the call was terminated. The types of disconnection are:<br>0 = Calling party disconnects<br>1 = Called party disconnects<br>2 = Calling party reorigination<br>3 = Switch initiated (ex. switch error cut off the call)<br>4 = All Routes Busy<br>5 = Disconnected due to a long ring; ring timer exceeded<br>6–15 = Not Used |
| Word 28, bits 0–6 | Entry Code (EC): Indicates the type of call processing that took place and what type of information is recorded in the Authorization Code field. If more than one entry code is received, record the last one. The following codes are valid:<br>0 = Default |

TABLE 3-continued

OSR/POSR Record Format:

| Word #, Bit # | Description |
|---|---|
| | 1 = Person-to-Person (P-P)<br>2 = Station-to-Station (S-S)<br>3 = Third Party Billing (3rd party number recorded)<br>4 = P-P collect (bill to called party)<br>5 = S-S collect (bill to called party)<br>6 = MCI card or VNet card (S-S)<br>7 = BOC inward dialing without call completion<br>8 = general assistance<br>9 = BOC/LEC card<br>10 = Presubsribed credit card<br>11 = PTT card<br>12 = Directory Assistance<br>13 = Commercial Credit Card<br>14 = BOC inward dialing with call completion<br>15 = MCI card or VNet card (P-P)<br>16–19 = Not Used<br>20 = ANI validation (screened pass/fail)<br>21 = Auth Validation (filed or dialed)<br>22 = Not Used<br>23 = 700 Service Access Code (overrides #20)<br>24 = 500, 800 Service Access Code (overrides #20)<br>25 = 900 Service Access Code (overrides #20)<br>26–28 = Not Used<br>29 = Operator Release Timer Expired<br>30 = EVS/NARS - Disconnect message referral (DMR) without referral<br>31 = EVS/NARS - DMR with referral to MCI number<br>32 = EVS/NARS - DMR with referral to non-MCI number<br>33 = EVS/NARS - DMR with referral and call extension (CE) to MCI number<br>34 = EVS/NARS - DMR with referral and CE to non-MCI number<br>35 = EVS/NARS - Customized Message Announcement (CMA) with CE<br>36 = EVS/NARS - CMA without CE<br>37 = EVS/NARS - Enhanced Call Routing (ECR)<br>38–41 = EVS/NARS - Reserved<br>42–47 = Not Used<br>48 = GETS card<br>49 = Not Used<br>50 = Billed to international number<br>51 = Calling station ID information recorded<br>52 = Supplemental code only recorded<br>53 = VNet remote aceess number recorded<br>54 = SS7 calling party number recorded<br>55 = OSID and OTG recorded<br>56 = DNIS recorded<br>57 = Business group ID recorded<br>58 = Network information recorded<br>59 = BG + Null + OSID/OTG<br>60 = Card Number + Null + OSID/OTG<br>61 = VNet RA + Null + OSID/OTG<br>62 = VNet RA + Null + OSID/OTG<br>63 = Network Call Transfer (NCT)<br>64–79 = Reserved<br>80–89 = Reserved<br>90–99 = Reserved<br>100 = 18C It's Me PIN S/S<br>101 = 18C It's Me Global S/S<br>102 = 18C It's Me ANI S/S<br>103 = 18C It's Me NPA S/S<br>104 = 18C Messenger S/S<br>105 = 18C Messenger PIN S/S<br>106 = 18C Messenger Global S/S<br>107 = 18C BOC Card S/S<br>108 = 18C MCI Card S/S<br>109 = Aos Messenger S/S<br>110 = International Messenger<br>111 = International Speed Dial<br>112–127 = Not Used |
| Word 28, bits 7–9 | Prefix Digits (PD): Represents the prefix digits of the called number. These digits tell the switch how to process the call.<br>0 = No prefix digits received<br>1 = 0- (operator assisted)<br>2 = 0+ (domestic CDOS)<br>3 = 01+ (international CDOS) |

TABLE 3-continued

OSR/POSR Record Format:

| Word #, Bit # | Description |
| --- | --- |
| | 4 = 011+IDDD |
| | 5 = 1+DDD |
| | 6 = 0+operator assisted, subscriber address |
| | 7 = *XX where XX = 0–9, Star Card |
| Word 28, bits 10–12 | NDID (NCS/DAP ID): Indicates whether the switch processed the call or if one of the databases, such as NCS/DAP, was queried for information for services, including but not limited to, VNET, Calling Card, 800, and 900 calls. The NDID further indicates the ID of the NCS/DAP that was involved in the last transaction attempt. |
| | 0 = Switch call processing |
| | 1 = NCS/DAP 1 |
| | 2 = NCS/DAP 2 |
| | 3 = NCS/DAP 3 |
| | 4–5 = Not Used |
| | 6 = Received from operator platform via RLT |
| | 7 = TCAP to NCS/DAP |
| Word 28, bits 13–15 | Division ID (DIVID): Contains the division ID for credit card calls, including the telecommunication system's card. The DIVID is received from the NCS/DAP for the card number validation. If no information is received by the switch, record the default value of '0.' |
| | 0 = No dividision ID specified |
| | 1 = Division ID1 |
| | 2 = Division ID2 |
| | 3 = Division ID3 |
| | 4 = Division ID4 |
| | 5 = Division ID5 |
| | 6 = Division ID6 |
| | 7 = Division ID7 |
| Word 29, bit 0 | Distant Overflow (DO): When set to 1 in the originating switch's call record, indicates that a direct termination overflow (DTO) transaction was attempted at an intermediate or terminating switch in order to get the final destination address digits for this call. |
| Word 29, bit 1 | Not Used. |
| Word 29, bit 2 | Customer Connect (CC): Indicates whether to use timepoint 6 or timepoint 3 to calculate the call duration. |
| | 0 = Use Time Point 6, *F to calculate the call duration |
| | 1 = Use Time Point 3, *C to calculate the call duration |
| Word 29, bit 3 | Inter-Network (IN): Indicates whether or not a call is originating from one customer/network and is terminating to a different customer/network. The default setting = 0; bit set to 1 if a business group or Netinfo parameter is received from the NCS/DAP. |
| Word 29, bit 4 | Not Used |
| Word 29, bit 5 | SAC Bit (SC): This bit is used for the Flexible SAC feature. This bit will be set to "1" whenever the received number which is collected during the address digit collection phase, is identified as a SAC number in the FlexSac Index associated with the originating trunk group. This bit will be set to "0" in all other cases. |
| Word 29, bit 6 | Call Direction (CD): Indicates whether the call originated in the domestic or international network. |
| | 0 = Call origination occured in the Domestic Network |
| | 1 = Call origination occured in the International Network |
| Word 29, bit 7 | Destination (DE): Indicates when a call is expected to terminate to an international destination. |
| | 0 = Default, NANP, Domestic VNet, or any other calls which are not expected to terminate to an international destination |
| | 1 = Calls expected to terminate to an international destination |
| Word 29, bit 8 | Dedicated Termination (DT): Indicates that a 10-digit shared network number was completed to a dedicated destination. IF the terminating trunk class (TTC) in the call record is equal to 3 or 7, then it is considered to be a direct termination trunk. |
| Word 29, bit 9 | Person-to-Person (PP): This bit is set to 1 if the operator authorizes a person-to-person call. This bit is used in combination with the entry codes to determine the nature of the call. |
| Word 29, bit 10 | Transferred Bit (XB): This bit is set to 1 if the call has been transferred from one operator position or ARU to another. |
| Word 29, bit 11 | Satellite (SA): Indicates that a satellite circuit was involved in the call. The default setting is 0; bit set to 1 indicates that a satellite was involved in the call. The bit is set when the incoming trunk group is classmarked as satellite equipped, when the SAT digit on an incoming inband IMT call shows that a satellite circuit is involved in the connection, or when the SS7 Nature of Connection |

TABLE 3-continued

OSR/POSR Record Format:

| Word #, Bit # | Description |
|---|---|
| | parameter indicates that a satellite trunk was previously used. This is used for trouble-shooting purposes, and not for billing. |
| Word 29, bit 12–15 | Nature Of Calling Location ID (NOCLI): A binary value that identifies what data is recorded in the Call Location ID. The Calling Location ID field will contain the information that is referenced in the NOCLI.<br>0 = Not Used<br>1 = ANI from Inbound trunk<br>2 = SS7 charge number<br>3 = SS7 calling party number<br>4 = original called number<br>5 = Pseudo ANI created at this switch<br>6 = CSI from originating trunk<br>7 = Filed NPA-NXX trunk group information plus CSI<br>8 = NNN+OSID+OTG or 00Y+OSID+OTG (N = TBCD-Null)<br>9 = Country Code + national number<br>10 = No CLI record<br>11 = Redirecting Number<br>12 = CLI receiving from Operator platform via RLT<br>13 = ANI of NCT Originator<br>14–15 = Not Used |
| Word 30, bits 0–15 | Carrier Number (CN): Represents the carrier number provided on FG-B or FG-D originations, or the carrier number received over an SS7 IMT. If only three digits are used, then they are recorded in CN2–CN4 and CN1 will contain a TBCD-Null. This field also contains the last four digits of the specific 800 number assigned to VISA cards (9595). It will also contain the last four digits of the MCI card access number regardless of the access facility. Examples of carrier numbers are: MCI = 222, ATT = 288, and Friends = 333. |

|  |  | FGB/FGD 3 digit CIC | FGB/D 4 digit CIC | visa card |
|---|---|---|---|---|
| Word 30, bits 0–3 | CN1 | Null | X | 9 |
| Word 30, bits 5–7 | CN2 | X | X | 5 |
| Word 30, bits 8–11 | CN3 | X | X | 9 |
| Word 30, bits 12–15 | CN4 | X | X | 5 |
| | | SS7 TNS | MCI card | VNet card |
| Word 30, bits 0–3 | CN1 | X | 1 | 1 |
| Word 30, bits 4–7 | CN2 | X | 0 | 1 |
| Word 30, bits 8–11 | CN3 | X | 2 | 1 |
| Word 30, bits 12–15 | CN4 | X | 2 | 1 |

| Word #, Bit # | Description |
|---|---|
| Word 31, bits 0–3 | Authorization Code ID Field (ACIF): Contains the Authorization Code Identification Field for recording a card number status. This field indicates whether the card number (calling card or credit card) is good or bad.<br>0 = Seven digit authcode file<br>1 = 1st or only five digit authcode file<br>2 = 2nd five digit file<br>3 = 3rd five digit file<br>4 = 4th five digit file<br>5 = 5th five digit file<br>6 = Six digit authcode file<br>7 = Range restriction failure (invalid address digits)<br>8 = Positive Commercial Credit Card/89 Card/M Card Validation<br>9 = Not Used<br>10 = MCI Card/Visa Card invalid or not assigned. Disallowed.<br>11 = BOC billing number assigned but blocked<br>12 = BOC billing number usage exceeded<br>13 = Not Used<br>14 = Default authorization of MCI Card/VISA Card if response timeout from NCS/DAP<br>15 = MCI Card/VISA Card authorized by NCS/DAP |
| Word 31, bit 4–10 | Release Code: Used with timepoint 7 qualifier to determine from which direction the release message came. The code indicates why one of the parties hung up, for example, normal release = 16, and no circuit available = 34.<br>1 = Unallocated number<br>2 = No route to specified network<br>3 = No route to destination<br>4 = Send special information tone<br>5 = Misdialed trunk prefix |

TABLE 3-continued

OSR/POSR Record Format:

| Word #, Bit # | Description |
|---|---|
| | 16 = Normal clearing |
| | 17 = User Busy |
| | 18 = No user responding |
| | 19 = No user responding (user alerted) |
| | 21 = Call rejected |
| | 22 = Number changed |
| | 27 = Destination out of service |
| | 28 = Address imcomplete |
| | 29 = Facility rejected |
| | 31 = Normal - unspecified |
| | 34 = No circuit available |
| | 38 = Network out of order |
| | 41 = Temporary failure |
| | 42 = Switching equipment congestion |
| | 44 = Requested channel not available |
| | 47 = Resource unavailable - unspecified |
| | 50 = Requested facility not subscribed |
| | 55 = Incoming calls barred within CUG |
| | 57 = Bearer capability not authorized |
| | 58 = Bearer capability not available |
| | 63 = Service or option not available |
| | 65 = Bearer capability not implemented |
| | 69 = Requested facility not implemented |
| | 70 = Only restricted digital information bearer capability is available |
| | 79 = Service or option not implemented |
| | 87 = Called user not member of CUG |
| | 88 = Imcompatible destination |
| | 91 = Invalid transit network selector |
| | 95 = Invalid message - unspecified |
| | 97 = Message type non-existent or not implemented |
| | 99 = Parameter non-existent or not implemented - discarded |
| | 102 = Recovery on timer expired |
| | 103 = Parameter non-existent or not implemented - passed on |
| | 111 = Protocol error - unspecified |
| | 127 = Interworking - unspecified |
| Word 31, bits 11–13 | NCID Sequence Number: Represents the number of calls which have occured on the same port number with the same Timepoint 1 value. The first call will have the sequence number set to '0'. This value will increase incrementally for each successive call which originates on the same port number which has the same Timepoint 1 value. Range = 0–7. |
| Word 31, bit 14 | NCID Location (NCIDLOC): This bit identifies when the NCID is recorded in the Authcode field of the call recorded. The NCID is recorded in the Authcode field of the call record at intermediate and terminating switches if the Authcode field is not being used to record other information. If the Authcode field is being used to record other information, the NCID is recorded in the "NCID" field of the 64 word call record.<br>0 = NCID is not recorded in the Authcode field (default)<br>1 = NCID is recorded in the Authcode field |
| Word 31, bit 15 | Remote ANI Screened (RS): This bit is set to '1' if the NPA of the ANI is not listed in the switch's Local-Service-Area table, and the ANI was sent to the DAP for ANI index screening purposes. This bit is set to '0' if the switch sent the ANI to the DAP for ANI index screening purposes and no response is received from the DAP or if normal switch ANI screening occurs.<br>0 = ANI was not screened by the DAP (default)<br>1 = ANI was screened by the DAP |

TABLE 4

EOSR/EPOSR Record Format:

| Word #, Bit # | Description |
|---|---|
| Words 0–11, bits 0–15 | Same as OSR/POSR format. |
| Word 12, bits 0–15 | Calling Location ID: Contains 1–15 digits of the originating station line. This is the ANI number of the calling party. If 1 to 15 ANI or CSI digits are received, |
| Word 13, bits 0–15<br>Word 14, bits 0–15<br>Word 15, bits 0–11 | they are recorded in order starting with CLI1. Unused bytes contain TBCD-Null. If no ANI or CSI is available, record the OSID/OTG in CLI4–10, except where noted. If nothing is recorded in the CLI field, use a NOCLI value of 10. This field contains 1 of the following nine |

TABLE 4-continued

EOSR/EPOSR Record Format:

| Word #, Bit # | Description |
|---|---|
| | formats: |
| | 1. VNet CAMA DAL originations: If CSI is available, prefix the CSI with filed HNPA and HNXX information, if available, and record. Use NOCLI value of 7. |
| | 2. FG-C Originations: If ANI or CSI information is not available and the number is in the 00Y+NXX–XXXX format, record the 00Y code that was received in CLI1–3, and record the OSID/OTG in CLI4–10. Use NOCLI value of 8. |
| | 3. Inband FG-D Originations: Record the ANI that was received starting with CL1. Use NOCLI value of 1. |
| | 4. SS7 FG-D Originations: Record the charge number, if available. If the charge number is not available, record the calling party number. Use NOCLI value of 2 or 3. |
| | 5. International Originations: Record the country code and national number of the calling party. Use NOCLI value of 9. |
| | 6. SS7 IMTs Originations: Record the following information in this order of importance: 1) charge number, 2) calling party number, 3) OSID/OTG from generic digits. Use NOCLI value of 2, 3, or 8. |
| | 7. SS7 Reseller Originations: The CLI field will be filled with TBCD Nulls. |
| | 8. SS7 Private Network Originations: The CLI field will be filled with TBCD Nulls. |
| | 9. PRI Originations: Record the calling party number received in the ISDN setup message. The format: |

| | | 1–15 digit ANI/CSI (13 digit example) | OSID/ OTG | Incoming Int'l |
|---|---|---|---|---|
| Word 12, bits 0–3 | CLI1 | X | TBCD-Null | X(CC) |
| Word 12, bits 4–7 | CLI2 | X | TBCD-Null | X(CC) |
| Word 12, bits 8–11 | CLI3 | X | TBCD-Null | X(CC) |
| Word 12, bits 12–15 | CLI4 | X | X(OSID) | X(NN) |
| Word 13, bits 0–3 | CLI5 | X | X(OSID) | X(NN) |
| Word 13, bits 4–7 | CLI6 | X | X(OSID) | X(NN) |
| Word 13, bits 8–11 | CLI7 | X | X(OTG) | X(NN) |
| Word 13, bits 12–15 | CLI8 | X | X(OTG) | X(NN) |
| Word 14, bits 0–3 | CLI9 | X | X(OTG) | X(NN) |
| Word 14, bits 4–7 | CLI10 | X | X(OTG) | X(NN) |
| Word 14, bits 8–11 | CLI11 | X | TBCD-Null | X(NN) |
| Word 14, bits 12–15 | CLI12 | X | TBCD-Null | X(NN) |
| Word 15, bits 0–3 | CLI13 | X | TBCD-Null | X(NN) |
| Word 15, bits 4–7 | CLI14 | TBCD-Null | TBCD-Null | X(NN) |
| Word 15, bits 8–11 | CLI15 | TBCD-Null | TBCD-Null | X(NN) |

CC = Customer Connect
NN = National Number
OSID = Originating Switch ID
OTG = Originating Trunk Group

| Word #, Bit # | Description |
|---|---|
| Word 15, bits 12–15 Word 16, bits 0–15 Word 17, bits 0–15 Word 18, bits 0–15 | Authorization Code (Auth Code): Same as OSR/POSR format Auth Code, but represents 45 digits. 1. Authorization Codes: |

| | | | 5 digit | 6 digit | 7 digit |
|---|---|---|---|---|---|
| Word 15, bits 12–15 | A1 | | AUTH1 | AUTH1 | AUTH1 |
| Word 16, bits 0–3 | A2 | | AUTH2 | AUTH2 | AUTH2 |
| Word 16, bits 4–7 | A3 | | AUTH3 | AUTH3 | AUTH3 |
| Word 16, bits 8–11 | A4 | | AUTH4 | AUTH4 | AUTH4 |
| Word 16, bits 12–15 | A5 | | AUTH5 | AUTH5 | AUTH5 |
| Word 17, bits 0–3 | A6 | | SEC1 | AUTH6 | AUTH6 |
| Word 17, bits 4–7 | A7 | | SEC2 | SEC1 | AUTH7 |
| Word 17, bits 8–11 | A8 | | SEC3 | SEC2 | SEC1 |
| Word 17, bits 12–15 | A9 | | SEC4 | SEC3 | SEC2 |
| Word 18, bits 0–3 | A10 | | T-Null | SEC4 | SEC3 |
| Word 18, bits 4–7 | A11 | | SUPP1 | T-Null | SEC4 |
| Word 18, bits 8–11 | A12 | | SUPP2 | SUPP1 | T-Null |
| Word 18, bits 12–15 | A13 | | SUPP3 | SUPP2 | SUPP1 |
| Word 19, bits 0–3 | A14 | | SUPP4 | SUPP3 | SUPP2 |
| Word 19, bits 4–7 | A15 | | SUPP5 | SUPP4 | SUPP3 |
| Word 19, bits 8–11 | A16 | | SUPP6 | SUPP5 | SUPP4 |
| Word 19, bits 12–15 | A17 | | SUPP7 | SUPP6 | SUPP5 |
| Word 20, bits 0–3 | A18 | | SUPP8 | SUPP7 | SUPP6 |
| Word 20, bits 4–7 | A19 | | SUPP9 | SUPP8 | SUPP7 |
| Word 20, bits 8–11 | A20 | | SUPP10 | SUPP9 | SUPP8 |
| Word 20, bits 12–15 | A21 | | SUPP11 | SUPP10 | SUPP9 |
| Word 21, bits 0–3 | A22 | | SUPP12 | SUPP11 | SUPP10 |
| Word 21, bits 4–7 | A23 | | SUPP13 | SUPP12 | SUPP11 |
| Word 21, bits 8–11 | A24 | | SUPP14 | SUPP13 | SUPP12 |
| Word 21, bits 12–15 | A25 | | SUPP15 | SUPP14 | SUPP13 |
| Word 22, bits 0–3 | A26 | | SUPP16 | SUPP15 | SUPP14 |
| Word 22, bits 4–7 | A27 | | SUPP17 | SUPP16 | SUPP15 |
| Word 22, bits 8–11 | A28 | | SUPP18 | SUPP17 | SUPP16 |
| Word 22, bits 12–15 | A29 | | SUPP19 | SUPP18 | SUPP17 |
| Word 23, bits 0–3 | A30 | | SUPP20 | SUPP19 | SUPP18 |
| Word 23, bits 4–7 | A31 | | SUPP21 | SUPP20 | SUPP19 |
| Word 23, bits 8–11 | A32 | | SUPP22 | SUPP21 | SUPP20 |
| Word 23, bits 12–15 | A33 | | SUPP23 | SUPP22 | SUPP21 |
| Word 24, bits 0–3 | A34 | | SUPP24 | SUPP23 | SUPP22 |
| Word 24, bits 4–7 | A35 | | SUPP25 | SUPP24 | SUPP23 |
| Word 24, bits 8–11 | A36 | | SUPP26 | SUPP25 | SUPP24 |
| Word 24, bits 12–15 | A37 | | SUPP27 | SUPP26 | SUPP25 |
| Word 25, bits 0–3 | A38 | | SUPP28 | SUPP27 | SUPP26 |
| Word 25, bits 4–7 | A39 | | SUPP29 | SUPP28 | SUPP27 |
| Word 25, bits 8–11 | A40 | | SUPP30 | SUPP29 | SUPP28 |
| Word 25, bits 12–15 | A41 | | T-Null | SUPP30 | SUPP29 |
| Word 26, bits 0–3 | A42 | | T-Null | T-Null | SUPP30 |
| Word 26, bits 4–7 | A43 | | T-Null | T-Null | T-Null |
| Word 26, bits 8–11 | A44 | | T-Null | T-Null | T-Null |
| Word 26, bits 12–15 | A45 | | T-Null | T-Null | T-Null |

T-Null = TBCD-Null

2. Calling Station ID (CSI):

| | | 7 digit | 1–10 digit |
|---|---|---|---|
| Word 15, bits 12–15 | A1 | X | X |
| Word 16, bits 0–3 | A2 | X | X |
| Word 16, bits 4–7 | A3 | X | X |
| Word 16, bits 8–11 | A4 | X | X |
| Word 16, bits 12–15 | A5 | X | X |
| Word 17, bits 0–3 | A6 | X | X |
| Word 17, bits 4–7 | A7 | X | X |
| Word 17, bits 8–11 | A8 | TBCD-Null | X |
| Word 17, bits 12–15 | A9 | SUPP1 | X |
| Word 18, bits 0–3 | A10 | SUPP2 | X |
| Word 18, bits 4–7 | A11 | SUPP3 | TBCD-Null |
| Word 18, bits 8–11 | A12 | SUPP4 | SUPP1 |
| Word 18, bits 12–15 | A13 | SUPP5 | SUPP2 |
| Word 19, bits 0–3 | A14 | SUPP6 | SUPP3 |
| Word 19, bits 4–7 | A15 | SUPP7 | SUPP4 |
| Word 19, bits 8–11 | A16 | SUPP8 | SUPP5 |
| Word 19, bits 12–15 | A17 | SUPP9 | SUPP6 |
| Word 20, bits 0–3 | A18 | SUPP10 | SUPP7 |
| Word 20, bits 4–7 | A19 | SUPP11 | SUPP8 |
| Word 20, bits 8–11 | A20 | SUPP12 | SUPP9 |
| Word 20, bits 12–15 | A21 | SUPP13 | SUPP10 |
| Word 21, bits 0–3 | A22 | SUPP14 | SUPP11 |
| Word 21, bits 4–7 | A23 | SUPP15 | SUPP12 |
| Word 21, bits 8–11 | A24 | SUPP16 | SUPP13 |
| Word 21, bits 12–15 | A25 | SUPP17 | SUPP14 |
| Word 22, bits 0–3 | A26 | SUPP18 | SUPP15 |
| Word 22, bits 4–7 | A27 | SUPP19 | SUPP16 |
| Word 22, bits 8–11 | A28 | SUPP20 | SUPP17 |
| Word 22, bits 12–15 | A29 | SUPP21 | SUPP18 |
| Word 23, bits 0–3 | A30 | SUPP22 | SUPP19 |

TABLE 4-continued

EOSR/EPOSR Record Format:

| Word #, Bit # | | Description | | |
|---|---|---|---|---|
| Word 23, bits 4–7 | A31 | SUPP23 | SUPP20 | |
| Word 23, bits 8–11 | A32 | SUPP24 | SUPP21 | |
| Word 23, bits 12–15 | A33 | SUPP25 | SUPP22 | |
| Word 24, bits 0–3 | A34 | SUPP26 | SUPP23 | |
| Word 24, bits 4–7 | A35 | SUPP27 | SUPP24 | |
| Word 24, bits 8–11 | A36 | SUPP28 | SUPP25 | |
| Word 24, bits 12–15 | A37 | SUPP29 | SUPP26 | |
| Word 25, bits 0–3 | A38 | SUPP30 | SUPP27 | |
| Word 25, bits 4–7 | A39 | TBCD-Null | SUPP28 | |
| Word 25, bits 8–11 | A40 | TBCD-Null | SUPP29 | |
| Word 25, bits 12–15 | A41 | TBCD-Null | SUPP30 | |
| Word 26, bits 0–3 | A42 | TBCD-Null | TBCD-Null | |
| Word 26, bits 4–7 | A43 | TBCD-Null | TBCD-Null | |
| Word 26, bits 8–11 | A44 | TBCD-Null | TBCD-Null | |
| Word 26, bits 12–15 | A45 | TBCD-Null | TBCD-Null | |

3. Supplemental Codes:

| Word 15, bits 12–15 | A1 | SUPP1 |
|---|---|---|
| Word 16, bits 0–3 | A2 | SUPP2 |
| Word 16, bits 4–7 | A3 | SUPP3 |
| Word 16, bits 8–11 | A4 | SUPP4 |
| Word 16, bits 12–15 | A5 | SUPP5 |
| Word 17, bits 0–3 | A6 | SUPP6 |
| Word 17, bits 4–7 | A7 | SUPP7 |
| Word 17, bits 8–11 | A8 | SUPP8 |
| Word 17, bits 12–15 | A9 | SUPP9 |
| Word 18, bits 0–3 | A10 | SUPP10 |
| Word 18, bits 4–7 | A11 | SUPP11 |
| Word 18, bits 8–11 | A12 | SUPP12 |
| Word 18, bits 12–15 | A13 | SUPP13 |
| Word 19, bits 0–3 | A14 | SUPP14 |
| Word 19, bits 4–7 | A15 | SUPP15 |
| Word 19, bits 8–11 | A16 | SUPP16 |
| Word 19, bits 12–15 | A17 | SUPP17 |
| Word 20, bits 0–3 | A18 | SUPP18 |
| Word 20, bits 4–7 | A19 | SUPP19 |
| Word 20, bits 8–11 | A20 | SUPP20 |
| Word 20, bits 12–15 | A21 | SUPP21 |
| Word 21, bits 0–3 | A22 | SUPP22 |
| Word 21, bits 4–7 | A23 | SUPP23 |
| Word 21, bits 8–11 | A24 | SUPP24 |
| Word 21, bits 12–15 | A25 | SUPP25 |
| Word 22, bits 0–3 | A26 | SUPP26 |
| Word 22, bits 4–7 | A27 | SUPP27 |
| Word 22, bits 8–11 | A28 | SUPP28 |
| Word 22, bits 12–15 | A29 | SUPP29 |
| Word 23, bits 0–3 | A30 | TBCD-Null |
| Word 23, bits 4–7 | A31 | TBCD-Null |
| Word 23, bits 8–11 | A32 | TBCD-Null |
| Word 23, bits 12–15 | A33 | TBCD-Null |
| Word 24, bits 0–3 | A34 | TBCD-Null |
| Word 24, bits 4–7 | A35 | TBCD-Null |
| Word 24, bits 8–11 | A36 | TBCD-Null |
| Word 24, bits 12–15 | A37 | TBCD-Null |
| Word 25, bits 0–3 | A38 | TBCD-Null |
| Word 25, bits 4–7 | A39 | TBCD-Null |
| Word 25, bits 8–11 | A40 | TBCD-Null |
| Word 25, bits 12–15 | A41 | TBCD-Null |
| Word 26, bits 0–3 | A42 | TBCD-Null |
| Word 26, bits 4–7 | A43 | TBCD-Null |
| Word 26, bits 8–11 | A44 | TBCD-Null |
| Word 26, bits 12–15 | A45 | TBCD-Null |

4. VNet Remote Access and Calling Party Number:

| Word 15, bits 12–15 | A1 | N |
|---|---|---|
| Word 16, bits 0–3 | A2 | X |
| Word 16, bits 4–7 | A3 | X |
| Word 16, bits 8–11 | A4 | N |
| Word 16, bits 12–15 | A5 | X |
| Word 17, bits 0–3 | A6 | X |
| Word 17, bits 4–7 | A7 | X |
| Word 17, bits 8–11 | A8 | X |
| Word 17, bits 12–15 | A9 | X |
| Word 18, bits 0–3 | A10 | X |
| Word 18, bits 4–7 | A11 | TBCD-Null |
| Word 18, bits 8–11 | A12 | SUPP1 |
| Word 18, bits 12–15 | A13 | SUPP2 |
| Word 19, bits 0–3 | A14 | SUPP3 |
| Word 19, bits 4–7 | A15 | SUPP4 |
| Word 19, bits 8–11 | A16 | SUPP5 |
| Word 19, bits 12–15 | A17 | SUPP6 |
| Word 20, bits 0–3 | A18 | SUPP7 |
| Word 20, bits 4–7 | A19 | SUPP8 |
| Word 20, bits 8–11 | A20 | SUPP9 |
| Word 20, bits 12–15 | A21 | SUPP10 |
| Word 21, bits 0–3 | A22 | SUPP11 |
| Word 21, bits 4–7 | A23 | SUPP12 |
| Word 21, bits 8–11 | A24 | SUPP13 |
| Word 21, bits 12–15 | A25 | SUPP14 |
| Word 22, bits 0–3 | A26 | SUPP15 |
| Word 22, bits 4–7 | A27 | SUPP16 |
| Word 22, bits 8–11 | A28 | SUPP17 |
| Word 22, bits 12–15 | A29 | SUPP18 |
| Word 23, bits 0–3 | A30 | SUPP19 |
| Word 23, bits 4–7 | A31 | SUPP20 |
| Word 23, bits 8–11 | A32 | SUPP21 |
| Word 23, bits 12–15 | A33 | SUPP22 |
| Word 24, bits 0–3 | A34 | SUPP23 |
| Word 24, bits 4–7 | A35 | SUPP24 |
| Word 24, bits 8–11 | A36 | SUPP25 |
| Word 24, bits 12–15 | A37 | SUPP26 |
| Word 25, bits 0–3 | A38 | SUPP27 |
| Word 25, bits 4–7 | A39 | SUPP28 |
| Word 25, bits 8–11 | A40 | SUPP29 |
| Word 25, bits 12–15 | A41 | SUPP30 |
| Word 26, bits 0–3 | A42 | TBCD-Null |
| Word 26, bits 4–7 | A43 | TBCD-Null |
| Word 26, bits 8–11 | A44 | TBCD-Null |
| Word 26, bits 12–15 | A45 | TBCD-Null |

5. Calling Party Number:

| Word 15, bits 12–15 | A1 | N |
|---|---|---|
| Word 16, bits 0–3 | A2 | X |
| Word 16, bits 4–7 | A3 | X |
| Word 16, bits 8–11 | A4 | N |
| Word 16, bits 12–15 | A5 | X |
| Word 17, bits 0–3 | A6 | X |
| Word 17, bits 4–7 | A7 | X |
| Word 17, bits 8–11 | A8 | X |
| Word 17, bits 12–15 | A9 | X |
| Word 18, bits 0–3 | A10 | X |
| Word 18, bits 4–7 | A11 | TBCD-Null |
| Word 18, bits 8–11 | A12 | SUPP1 |
| Word 18, bits 12–15 | A13 | SUPP2 |
| Word 19, bits 0–3 | A14 | SUPP3 |
| Word 19, bits 4–7 | A15 | SUPP4 |
| Word 19, bits 8–11 | A16 | SUPP5 |
| Word 19, bits 12–15 | A17 | SUPP6 |
| Word 20, bits 0–3 | A18 | SUPP7 |
| Word 20, bits 4–7 | A19 | SUPP8 |
| Word 20, bits 8–11 | A20 | SUPP9 |
| Word 20, bits 12–15 | A21 | SUPP10 |
| Word 21, bits 0–3 | A22 | SUPP11 |
| Word 21, bits 4–7 | A23 | SUPP12 |
| Word 21, bits 8–11 | A24 | SUPP13 |
| Word 21, bits 12–15 | A25 | SUPP14 |
| Word 22, bits 0–3 | A26 | SUPP15 |
| Word 22, bits 4–7 | A27 | SUPP16 |
| Word 22, bits 8–11 | A28 | SUPP17 |
| Word 22, bits 12–15 | A29 | SUPP18 |
| Word 23, bits 0–3 | A30 | SUPP19 |
| Word 23, bits 4–7 | A31 | SUPP20 |
| Word 23, bits 8–11 | A32 | SUPP21 |
| Word 23, bits 12–15 | A33 | SUPP22 |
| Word 24, bits 0–3 | A34 | SUPP23 |
| Word 24, bits 4–7 | A35 | SUPP24 |
| Word 24, bits 8–11 | A36 | SUPP25 |
| Word 24, bits 12–15 | A37 | SUPP26 |
| Word 25, bits 0–3 | A38 | SUPP27 |
| Word 25, bits 4–7 | A39 | SUPP28 |

TABLE 4-continued

EOSR/EPOSR Record Format:

| Word #, Bit # | | | Description |
|---|---|---|---|
| Word 25, bits 8–11 | A40 | SUPP29 | |
| Word 25, bits 12–15 | A41 | SUPP30 | |
| Word 26, bits 0–3 | A42 | TBCD-Null | |
| Word 26, bits 4–7 | A43 | TBCD-Null | |
| Word 26, bits 8–11 | A44 | TBCD-Null | |
| Word 26, bits 12–15 | A45 | TBCD-Null | |
| 6. Credit Card: | | | |
| Word 15, bits 12–15 | A1 | X | |
| Word 16, bits 0–3 | A2 | X | |
| Word 16, bits 4–7 | A3 | X | |
| Word 16, bits 8–11 | A4 | X | |
| Word 16, bits 12–15 | A5 | X | |
| Word 17, bits 0–3 | A6 | X | |
| Word 17, bits 4–7 | A7 | X | |
| Word 17, bits 8–11 | A8 | X | |
| Word 17, bits 12–15 | A9 | X | |
| Word 18, bits 0–3 | A10 | X | |
| Word 18, bits 4–7 | A11 | X | |
| Word 18, bits 8–11 | A12 | X | |
| Word 18, bits 12–15 | A13 | X | |
| Word 19, bits 0–3 | A14 | X | |
| Word 19, bits 4–7 | A15 | X | |
| Word 19, bits 8–11 | A16 | X | |
| Word 19, bits 12–15 | A17 | X | |
| Word 20, bits 0–3 | A18 | X | |
| Word 20, bits 4–7 | A19 | X | |
| Word 20, bits 8–11 | A20 | TBCD-Null | |
| Word 20, bits 12–15 | A21 | SUPP1 | |
| Word 21, bits 0–3 | A22 | SUPP2 | |
| Word 21, bits 4–7 | A23 | SUPP3 | |
| Word 21, bits 8–11 | A24 | SUPP4 | |
| Word 21, bits 12–15 | A25 | SUPP5 | |
| Word 22, bits 0–3 | A26 | SUPP6 | |
| Word 22, bits 4–7 | A27 | SUPP7 | |
| Word 22, bits 8–11 | A28 | SUPP8 | |
| Word 22, bits 12–15 | A29 | SUPP9 | |
| Word 23, bits 0–3 | A30 | SUPP10 | |
| Word 23, bits 4–7 | A31 | SUPP11 | |
| Word 23, bits 8–11 | A32 | SUPP12 | |
| Word 23, bits 12–15 | A33 | SUPP13 | |
| Word 24, bits 0–3 | A34 | SUPP14 | |
| Word 24, bits 4–7 | A35 | SUPP15 | |
| Word 24, bits 8–11 | A36 | SUPP16 | |
| Word 24, bits 12–15 | A37 | SUPP17 | |
| Word 25, bits 0–3 | A38 | SUPP18 | |
| Word 25, bits 4–7 | A39 | SUPP19 | |
| Word 25, bits 8–11 | A40 | SUPP20 | |
| Word 25, bits 12–15 | A41 | SUPP21 | |
| Word 26, bits 0–3 | A42 | SUPP22 | |
| Word 26, bits 4–7 | A43 | SUPP23 | |
| Word 26, bits 8–11 | A44 | SUPP24 | |
| Word 26, bits 12–15 | A45 | SUPP25 | |
| 7. 14 Digit MCI/VNet Calling Card: | | | |
| Word 15, bits 12–15 | A1 | X | |
| Word 16, bits 0–3 | A2 | X | |
| Word 16, bits 4–7 | A3 | X | |
| Word 16, bits 8–11 | A4 | X | |
| Word 16, bits 12–15 | A5 | X | |
| Word 17, bits 0–3 | A6 | X | |
| Word 17, bits 4–7 | A7 | X | |
| Word 17, bits 8–11 | A8 | X | |
| Word 17, bits 12–15 | A9 | X | |
| Word 18, bits 0–3 | A10 | X | |
| Word 18, bits 4–7 | A11 | TBCD-A | |
| Word 18, bits 8–11 | A12 | TBCD-A | |
| Word 18, bits 12–15 | A13 | TBCD-A | |
| Word 19, bits 0–3 | A14 | TBCD-A | |
| Word 19, bits 4–7 | A15 | TBCD-Null | |
| Word 19, bits 8–11 | A16 | SUPP1 | |
| Word 19, bits 12–15 | A17 | SUPP2 | |
| Word 20, bits 0–3 | A18 | SUPP3 | |
| Word 20, bits 4–7 | A19 | SUPP4 | |
| Word 20, bits 8–11 | A20 | SUPP5 | |
| Word 20, bits 12–15 | A21 | SUPP6 | |
| Word 21, bits 0–3 | A22 | SUPP7 | |
| Word 21, bits 4–7 | A23 | SUPP8 | |
| Word 21, bits 8–11 | A24 | SUPP9 | |
| Word 21, bits 12–15 | A25 | SUPP10 | |
| Word 22, bits 0–3 | A26 | SUPP11 | |
| Word 22, bits 4–7 | A27 | SUPP12 | |
| Word 22, bits 8–11 | A28 | SUPP13 | |
| Word 22, bits 12–15 | A29 | SUPP14 | |
| Word 23, bits 0–3 | A30 | SUPP15 | |
| Word 23, bits 4–7 | A31 | SUPP16 | |
| Word 23, bits 8–11 | A32 | SUPP17 | |
| Word 23, bits 12–15 | A33 | SUPP18 | |
| Word 24, bits 0–3 | A34 | SUPP19 | |
| Word 24, bits 4–7 | A35 | SUPP20 | |
| Word 24, bits 8–11 | A36 | SUPP21 | |
| Word 24, bits 12–15 | A37 | SUPP22 | |
| Word 25, bits 0–3 | A38 | SUPP23 | |
| Word 25, bits 4–7 | A39 | SUPP24 | |
| Word 25, bits 8–11 | A40 | SUPP25 | |
| Word 25, bits 12–15 | A41 | SUPP26 | |
| Word 26, bits 0–3 | A42 | SUPP27 | |
| Word 26, bits 4–7 | A43 | SUPP28 | |
| Word 26, bits 8–11 | A44 | SUPP29 | |
| Word 26, bits 12–15 | A45 | SUPP30 | |
| 8. OSID/OTG: | | | |
| Word 15, bits 12–15 | A1 | X(OSID) | |
| Word 16, bits 0–3 | A2 | X(OSID) | |
| Word 16, bits 4–7 | A3 | X(OSID) | |
| Word 16, bits 8–11 | A4 | X(OTG) | |
| Word 16, bits 12–15 | A5 | X(OTG) | |
| Word 17, bits 0–3 | A6 | X(OTG) | |
| Word 17, bits 4–7 | A7 | X(OTG) | |
| Word 17, bits 8–11 | A8 | TBCD-Null | |
| Word 17, bits 12–15 | A9 | TBCD-Null | |
| Word 18, bits 0–3 | A10 | TBCD-Null | |
| Word 18, bits 4–7 | A11 | TBCD-Null | |
| Word 18, bits 8–11 | A12 | TBCD-Null | |
| Word 18, bits 12–15 | A13 | TBCD-Null | |
| Word 19, bits 0–3 | A14 | TBCD-Null | |
| Word 19, bits 4–7 | A15 | TBCD-Null | |
| Word 19, bits 8–11 | A16 | TBCD-Null | |
| Word 19, bits 12–15 | A17 | TBCD-Null | |
| Word 20, bits 0–3 | A18 | TBCD-Null | |
| Word 20, bits 4–7 | A19 | TBCD-Null | |
| Word 20, bits 8–11 | A20 | TBCD-Null | |
| Word 20, bits 12–15 | A21 | TBCD-Null | |
| Word 21, bits 0–3 | A22 | TBCD-Null | |
| Word 21, bits 4–7 | A23 | TBCD-Null | |
| Word 21, bits 8–11 | A24 | TBCD-Null | |
| Word 21, bits 12–15 | A25 | TBCD-Null | |
| Word 22, bits 0–3 | A26 | TBCD-Null | |
| Word 22, bits 4–7 | A27 | TBCD-Null | |
| Word 22, bits 8–11 | A28 | TBCD-Null | |
| Word 22, bits 12–15 | A29 | TBCD-Null | |
| Word 23, bits 0–3 | A30 | TBCD-Null | |
| Word 23, bits 4–7 | A31 | TBCD-Null | |
| Word 23, bits 8–11 | A32 | TBCD-Null | |
| Word 23, bits 12–15 | A33 | TBCD-Null | |
| Word 24, bits 0–3 | A34 | TBCD-Null | |
| Word 24, bits 4–7 | A35 | TBCD-Null | |
| Word 24, bits 8–11 | A36 | TBCD-Null | |
| Word 24, bits 12–15 | A37 | TBCD-Null | |
| Word 25, bits 0–3 | A38 | TBCD-Null | |
| Word 25, bits 4–7 | A39 | TBCD-Null | |
| Word 25, bits 8–11 | A40 | TBCD-Null | |
| Word 25, bits 12–15 | A41 | TBCD-Null | |
| Word 26, bits 0–3 | A42 | TBCD-Null | |
| Word 26, bits 4–7 | A43 | TBCD-Null | |
| Word 26, bits 8–11 | A44 | TBCD-Null | |
| Word 26, bits 12–15 | A45 | TBCD-Null | |

OSID = Originating Switch ID (000–999)
OTG = Originating Trunk ID (0000–8191)

TABLE 4-continued

EOSR/EPOSR Record Format:

| Word #, Bit # | Description | | |
|---|---|---|---|
| 9. Telecommunication/PTT Cards: | | | |
| Word 15, bits 12–15 | A1 | X | |
| Word 16, bits 0–3 | A2 | X | |
| Word 16, bits 4–7 | A3 | X | |
| Word 16, bits 8–11 | A4 | X | |
| Word 16, bits 12–15 | A5 | X | |
| Word 17, bits 0–3 | A6 | X | |
| Word 17, bits 4–7 | A7 | X | |
| Word 17, bits 8–11 | A8 | X | |
| Word 17, bits 12–15 | A9 | X | |
| Word 18, bits 0–3 | A10 | X | |
| Word 18, bits 4–7 | A11 | X | |
| Word 18, bits 8–11 | A12 | X | |
| Word 18, bits 12–15 | A13 | X | |
| Word 19, bits 0–3 | A14 | X | |
| Word 19, bits 4–7 | A15 | X | |
| Word 19, bits 8–11 | A16 | X | |
| Word 19, bits 12–15 | A17 | X | |
| Word 20, bits 0–3 | A18 | X | |
| Word 20, bits 4–7 | A19 | X | |
| Word 20, bits 8–11 | A20 | X | |
| Word 20, bits 12–15 | A21 | X | |
| Word 21, bits 0–3 | A22 | X | |
| Word 21, bits 4–7 | A23 | X | |
| Word 21, bits 8–11 | A24 | TBCD-Null | |
| Word 21, bits 12–15 | A25 | SUPP1 | |
| Word 22, bits 0–3 | A26 | SUPP2 | |
| Word 22, bits 4–7 | A27 | SUPP3 | |
| Word 22, bits 8–11 | A28 | SUPP4 | |
| Word 22, bits 12–15 | A29 | SUPP5 | |
| Word 23, bits 0–3 | A30 | SUPP6 | |
| Word 23, bits 4–7 | A31 | SUPP7 | |
| Word 23, bits 8–11 | A32 | SUPP8 | |
| Word 23, bits 12–15 | A33 | SUPP9 | |
| Word 24, bits 0–3 | A34 | SUPP10 | |
| Word 24, bits 4–7 | A35 | SUPP11 | |
| Word 24, bits 8–11 | A36 | SUPP12 | |
| Word 24, bits 12–15 | A37 | SUPP13 | |
| Word 25, bits 0–3 | A38 | SUPP14 | |
| Word 25, bits 4–7 | A39 | SUPP15 | |
| Word 25, bits 8–11 | A40 | SUPP16 | |
| Word 25, bits 12–15 | A41 | SUPP17 | |
| Word 26, bits 0–3 | A42 | SUPP18 | |
| Word 26, bits 4–7 | A43 | SUPP19 | |
| Word 26, bits 8–11 | A44 | SUPP20 | |
| Word 26, bits 12–15 | A45 | SUPP21 | |
| 10. Business Group ID: | | | |
| Word 15, bits 12–15 | A1 | X | |
| Word 16, bits 0–3 | A2 | X | |
| Word 16, bits 4–7 | A3 | X | |
| Word 16, bits 8–11 | A4 | X | |
| Word 16, bits 12–15 | A5 | X | |
| Word 17, bits 0–3 | A6 | X | |
| Word 17, bits 4–7 | A7 | TBCD-Null | |
| Word 17, bits 8–11 | A8 | SUPP1 | |
| Word 17, bits 12–15 | A9 | SUPP2 | |
| Word 18, bits 0–3 | A10 | SUPP3 | |
| Word 18, bits 4–7 | A11 | SUPP4 | |
| Word 18, bits 8–11 | A12 | SUPP5 | |
| Word 18, bits 12–15 | A13 | SUPP6 | |
| Word 19, bits 0–3 | A14 | SUPP7 | |
| Word 19, bits 4–7 | A15 | SUPP8 | |
| Word 19, bits 8–11 | A16 | SUPP9 | |
| Word 19, bits 12–15 | A17 | SUPP10 | |
| Word 20, bits 0–3 | A18 | SUPP11 | |
| Word 20, bits 4–7 | A19 | SUPP12 | |
| Word 20, bits 8–11 | A20 | SUPP13 | |
| Word 20, bits 12–15 | A21 | SUPP14 | |
| Word 21, bits 0–3 | A22 | SUPP15 | |
| Word 21, bits 4–7 | A23 | SUPP16 | |
| Word 21, bits 8–11 | A24 | SUPP17 | |
| Word 21, bits 12–15 | A25 | SUPP18 | |
| Word 22, bits 0–3 | A26 | SUPP19 | |
| Word 22, bits 4–7 | A27 | SUPP20 | |
| Word 22, bits 8–11 | A28 | SUPP21 | |
| Word 22, bits 12–15 | A29 | SUPP22 | |
| Word 23, bits 0–3 | A30 | SUPP23 | |
| Word 23, bits 4–7 | A31 | SUPP24 | |
| Word 23, bits 8–11 | A32 | SUPP25 | |
| Word 23, bits 12–15 | A33 | SUPP26 | |
| Word 24, bits 0–3 | A34 | SUPP27 | |
| Word 24, bits 4–7 | A35 | SUPP28 | |
| Word 24, bits 8–11 | A36 | SUPP29 | |
| Word 24, bits 12–15 | A37 | SUPP30 | |
| Word 25, bits 0–3 | A38 | TBCD-Null | |
| Word 25, bits 4–7 | A39 | TBCD-Null | |
| Word 25, bits 8–11 | A40 | TBCD-Null | |
| Word 25, bits 12–15 | A41 | TBCD-Null | |
| Word 26, bits 0–3 | A42 | TBCD-Null | |
| Word 26, bits 4–7 | A43 | TBCD-Null | |
| Word 26, bits 8–11 | A44 | TBCD-Null | |
| Word 26, bits 12–15 | A45 | TBCD-Null | |
| 11. Network Information: | | | |
| Word 15, bits 12–15 | A1 | X | |
| Word 16, bits 0–3 | A2 | X | |
| Word 16, bits 4–7 | A3 | X | |
| Word 16, bits 8–11 | A4 | X | |
| Word 16, bits 12–15 | A5 | TBCD-Null | |
| Word 17, bits 0–3 | A6 | SUPP1 | |
| Word 17, bits 4–7 | A7 | SUPP2 | |
| Word 17, bits 8–11 | A8 | SUPP3 | |
| Word 17, bits 12–15 | A9 | SUPP4 | |
| Word 18, bits 0–3 | A10 | SUPP5 | |
| Word 18, bits 4–7 | A11 | SUPP6 | |
| Word 18, bits 8–11 | A12 | SUPP7 | |
| Word 18, bits 12–15 | A13 | SUPP8 | |
| Word 19, bits 0–3 | A14 | SUPP9 | |
| Word 19, bits 4–7 | A15 | SUPP10 | |
| Word 19, bits 8–11 | A16 | SUPP11 | |
| Word 19, bits 12–15 | A17 | SUPP12 | |
| Word 20, bits 0–3 | A18 | SUPP13 | |
| Word 20, bits 4–7 | A19 | SUPP14 | |
| Word 20, bits 8–11 | A20 | SUPP15 | |
| Word 20, bits 12–15 | A21 | SUPP16 | |
| Word 21, bits 0–3 | A22 | SUPP17 | |
| Word 21, bits 4–7 | A23 | SUPP18 | |
| Word 21, bits 8–11 | A24 | SUPP19 | |
| Word 21, bits 12–15 | A25 | SUPP20 | |
| Word 22, bits 0–3 | A26 | SUPP21 | |
| Word 22, bits 4–7 | A27 | SUPP22 | |
| Word 22, bits 8–11 | A28 | SUPP23 | |
| Word 22, bits 12–15 | A29 | SUPP24 | |
| Word 23, bits 0–3 | A30 | SUPP25 | |
| Word 23, bits 4–7 | A31 | SUPP26 | |
| Word 23, bits 8–11 | A32 | SUPP27 | |
| Word 23, bits 12–15 | A33 | SUPP28 | |
| Word 24, bits 0–3 | A34 | SUPP29 | |
| Word 24, bits 4–7 | A35 | SUPP30 | |
| Word 24, bits 8–11 | A36 | TBCD-Null | |
| Word 24, bits 12–15 | A37 | TBCD-Null | |
| Word 25, bits 0–3 | A38 | TBCD-Null | |
| Word 25, bits 4–7 | A39 | TBCD-Null | |
| Word 25, bits 8–11 | A40 | TBCD-Null | |
| Word 25, bits 12–15 | A41 | TBCD-Null | |
| Word 26, bits 0–3 | A42 | TBCD-Null | |
| Word 26, bits 4–7 | A43 | TBCD-Null | |
| Word 26, bits 8–11 | A44 | TBCD-Null | |
| Word 26, bits 12–15 | A45 | TBCD-Null | |
| 12. BOC/LEC Card: | | | |
| Word 15, bits 12–15 | A1 | N | |
| Word 16, bits 0–3 | A2 | X | |
| Word 16, bits 4–7 | A3 | X | |
| Word 16, bits 8–11 | A4 | N | |
| Word 16, bits 12–15 | A5 | X | |
| Word 17, bits 0–3 | A6 | X | |
| Word 17, bits 4–7 | A7 | X | |

TABLE 4-continued

EOSR/EPOSR Record Format:

| Word #, Bit # | | Description | |
|---|---|---|---|
| Word 17, bits 8–11 | A8 | X | |
| Word 17, bits 12–15 | A9 | X | |
| Word 18, bits 0–3 | A10 | X | |
| Word 18, bits 4–7 | A11 | TBCD-Null | |
| Word 18, bits 8–11 | A12 | TBCD-Null | |
| Word 18, bits 12–15 | A13 | TBCD-Null | |
| Word 19, bits 0–3 | A14 | TBCD-Null | |
| Word 19, bits 4–7 | A15 | TBCD-Null | |
| Word 19, bits 8–11 | A16 | TBCD-Null | |
| Word 19, bits 12–15 | A17 | TBCD-Null | |
| Word 20, bits 0–3 | A18 | TBCD-Null | |
| Word 20, bits 4–7 | A19 | TBCD-Null | |
| Word 20, bits 8–11 | A20 | TBCD-Null | |
| Word 20, bits 12–15 | A21 | TBCD-Null | |
| Word 21, bits 0–3 | A22 | TBCD-Null | |
| Word 21, bits 4–7 | A23 | TBCD-Null | |
| Word 21, bits 8–11 | A24 | TBCD-Null | |
| Word 21, bits 12–15 | A25 | TBCD-Null | |
| Word 22, bits 0–3 | A26 | TBCD-Null | |
| Word 22, bits 4–7 | A27 | TBCD-Null | |
| Word 22, bits 8–11 | A28 | TBCD-Null | |
| Word 22, bits 12–15 | A29 | TBCD-Null | |
| Word 23, bits 0–3 | A30 | TBCD-Null | |
| Word 23, bits 4–7 | A31 | TBCD-Null | |
| Word 23, bits 8–11 | A32 | TBCD-Null | |
| Word 23, bits 12–15 | A33 | TBCD-Null | |
| Word 24, bits 0–3 | A34 | TBCD-Null | |
| Word 24, bits 4–7 | A35 | TBCD-Null | |
| Word 24, bits 8–11 | A36 | TBCD-Null | |
| Word 24, bits 12–15 | A37 | TBCD-Null | |
| Word 25, bits 0–3 | A38 | TBCD-Null | |
| Word 25, bits 4–7 | A39 | TBCD-Null | |
| Word 25, bits 8–11 | A40 | TBCD-Null | |
| Word 25, bits 12–15 | A41 | TBCD-Null | |
| Word 26, bits 0–3 | A42 | TBCD-Null | |
| Word 26, bits 4–7 | A43 | TBCD-Null | |
| Word 26, bits 8–11 | A44 | TBCD-Null | |
| Word 26, bits 12–15 | A45 | TBCD-Null | |
| 13. Third Party Number: | | | |
| Word 15, bits 12–15 | A1 | N | |
| Word 16, bits 0–3 | A2 | X | |
| Word 16, bits 4–7 | A3 | X | |
| Word 16, bits 8–11 | A4 | N | |
| Word 16, bits 12–15 | A5 | X | |
| Word 17, bits 0–3 | A6 | X | |
| Word 17, bits 4–7 | A7 | X | |
| Word 17, bits 8–11 | A8 | X | |
| Word 17, bits 12–15 | A9 | X | |
| Word 18, bits 0–3 | A10 | X | |
| Word 18, bits 4–7 | A11 | TBCD-Null | |
| Word 18, bits 8–11 | A12 | TBCD-Null | |
| Word 18, bits 12–15 | A13 | TBCD-Null | |
| Word 19, bits 0–3 | A14 | TBCD-Null | |
| Word 19, bits 4–7 | A15 | TBCD-Null | |
| Word 19, bits 8–11 | A16 | TBCD-Null | |
| Word 19, bits 12–15 | A17 | TBCD-Null | |
| Word 20, bits 0–3 | A18 | TBCD-Null | |
| Word 20, bits 4–7 | A19 | TBCD-Null | |
| Word 20, bits 8–11 | A20 | TBCD-Null | |
| Word 20, bits 12–15 | A21 | TBCD-Null | |
| Word 21, bits 0–3 | A22 | TBCD-Null | |
| Word 21, bits 4–7 | A23 | TBCD-Null | |
| Word 21, bits 8–11 | A24 | TBCD-Null | |
| Word 21, bits 12–15 | A25 | TBCD-Null | |
| Word 22, bits 0–3 | A26 | TBCD-Null | |
| Word 22, bits 4–7 | A27 | TBCD-Null | |
| Word 22, bits 8–11 | A28 | TBCD-Null | |
| Word 22, bits 12–15 | A29 | TBCD-Null | |
| Word 23, bits 0–3 | A30 | TBCD-Null | |
| Word 23, bits 4–7 | A31 | TBCD-Null | |
| Word 23, bits 8–11 | A32 | TBCD-Null | |
| Word 23, bits 12–15 | A33 | TBCD-Null | |
| Word 24, bits 0–3 | A34 | TBCD-Null | |
| Word 24, bits 4–7 | A35 | TBCD-Null | |
| Word 24, bits 8–11 | A36 | TBCD-Null | |
| Word 24, bits 12–15 | A37 | TBCD-Null | |
| Word 25, bits 0–3 | A38 | TBCD-Null | |
| Word 25, bits 4–7 | A39 | TBCD-Null | |
| Word 25, bits 8–11 | A40 | TBCD-Null | |
| Word 25, bits 12–15 | A41 | TBCD-Null | |
| Word 26, bits 0–3 | A42 | TBCD-Null | |
| Word 26, bits 4–7 | A43 | TBCD-Null | |
| Word 26, bits 8–11 | A44 | TBCD-Null | |
| Word 26, bits 12–15 | A45 | TBCD-Null | |
| 14. International Number: | | | |
| Word 15, bits 12–15 | A1 | X(CC) | |
| Word 16, bits 0–3 | A2 | X(CC) | |
| Word 16, bits 4–7 | A3 | X(CC) | |
| Word 16, bits 8–11 | A4 | X(NN) | |
| Word 16, bits 12–15 | A5 | X(NN) | |
| Word 17, bits 0–3 | A6 | X(NN) | |
| Word 17, bits 4–7 | A7 | X(NN) | |
| Word 17, bits 8–11 | A8 | X(NN) | |
| Word 17, bits 12–15 | A9 | X(NN) | |
| Word 18, bits 0–3 | A10 | X(NN) | |
| Word 18, bits 4–7 | A11 | X(NN) | |
| Word 18, bits 8–11 | A12 | X(NN) | |
| Word 18, bits 12–15 | A13 | X(NN) | |
| Word 19, bits 0–3 | A14 | X(NN) | |
| Word 19, bits 4–7 | A15 | X(NN) | |
| Word 19, bits 8–11 | A16 | TBCD-Null | |
| Word 19, bits 12–15 | A17 | TBCD-Null | |
| Word 20, bits 0–3 | A18 | TBCD-Null | |
| Word 20, bits 4–7 | A19 | TBCD-Null | |
| Word 20, bits 8–11 | A20 | TBCD-Null | |
| Word 20, bits 12–15 | A21 | TBCD-Null | |
| Word 21, bits 0–3 | A22 | TBCD-Null | |
| Word 21, bits 4–7 | A23 | TBCD-Null | |
| Word 21, bits 8–11 | A24 | TBCD-Null | |
| Word 21, bits 12–15 | A25 | TBCD-Null | |
| Word 22, bits 0–3 | A26 | TBCD-Null | |
| Word 22, bits 4–7 | A27 | TBCD-Null | |
| Word 22, bits 8–11 | A28 | TBCD-Null | |
| Word 22, bits 12–15 | A29 | TBCD-Null | |
| Word 23, bits 0–3 | A30 | TBCD-Null | |
| Word 23, bits 4–7 | A31 | TBCD-Null | |
| Word 23, bits 8–11 | A32 | TBCD-Null | |
| Word 23, bits 12–15 | A33 | TBCD-Null | |
| Word 24, bits 0–3 | A34 | TBCD-Null | |
| Word 24, bits 4–7 | A35 | TBCD-Null | |
| Word 24, bits 8–11 | A36 | TBCD-Null | |
| Word 24, bits 12–15 | A37 | TBCD-Null | |
| Word 25, bits 0–3 | A38 | TBCD-Null | |
| Word 25, bits 4–7 | A39 | TBCD-Null | |
| Word 25, bits 8–11 | A40 | TBCD-Null | |
| Word 25, bits 12–15 | A41 | TBCD-Null | |
| Word 26, bits 0–3 | A42 | TBCD-Null | |
| Word 26, bits 4–7 | A43 | TBCD-Null | |
| Word 26, bits 8–11 | A44 | TBCD-Null | |
| Word 26, bits 12–15 | A45 | TBCD-Null | |
| CC = Customer Connect | | | |
| NN = National Number | | | |
| 15. LAN Sequence Number: | | | |
| Word 15, bits 12–15 | A1 | X | |
| Word 16, bits 0–3 | A2 | X | |
| Word 16, bits 4–7 | A3 | X | |
| Word 16, bits 8–11 | A4 | X | |
| Word 16, bits 12–15 | A5 | X | |
| Word 17, bits 0–3 | A6 | X | |
| Word 17, bits 4–7 | A7 | X | |
| Word 17, bits 8–11 | A8 | X | |
| Word 17, bits 12–15 | A9 | X | |
| Word 18, bits 0–3 | A10 | X | |
| Word 18, bits 4–7 | A11 | X | |
| Word 18, bits 8–11 | A12 | X | |
| Word 18, bits 12–15 | A13 | TBCD-Null | |
| Word 19, bits 0–3 | A14 | TBCD-Null | |

TABLE 4-continued

EOSR/EPOSR Record Format:

| Word #, Bit # | Description | | |
|---|---|---|---|
| | Word 19, bits 4–7 | A15 | TBCD-Null |
| | Word 19, bits 8–11 | A16 | TBCD-Null |
| | Word 19, bits 12–15 | A17 | TBCD-Null |
| | Word 20, bits 0–3 | A18 | TBCD-Null |
| | Word 20, bits 4–7 | A19 | TBCD-Null |
| | Word 20, bits 8–11 | A20 | TBCD-Null |
| | Word 20, bits 12–15 | A21 | TBCD-Null |
| | Word 21, bits 0–3 | A22 | TBCD-Null |
| | Word 21, bits 4–7 | A23 | TBCD-Null |
| | Word 21, bits 8–11 | A24 | TBCD-Null |
| | Word 21, bits 12–15 | A25 | TBCD-Null |
| | Word 22, bits 0–3 | A26 | TBCD-Null |
| | Word 22, bits 4–7 | A27 | TBCD-Null |
| | Word 22, bits 8–11 | A28 | TBCD-Null |
| | Word 22, bits 12–15 | A29 | TBCD-Null |
| | Word 23, bits 0–3 | A30 | TBCD-Null |
| | Word 23, bits 4–7 | A31 | TBCD-Null |
| | Word 23, bits 8–11 | A32 | TBCD-Null |
| | Word 23, bits 12–15 | A33 | TBCD-Null |
| | Word 24, bits 0–3 | A34 | TBCD-Null |
| | Word 24, bits 4–7 | A35 | TBCD-Null |
| | Word 24, bits 8–11 | A36 | TBCD-Null |
| | Word 24, bits 12–15 | A37 | TBCD-Null |
| | Word 25, bits 0–3 | A38 | TBCD-Null |
| | Word 25, bits 4–7 | A39 | TBCD-Null |
| | Word 25, bits 8–11 | A40 | TBCD-Null |
| | Word 25, bits 12–15 | A41 | TBCD-Null |
| | Word 26, bits 0–3 | A42 | TBCD-Null |
| | Word 26, bits 4–7 | A43 | TBCD-Null |
| | Word 26, bits 8–11 | A44 | TBCD-Null |
| | Word 26, bits 12–15 | A45 | TBCD-Null |
| 16. DNIS: | | | |
| | Word 15, bits 12–15 | A1 | N |
| | Word 16, bits 0–3 | A2 | X |
| | Word 16, bits 4–7 | A3 | X |
| | Word 16, bits 8–11 | A4 | N |
| | Word 16, bits 12–15 | A5 | X |
| | Word 17, bits 0–3 | A6 | X |
| | Word 17, bits 4–7 | A7 | X |
| | Word 17, bits 8–11 | A8 | X |
| | Word 17, bits 12–15 | A9 | X |
| | Word 18, bits 0–3 | A10 | X |
| | Word 18, bits 4–7 | A11 | TBCD-Null |
| | Word 18, bits 8–11 | A12 | TBCD-Null |
| | Word 18, bits 12–15 | A13 | TBCD-Null |
| | Word 19, bits 0–3 | A14 | TBCD-Null |
| | Word 19, bits 4–7 | A15 | TBCD-Null |
| | Word 19, bits 8–11 | A16 | TBCD-Null |
| | Word 19, bits 12–15 | A17 | TBCD-Null |
| | Word 20, bits 0–3 | A18 | TBCD-Null |
| | Word 20, bits 4–7 | A19 | TBCD-Null |
| | Word 20, bits 8–11 | A20 | TBCD-Null |
| | Word 20, bits 12–15 | A21 | TBCD-Null |
| | Word 21, bits 0–3 | A22 | TBCD-Null |
| | Word 21, bits 4–7 | A23 | TBCD-Null |
| | Word 21, bits 8–11 | A24 | TBCD-Null |
| | Word 21, bits 12–15 | A25 | TBCD-Null |
| | Word 22, bits 0–3 | A26 | TBCD-Null |
| | Word 22, bits 4–7 | A27 | TBCD-Null |
| | Word 22, bits 8–11 | A28 | TBCD-Null |
| | Word 22, bits 12–15 | A29 | TBCD-Null |
| | Word 23, bits 0–3 | A30 | TBCD-Null |
| | Word 23, bits 4–7 | A31 | TBCD-Null |
| | Word 23, bits 8–11 | A32 | TBCD-Null |
| | Word 23, bits 12–15 | A33 | TBCD-Null |
| | Word 24, bits 0–3 | A34 | TBCD-Null |
| | Word 24, bits 4–7 | A35 | TBCD-Null |
| | Word 24, bits 8–11 | A36 | TBCD-Null |
| | Word 24, bits 12–15 | A37 | TBCD-Null |
| | Word 25, bits 0–3 | A38 | TBCD-Null |
| | Word 25, bits 4–7 | A39 | TBCD-Null |
| | Word 25, bits 8–11 | A40 | TBCD-Null |
| | Word 25, bits 12–15 | A41 | TBCD-Null |
| | Word 26, bits 0–3 | A42 | TBCD-Null |
| | Word 26, bits 4–7 | A43 | TBCD-Null |
| | Word 26, bits 8–11 | A44 | TBCD-Null |
| | Word 26, bits 12–15 | A45 | TBCD-Null |
| | 17. Network Call Identifier (NCID): If the NCID is recorded in the "A" field, it is recorded in binary beginning with A1. The entry code will indicate the call processing associated with the particular call or '0.' If the NCID is recorded in the NCID field of a 64-word call record, the entry code will also indicate the call processing associated with the particular call or '0.' The NCID comprises the following: Originating Switch ID Originating Trunk Group Originating Port Number Timepoint 1 NCID Sequence Number | | |
| Word 27, bits 0–3 | Feature Code (FC): Same as OSR/POSR format. | | |
| Word 27, bits 4–7 | Terminating Network Code (TNC): Same as OSR/POSR format. | | |
| Word 27, bits 8–11 | Network Access Type (NAT): Same as OSR/POSR format. | | |
| Word 27, bits 12–15 | Timepoint 7 Qualifier (TP&Q): Same as OSR/POSR format. | | |
| Word 28, bits 0–6 | Entry Code (EC): Same as OSR/POSR format. | | |
| Word 28, bits 7–9 | Prefix Digits (PD): Same as OSR/POSR format. | | |
| Word 28, bits 10–12 | NCS/DAP ID (NDID): Same as OSR/POSR format. | | |
| Word 28, bits 13–15 | Division ID (DIVID): Same as OSR/POSR format. | | |
| Word 29, bit 0 | Distant Overflow (DO): Same as OSR/POSR format. | | |
| Word 29, bit 1 | MCI Network Overflow (MNO): Same as OSR/POSR format. | | |
| Word 29, bit 2 | Customer Connect (CC): Same as OSR/POSR format. | | |
| Word 29, bit 3 | Inter-Network (IN): Same as OSR/POSR format. | | |
| Word 29, bit 4 | Not Used | | |
| Word 29, bit 5 | SAC Bit (SC): This bit is used for the Flexible SAC feature. This bit will be set to "1" whenever the received number which is collected during the address digit collection phase, is identified as a SAC number in the FlexSac Index associated with the originating trunk group. This bit will be set to "0" in all other cases. | | |
| Word 29, bit 6 | Call Direction (CD): Same as OSR/POSR format. | | |
| Word 29, bit 7 | Destination (DE): Same as OSR/POSR format. | | |
| Word 29, bit 8 | Dedicated Termination (DT): Same as OSR/POSR format. | | |
| Word 29, bit 9 | Person-to-Person (PP): Same as OSR/POSR format. | | |
| Word 29, bit 10 | Transferred Bit (XB): Same as OSR/POSR format. | | |
| Word 29, bit 11 | Satellite (SA): Same as OSR/POSR format. | | |
| Word 29, bits 12–15 | Nature of Calling Location ID (NOCLI): Same as OSR/POSR format. | | |
| Word 30, bits 0–15 | Carrier Number (CN): Same as OSR/POSR format. | | |
| Word 31, bits 0–3 | Authorization Code ID (ACIF): Same as OSR/POSR format. | | |
| Word 31, bits 4–10 | Release Code (RC): Same as OSR/POSR format. | | |
| Word 31, bits 11–13 | NCID Sequence Number: Same as OSR/POSR format. | | |
| Word 31, bit 14 | NCID Location (NCIDLOC): Same as OSR/POSR format. | | |
| Word 31, bit 15 | Remote ANI Screened (RS): Same as OSR/POSR format. | | |
| Word 32, bits 0–15 | Time & Changes Guest Name (T&C Guest): Records the Time and Charges guest name that will be passed back to the switch from the operator service platform for the time and charges feature. The information is recorded as ASCII characters starting with the first character in word 32, bits 0–7. | | |
| Word 33, bits 0–15 | | | |
| Word 34, bits 0–15 | Destination Address (DA): Records up to 25 digits of the destination address in TBCD format in the sequence that | | |

TABLE 4-continued

EOSR/EPOSR Record Format:

| Word #, Bit # | Description | | | | |
|---|---|---|---|---|---|
| Word 35, bits 0–15 | they are received or translated to, starting with D1. Unused bytes contain TBCD-Null. | | | | |
| Word 36, bits 0–15 | | | 7-digit | 10-digit | DDD | IDDD |
| Word 37, bits 0–15 | Word 34, bits 0–3 | D1 | N | N | N | CC |
| Word 38, bits 0–15 | Word 34, bits 4–7 | D2 | X | X | X | CC |
| Word 39, bits 0–15 | Word 34, bits 8–11 | D3 | X | X | X | CC |
| Word 40, bits 0–3 | Word 34, bits 12–15 | D4 | X | N | N | NN |
| | Word 35, bits 0–3 | D5 | X | X | X | NN |
| | Word 35, bits 4–7 | D6 | X | X | X | NN |
| | Word 35, bits 8–11 | D7 | X | X | X | NN |
| | Word 35, bits 12–15 | D8 | X (TSID) | X | X | NN |
| | Word 36, bits 0–3 | D9 | X (TSID) | X | X | NN |
| | Word 36, bits 4–7 | D10 | X (TSID) | X | X | NN |
| | Word 36, bits 8–11 | D11 | X(TTG) | X (TSID) | T-Null | NN |
| | Word 36, bits 12–15 | D12 | X(TTG) | X (TSID) | T-Null | NN |
| | Word 37, bits 0–3 | D13 | X(TTG) | X (TSID) | T-Null | NN |
| | Word 37, bits 4–7 | D14 | X(TTG) | X(TTG) | T-Null | NN |
| | Word 37, bits 8–11 | D15 | T-Null | X(TTG) | T-Null | NN |
| | Word 37, bits 12–15 | D16 | T-Null | X(TTG) | T-Null | T-Null |
| | Word 38, bits 0–3 | D17 | T-Null | X(TTG) | T-Null | T-Null |
| | Word 38, bits 4–7 | D18 | T-Null | T-Null | T-Null | T-Null |
| | Word 38, bits 8–11 | D19 | T-Null | T-Null | T-Null | T-Null |
| | Word 38, bits 12–15 | D20 | T-Null | T-Null | T-Null | T-Null |
| | Word 39, bits 0–3 | D21 | T-Null | T-Null | T-Null | T-Null |
| | Word 39, bits 4–7 | D22 | T-Null | T-Null | T-Null | T-Null |
| | Word 39, bits 8–11 | D23 | T-Null | T-Null | T-Null | T-Null |
| | Word 39, bits 12–15 | D24 | T-Null | T-Null | T-Null | T-Null |
| | Word 40, bits 0–3 | D25 | T-Null | T-Null | T-Null | T-Null |
| | CC = Customer Connect | | | | | |
| | NN = National Number | | | | | |
| | TSID = Terminating Switch ID | | | | | |
| | TTG = Terminating Trunk ID | | | | | |
| | T-Null = TBCD-Null | | | | | |
| | | | | 18-digit | | |
| | Word 34, bits 0–3 | D1 | N | | | |
| | Word 34, bits 4–7 | D2 | N | | | |
| | Word 34, bits 8–11 | D3 | N | | | |
| | Word 34, bits 12–15 | D4 | N | | | |
| | Word 35, bits 0–3 | D5 | N | | | |
| | Word 35, bits 4–7 | D6 | N | | | |
| | Word 35, bits 8–11 | D7 | N | | | |
| | Word 35, bits 12–15 | D8 | N | | | |
| | Word 36, bits 0–3 | D9 | N | | | |
| | Word 36, bits 4–7 | D10 | N | | | |
| | Word 36, bits 8–11 | D11 | N | | | |
| | Word 36, bits 12–15 | D12 | N | | | |
| | Word 37, bits 0–3 | D13 | N | | | |
| | Word 37, bits 4–7 | D14 | N | | | |
| | Word 37, bits 8–11 | D15 | N | | | |
| | Word 37, bits 12–15 | D16 | N | | | |
| | Word 38, bits 0–3 | D17 | N | | | |
| | Word 38, bits 4–7 | D18 | N | | | |
| | Word 38, bits 8–11 | D19 | X(TSID) | | | |
| | Word 38, bits 12–15 | D20 | X(TSID) | | | |
| | Word 39, bits 0–3 | D21 | X(TSID) | | | |
| | Word 39, bits 4–7 | D22 | X(TTG) | | | |
| | Word 39, bits 8–11 | D23 | X(TTG) | | | |
| | Word 39, bits 12–15 | D24 | X(TTG) | | | |
| | Word 40, bits 0–3 | D25 | X(TTG) | | | |
| | TSID = Terminating Switch ID | | | | | |
| | TTG = Terminating Trunk Group | | | | | |
| Word 40, bits 4–15 Word 41, bits 0–15 Word 42, bits 0–15 Word 43, bits 0–15 | Pretranslated Digits (PTD): Represents up to 15 digits of a number that is the translation of a number dialed by the caller. | | | | |
| | | | 10 digit VNet, SAC DNIS, or Hotline | 7 digit VNet SAC Code | VNet/ IDDD 15 digit VNet or SNS | (example) |
| | Word 40, bits 4–7 | PTD1 | N | 0 | N | N |
| | Word 40, bits 8–11 | PTD2 | X | 0 | X | N |
| | Word 40, bits 12–15 | PTD3 | X | Y | X | N |
| | Word 41, bits 0–3 | PTD4 | N | N | X | N |
| | Word 41, bits 4–7 | PTD5 | X | X | X | N |
| | Word 41, bits 8–11 | PTD6 | X | X | X | N |
| | Word 41, bits 12–15 | PTD7 | X | X | X | N |
| | Word 42, bits 0–3 | PTD8 | X | X | T-Null | N |
| | Word 42, bits 4–7 | PTD9 | X | X | T-Null | N |
| | Word 42, bits 8–11 | PTD10 | X | X | T-Null | N |
| | Word 42, bits 12–15 | PTD11 | T-Null | T-Null | T-Null | N |
| | Word 43, bits 0–3 | PTD12 | T-Null | T-Null | T-Null | N |
| | Word 43, bits 4–7 | PTD13 | T-Null | T-Null | T-Null | N |
| | Word 43, bits 8–11 | PTD14 | T-Null | T-Null | T-Null | N |
| | Word 43, bits 12–15 | PTD15 | T-Null | T-Null | T-Null | N |
| | T-Null = TBCD-Null | | | | | |
| Word 44, bits 0–7 | Enhanced international Routing (EIR) Call Type: Contains the EIR call type ID as received from the DAP in the NCS billing information parameter or from the operator in the NCS billing information ISUP RLT parameter. It is recorded in binary, the default = '0.' | | | | |
| Word 44, bits 8–14 | Overflow Cause Value (OVFVAL): This field is the binary equivalent of the first cause value received or formatted in-switch. This value is taken from the cause value subfield in the cause parameter that initiated overflow. | | | | |
| Word 44, bit 15 | Counts As Bid (CB): Used with the EIR feature. This bit is set to '1' or '0' as per the information received from the DAP in the CB field of the NCS billing information parameter or from the operator in the NCS billing information ISUP RLT parameter.<br>0 = Does not count as bid (default)<br>1 = Counts as bid | | | | |
| Word 45, bits 0–3 | Overflow Cause Location (OVFCL): This field is the binary equivalent fo the value recorded from the first cause location received or formatted in-switch. This information is taken from the cause location subfield in the cause parameter that initiated overflow. | | | | |
| Word 45, bits 4–15 Word 46, bits | Desired Terminating Address (DTA): These 15 bytes contain the originally intended or "desired" termination before overflow was triggered. They contain either: | | | | |

TABLE 4-continued

EOSR/EPOSR Record Format:

| Word #, Bit # | Description |
|---|---|
| Word 47, bits 0–15<br>Word 48, bits 0–15 | 1) the desired terminating switch id and trunk group for calls that were sent to a DTC termination, 2) a national number, or 3) international number based on what the action code returned from the DAP for the desired termination. |

|  |  | DTC<br>DTSID +<br>DTTG | DDD |
|---|---|---|---|
| Word 45, bits 4–7 | DTA1 | 0 | N |
| Word 45, bits 8–11 | DTA2 | X(DTSID1) | X |
| Word 45, bits 12–15 | DTA3 | X(DTSID2) | X |
| Word 46, bits 0–3 | DTA4 | X(DTSID3) | N |
| Word 46, bits 4–7 | DTA5 | 0 | X |
| Word 46, bits 8–11 | DTA6 | X(DTTG1) | X |
| Word 46, bits 12–15 | DTA7 | X(DTTG2) | X |
| Word 47, bits 0–3 | DTA8 | X(DTTG3) | X |
| Word 47, bits 4–7 | DTA9 | X(DTTG4) | X |
| Word 47, bits 8–11 | DTA10 | TBCD-Null | X |
| Word 47, bits 12–15 | DTA11 | TBCD-Null | TBCD-Null |
| Word 48, bits 0–3 | DTA12 | TBCD-Null | TBCD-Null |
| Word 48, bits 4–7 | DTA13 | TBCD-Null | TBCD-Null |
| Word 48, bits 8–11 | DTA14 | TBCD-Null | TBCD-Null |
| Word 48, bits 12–15 | DTA15 | TBCD-Null | TBCD-Null |

DTSID = Desired Terminating Switch ID
DTTG = Desired Terminating Trunk Group

|  |  | IDDD<br>(example) | DTC<br>(future) |
|---|---|---|---|
| Word 45, bits 4–7 | DTA1 | CC | X(DTSID1) |
| Word 45, bits 8–11 | DTA2 | CC | X(DTSID2) |
| Word 45, bits 12–15 | DTA3 | CC | X(DTSID3) |
| Word 46, bits 0–3 | DTA4 | NN | X(DTSID4) |
| Word 46, bits 4–7 | DTA5 | NN | X(DTTG1) |
| Word 46, bits 8–11 | DTA6 | NN | X(DTTG2) |
| Word 46, bits 12–15 | DTA7 | NN | X(DTTG3) |
| Word 47, bits 0–3 | DTA8 | NN | X(DTTG4) |
| Word 47, bits 4–7 | DTA9 | NN | X(DTTG5) |
| Word 47, bits 8–11 | DTA10 | NN | TBCD-Null |
| Word 47, bits 12–15 | DTA11 | NN | TBCD-Null |
| Word 48, bits 0–3 | DTA12 | NN | TBCD-Null |
| Word 48, bits 4–7 | DTA13 | NN | TBCD-Null |
| Word 48, bits 8–11 | DTA14 | NN | TBCD-Null |
| Word 48, bits 12–15 | DTA15 | TBCD-Null | TBCD-Null |

CC = Customer Connect
NN = National Number
DTSID = Desired Terminating Switch ID
DTTG = Desired Terminating Trunk Group

| Word #, Bit # | Description |
|---|---|
| Word 49, bits 0–6 | Overflow Count (OVFC): Indicates the total number of intermediate overflow attempts before successful termination was achieved. This value is incremented each time the DAP is accessed for overflow information. |
| Word 49, bits 7–12 | Desired Termination Action Code (DTAC): This field represents the action code which was received from the DAP in the first response. This information is used to identify the type of information which is recorded in the DTA field. |
| Word 49, bit 13 | Not Used |
| Word 49, bits 14–15 | Network Call Identifier (NCID): Contains the binary representation of the NCID. The NCID is recorded here at intermediate and terminating switches if the Authcode field is being used to record other information. The NCID is created at the originating switch and is passed to intermediate and terminating switches. The format of the NCID is:<br>Originating Switch ID (OSID)<br>Originating Trunk Group (OTG)<br>Originating Port (OP)<br>Timepoint 1 (TP1)<br>NCID Sequence Number |
| Words 50–54, bits 0–15 | |
| Word 55, bits 0–15<br>Word 56, bits 0–15<br>Word 57, bits 0–15 | Time and Charges Room Number (T&C Room): This field records the time and charges room number that will be passed back to the switch from the operator service platform for the time and charges feature. The information is recorded as ASCII characters starting with the first character in word 53, bits 0–7. |
| Word 58, bits 0–15<br>Word 59, bits 0–15<br>Word 60, bits 0–15 | EVS Application Counter (EAC-1): This field records the EVS application counter values if an ARU is used in the call. The field contains the digits that were dailed by the customer in response to audio menu options. |
| Word 61, bits 0–13 | Operator ID Number (OPIN): This field contains the operator ID number of the operator that handled the call. |
| Word 61, bits 14–15 | Overflow Cause Coding Standard (OVFCS): Contains the binary equivalent of the first coding standard received or formatted in-switch. This value is taken from the coding standard subfield in the cause parameter that initiated overflow. It will not be overwritten by subsequent coding standards received or in-switch formatted values. This field is used for enhanced overflow calls only. |
| Word 62, bits 0–12 | Timepoint 5 (TP5): A binary count of the number of seconds between the time timepoint 1 occurred and the time that the operator stopped handling the call and releases the position. If the call is transferred to other operators, the value contained in this field shall express the release time of the last operator providing the service. |
| Word 62, bits 13–15 | Not Used. |
| Word 63, bits 0–15 | Room Number (RN): Contains the last four digits of the Calling Station ID (CSI) when a call originates from a hotel, a university, or any other communicty identified by only a main telephone number. The CSI shall be obtained from the originating signalling information, or verbally by the operator who enters the information manually into the OSR. |

TABLE 5

SER Record Format:

| Word #, Bit # | Description |
|---|---|
| Word 0, bits 0–3 | Call Record Id (CRID): Identifies the record type.<br>0 = Default<br>1 = CDR<br>2 = SER<br>3 = PNR<br>4 = OSR<br>5 = POSR<br>6 = ECDR<br>7 = EPOSR<br>8 = EOSR<br>9 = EPOSR<br>10–15 = Not Used |
| Word 0, bits 4–15 | Sync word: This word contains a minus two ($7776_8$). |
| Word 1, bits 0–15<br>Word 2, bits 0–15 | Call Disconnect ID (CDID): Identifies the call record. Each call record has a unique number. When a switch cold restart of reload occurs, the |

TABLE 5-continued

SER Record Format:

| Word #, Bit # | Description |
|---|---|
| | CDID is set to 0 and a Switch Event Record with an event code of 3 is written. When the CDID count rolls over, an event code of 10 SER is recorded. |
| Word 3, bits 0–15 | Switch ID (SWID): Contains the unique identifier of the current switch. the SWID consists of three (3) packed alphanumeric characters. The lead character may be any hex digit (0–F). The next two (2) characters are any number in a base 36 system. Base 36 symbols are 0–9, A–Z. The maximum octal number in the base 36 is $43_8$ which represents the letter Z. Values $44_8$ through $77_8$ are unused.<br>Word 3, bits 0–3     SWID1 (0–9, A–F)<br>Word 3, bits 4–9     SWID2 (0–9, A–Z)<br>Word 3, bits 10–15   SWID3 (0–9, A–Z) |
| Word 4, bits 0–7 | Switch Type (ST): Indicates the type of switch.<br>0 = default<br>1 = 580L SCX<br>2 = DEX-400<br>3 = CTSS-1000<br>4 = CTSS-4000<br>5 = DMS-250<br>6 = AXE-10<br>7 = DEX-600<br>8 = DMS-300<br>9 = DMS-TOPS<br>10 = DEX-600E<br>11 = AS20<br>12 = AS27<br>13 = EVS ARU<br>14–255 = Not Used |
| Word 4, bits 8–15 | Event Qualifier (EQ): Identifies the event causing the record.<br>0 = default<br>1 = Input command or automatic system update that changed date<br>2 = Input command or automatic system update that changed time<br>3 = System restart<br>4 = Hourly log (HH:00:00)<br>5 = Recovery Action<br>6 = End of billing data (End of File)<br>7 = Start of billing data (Start of File)<br>8 = NEMAS SRB blocking record (end of billing block)<br>9 = Daylight savings time changed (time and offset time changed)<br>10 = CDID LOG (CDID rolled over to 0)<br>11 = Not Used<br>12 = Blank SER (filler record for billing block)<br>13–255 = Not Used<br>An event code 7 SER will always be the first record in the call history data set.<br>An event code 8 SER will always be the last record in the call block and will be immediately proceded by event code 6.<br>An event code 9 SER will be invoked by a man-machine command that invokes a Daylight Saving Time change.<br>An event code 10 SER will be written each time the Call Disconnect ID (CDID) rolls over from a maximum count to '0'. This event code will not be written for CDID rollovers due to system restarts. |
| Word 5, bits 0–15<br>Word 6, bits 0–15 | SER Event Time (SERET): Contains the epoch time of this SER and is used for event codes. |
| Word 7, bits 0–3 | Not Used |
| Word 7, bits 4–15 | First CDID (FCDID): Contains the last 12 bits of the CDID that was recorded in the first call record or SER in this billing block. This field is used in SER event code 8. |
| Word 8, bits 0–3 | Not Used |
| Word 8, bits 4–15 | Last CDID (LCDID): Contains the CDID that was recorded in the last call record or SER in this billing block. This field is used in SER 8. |
| Word 9, bits 0–3 | Not Used |
| Word 9, bits 4–15 | Next CDID (NCDID): Contains the CDID in the next call record or SER. This field is used in SER 8. |
| Word 10, bits 0–15 | NEMAS Blocking Sequence Number (NBSN): Contains the NEMAS blocking sequence number in event code 8 SERs. The first event code 8 SER within a call history file is set to a NBSN value of 0. The NBSN value is sequentially incremented in following event code 8 SERs. |
| Word 11, bits 0–15<br>Word 12, bits 0–15 | Previous Time (PT): Contains the epoch time of the time before a system time change was made. Used in SER 1, 2, and 9. |
| Word 13, bit 0 | Sign Bit (SB): Indicates whether the time offset is a negative or positive number. This field is used in all SERs.<br>0 = positive offset<br>1 = negative offset |
| Word 13, bits 1–10 | Time Offset (TO): Used to record the time offset from universal time (UTC) in one minute increments. This field is used in all SERs. |
| Word 13, bits 11–15<br>Word 14, bits 0–15<br>Word 15, bits 0–15 | Not Used |
| Word 16, bits 0–15<br>Word 17, bits 0–15<br>Word 18, bits 8–15 | Software Load ID1–6: Contains 6 bytes of the software load identifier of the switch recording the billing. This field is written in EBCDIC format and contains the same data as the software load identifier that is recorded in the call history tape label |
| Word 19, bits 0–15 | Last Patch #1, #2: These 2 bytes contain the latest patch number/point release of the switch recording the billing. This field is written in EBCDIC format and contains the same data as the latest patch number/point release that is recorded in the call history tape label. The point release identifies the upgrade level of the current software load. Used in SER 7. |
| Word 20, bits 0–5 | Quantity CDR (QCDR): Contains the quantity of CDRs that were recorded in this billing block. Used only for event code 8 SERs. |
| Word 20, bits 6–11 | Quantity ECDR (QECDR): Contains the quantity of expanded CDRs that were recorded in this billing block. Used only for event code 8 SERs. |
| Word 20, bits 12–15 | Not Used |
| Word 21, bits 0–5 | Quantity PNR (QPNR): Contains the quantity of PNRs that were recorded in this billing block. Used only for event code 8 SERs. |
| Word 21, bits 6–11 | Quantity EPNR (QEPNR): Contains the quantity of expanded PNRs that were recorded in this billing block. Used only for event code 8 SERs. |
| Word 21, bits 12–15 | Not Used |
| Word 22, bits 0–5 | Quantity OSR (QOSR): Contains the quantity of OSRs that were recorded in this billing block. Used only for event code 8 SERs. |
| Word 22, bits 6–11 | Quantity EOSR (QEOSR): Contains the quantity of expanded OSRs that were recorded in this billing block. Used only for event code 8 SERs. |
| Word 22, bits 12–15 | Not Used |
| Word 23, bits 0–5 | Quantity POSR (QPOSR): Contains the quantity of POSRs that were recorded in this billing block. Used only for event code 8 SERs. |
| Word 23, bits 6–11 | Quantity EPOSR (QEPOSR): Contains the quantity of expanded POSRs that were recorded in this billing block. Used only for event code 8 SERs. |
| Word 23, 12–15 | Not Used |
| Word 24, bits 0–5 | Quantity SER (QSER): Contains the quantity of SERs that were recorded in this billing block. Used only for event code 8 SERs. |
| Word 24, bits 6–12 | Call History File Number (CHFN): Contains the call history file number as assigned when a call history file is opened at the switch. Used in all SERs. The first opened file contains a CHFN value of 0. Each new file opened in that same day shall increment the CHFN by one. When the Julian date changes (at midnight), the next file opened shall cause the CHFN to be reset back to zero. |
| Word 24, bits 13–14 | Not Used. |

TABLE 5-continued

SER Record Format:

| Word #, Bit # | Description |
| --- | --- |
| Word 24, bit 15 | SER 12 Used (SU): This bit is set in an SER 8 if the previous call record was a SER 12. |
| Word 25, bits 0–15 | CDR Throttle Start Time: Records the epoch time |
| Word 26, bits 0–15 | when CDR throttling started. Used in SER 8. |
| Word 27, bits 0–15 | CDR Throttle Stop Time: Records the epoch time |
| Word 28, bits 0–15 | when CDR throttling stopped. Used in SER 8. |
| Word 29, bits 0–11 | Not Used. |
| Word 29, bits 12–15 | Format Version: This field is filled with 1's to identify the 32/64 word format. The billing system must then look to Word 0, bits 0–3 to determine the type of call record used. |
| Word 30, bits 0–15 | Throttle Count: Used to record the number of CDRs |
| Word 31, bits 0–15 | that were not written during the time that CDR throttling was invoked. Used in SER 8. |

What is claimed is:

1. A communication switch for transmitting a telephone call from a calling location to a destination location through a communications network comprising:

first determining means for determining if said communication switch received a network call identifier with the telephone call;

first creating means for creating a network call identifier for the telephone call if said first determining means determines that said communication switch did not receive said network call identifier with the telephone call;

second determining means for determining if said communication switch should keep said network call identifier if said first determining means determines that said communication switch received said network call identifier with the telephone call;

discarding means for discarding said network call identifier if said first determining means determines that said communication switch received said network call identifier and said second determining means determines that said communication switch should not keep said network call identifier;

second creating means for creating a new network call identifier for the telephone call if said discarding means discards said network call identifier; and transporting means for transporting the telephone call to the destination location through said communications network.

2. A method for a communication switch to create and transport a network call identifier which uniquely identifies a telephone call being transmitted within a telecommunication network, said method comprising the steps of:

(a) determining if the communication switch received a network call identifier with the telephone call;

(b) creating a network call identifier if the communications switch determines in step (a) that it did not receive said network call identifier with the telephone call;

(c) determining if said communication switch should keep the received network call identifier;

(d) discarding the received network call identifier upon determining that the received network call identifier should be discarded; and (e) creating a new network call identifier for the telephone call if the received network call identifier is discarded.

3. The communication switch according to claim 1, wherein said network call identifier uses a standard record format.

4. The communication switch according to claim 1, wherein said network call identifier uses an expandable record format.

5. A method of tracing in a call record, a path traversed by a telephone call through a communications network, including tracing a telephone call from an originating network switch to a destination switch, comprising:

a) determining if a communication switch received an intelligent network call identifier having embedded decipherable path information, called a received network call identifier, with the telephone call;

b) creating an intelligent network call identifier for the telephone call if in step (a) it is determined that the communication switch did not receive the received network call identifier with the telephone call;

c) determining if said communication switch should keep the received network call identifier;

d) discarding the received network call identifier upon determining that the received network call identifier should be discarded;

e) creating a new network call identifier for the telephone call if the received network call identifier is discarded; and f) transporting the telephone call along with the intelligent network call identifier to a destination network switch.

6. A method according to claim 5, wherein step (b) includes the steps of (i) identifying an originating switch identifier;

(ii) identifying an originating trunk group;

(iii) identifying an originating port number;

(iv) identifying a first timepoint; and (v) identifying a sequence number.

* * * * *